US012202264B2

(12) United States Patent
Kashimura

(10) Patent No.: US 12,202,264 B2
(45) Date of Patent: Jan. 21, 2025

(54) LIQUID DISCHARGE DEVICE AND DRIVE CIRCUIT SUBSTRATE

(71) Applicant: SEIKO EPSON CORPORATION, Tokyo (JP)

(72) Inventor: Toru Kashimura, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 37 days.

(21) Appl. No.: 17/971,698

(22) Filed: Oct. 24, 2022

(65) Prior Publication Data

US 2023/0126918 A1 Apr. 27, 2023

(30) Foreign Application Priority Data

Oct. 25, 2021 (JP) ................................ 2021-173683

(51) Int. Cl.
*B41J 2/045* (2006.01)

(52) U.S. Cl.
CPC ....... *B41J 2/04581* (2013.01); *B41J 2/04541* (2013.01); *B41J 2/04573* (2013.01); *B41J 2/04588* (2013.01); *B41J 2/04593* (2013.01)

(58) Field of Classification Search
CPC B41J 2/04581; B41J 2/04541; B41J 2/04573; B41J 2/04588; B41J 2/04593; B41J 2002/14362; B41J 2/04596; B41J 2002/14241; B41J 2002/14419; B41J 2202/19; B41J 2202/20; B41J 2/14233; B41J 2002/14491
USPC ........................................................... 347/10
See application file for complete search history.

(56) References Cited

U.S. PATENT DOCUMENTS

| | | | | |
|---|---|---|---|---|
| 9,669,621 | B2 | 6/2017 | Nozawa | |
| 2002/0145637 | A1 | 10/2002 | Umeda et al. | |
| 2012/0256980 | A1 | 10/2012 | Fujimoto | |
| 2015/0273821 | A1 | 10/2015 | Abe et al. | |
| 2016/0214384 | A1 * | 7/2016 | Kasai | B41J 2/14072 |
| 2018/0178509 | A1 * | 6/2018 | Chino | B41J 2/04588 |
| 2018/0178510 | A1 * | 6/2018 | Nakajima | B41J 2/04588 |
| 2018/0178511 | A1 * | 6/2018 | Kashimura | B41J 2/14233 |
| 2018/0272693 | A1 | 9/2018 | Hayashi | |
| 2021/0060931 | A1 | 3/2021 | Kashimura et al. | |
| 2021/0114369 | A1 | 4/2021 | Nozawa | |

FOREIGN PATENT DOCUMENTS

| | | |
|---|---|---|
| JP | 2018-099865 A | 6/2018 |
| JP | 2021-035742 A | 3/2021 |
| JP | 2021-066051 A | 4/2021 |

* cited by examiner

*Primary Examiner* — Jason S Uhlenhake
*Assistant Examiner* — Alexander D Shenderov
(74) *Attorney, Agent, or Firm* — Harness, Dickey & Pierce, P.L.C.

(57) ABSTRACT

A liquid discharge device including a drive circuit substrate that drives a piezoelectric element of a liquid discharge head, and that includes a substrate which includes a first wiring layer having a first wiring through which the first drive signal propagates, a second wiring layer having a second wiring through which the second drive signal propagates, and a third wiring layer located between the first wiring layer and the second wiring layer and having a fourth wiring through which the reference voltage signal propagates, in which a third wiring through which the third drive signal propagates is provided on any one of the first wiring layer, the second wiring layer, and the third wiring layer.

10 Claims, 25 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

LIQUID DISCHARGE DEVICE AND DRIVE CIRCUIT SUBSTRATE

The present application is based on, and claims priority from JP Application Serial Number 2021-173683, filed Oct. 25, 2021, the disclosure of which is hereby incorporated by reference herein in its entirety.

BACKGROUND

1. Technical Field

The present disclosure relates to a liquid discharge device and a drive circuit substrate.

2. Related Art

As a liquid discharge device that discharges a liquid to form a document or an image on a medium, a device using a piezoelectric element is known. Piezoelectric elements are provided corresponding to each of a plurality of discharge portions in a print head. When the piezoelectric element is driven according to a drive signal, an amount of liquid is discharged from the corresponding discharge portion according to the drive of the piezoelectric element, and dots are formed on the medium.

In JP-A-2018-099865, a liquid discharge device is described that discharges liquid from a discharge portion by driving a piezoelectric element with a drive signal supplied to one end of the piezoelectric element and a reference voltage signal supplied to the other end of the piezoelectric element, and that includes a drive circuit substrate provided so that a wiring through which a drive signal propagates and a wiring through which a reference voltage signal propagates overlap with each other along a normal direction.

In the drive circuit substrate provided so that the wiring through which the drive signal propagates and the wiring through which the reference voltage signal propagates overlap with each other along the normal direction as described in JP-A-2018-099865, an inductance component generated by the propagation of the drive signal and an inductance component generated by the propagation of the reference voltage signal VBS are mutually canceled. As a result, the possibility that waveform distortion due to the inductance component occurs in the signal waveform of the drive signal is reduced, and as a result, the waveform accuracy of the drive signal can be improved.

On the other hand, in the liquid discharge device, the demand for increasing the image formation speed on the medium has increased in recent years, and therefore, it is required to increase the speed of a dot formation cycle for forming dots of a desired size on the medium by discharging the liquid. In response to such demands, technological development is performed to realize a high-speed dot formation cycle by shortening a waveform cycle of the drive signal for forming dots on the medium and adding a new drive signal.

However, by providing the drive circuit substrate provided so that the wiring through which the drive signal propagates and the wiring through which the reference voltage signal propagates overlap with each other along the normal direction as described in JP-A-2018-099865, when a new drive signal is added to the liquid discharge device that improves the waveform accuracy of the drive signal, in addition to the wiring through which the added drive signal propagates, it is necessary to provide the wiring through which the reference voltage signal corresponding to the drive signal propagates on the drive circuit substrate. As a result, there is a problem that the number of laminated drive circuit substrates may increase.

SUMMARY

According to an aspect of the present disclosure, there is provided a liquid discharge device including a liquid discharge head that has a piezoelectric element having a first electrode and a second electrode and discharges a liquid by driving the piezoelectric element, and a drive circuit substrate that drives the piezoelectric element, in which the drive circuit substrate includes a first drive circuit that outputs a first drive signal for driving the piezoelectric element to the first electrode such that the liquid discharge head discharges a liquid, a second drive circuit that outputs a second drive signal for driving the piezoelectric element to the first electrode such that the liquid discharge head discharges a liquid, a third drive circuit that outputs a third drive signal for driving the piezoelectric element to the first electrode such that the liquid discharge head does not discharge a liquid, a reference voltage output circuit that supplies a reference voltage signal to the second electrode, and a substrate provided with the first drive circuit, the second drive circuit, the third drive circuit, and the reference voltage output circuit, the substrate includes a first wiring through which the first drive signal propagates, a second wiring through which the second drive signal propagates, a third wiring through which the third drive signal propagates, a fourth wiring through which the reference voltage signal propagates, a first wiring layer provided with the first wiring, a second wiring layer provided with the second wiring, and a third wiring layer located between the first wiring layer and the second wiring layer along one direction and provided with the fourth wiring, and the third wiring is provided on any one of the first wiring layer, the second wiring layer, and the third wiring layer.

According to another aspect of the present disclosure, there is provided a drive circuit substrate that drives a liquid discharge head which has a piezoelectric element having a first electrode and a second electrode and which discharges a liquid by driving the piezoelectric element, the substrate including a first drive circuit that outputs a first drive signal for driving the piezoelectric element to the first electrode such that the liquid discharge head discharges a liquid, a second drive circuit that outputs a second drive signal for driving the piezoelectric element to the first electrode such that the liquid discharge head discharges a liquid, a third drive circuit that outputs a third drive signal for driving the piezoelectric element to the first electrode such that the liquid discharge head does not discharge a liquid, a reference voltage output circuit that supplies a reference voltage signal to the second electrode, and a substrate provided with the first drive circuit, the second drive circuit, the third drive circuit, and the reference voltage output circuit, in which the substrate includes a first wiring through which the first drive signal propagates, a second wiring through which the second drive signal propagates, a third wiring through which the third drive signal propagates, a fourth wiring through which the reference voltage signal propagates, a first wiring layer provided with the first wiring, a second wiring layer provided with the second wiring, and a third wiring layer located between the first wiring layer and the second wiring layer along one direction and provided with the fourth wiring, and the third wiring is provided on any one of the first wiring layer, the second wiring layer, and the third wiring layer.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

1. First Embodiment

1.1 Configuration of Liquid Discharge Device

Figure 1:
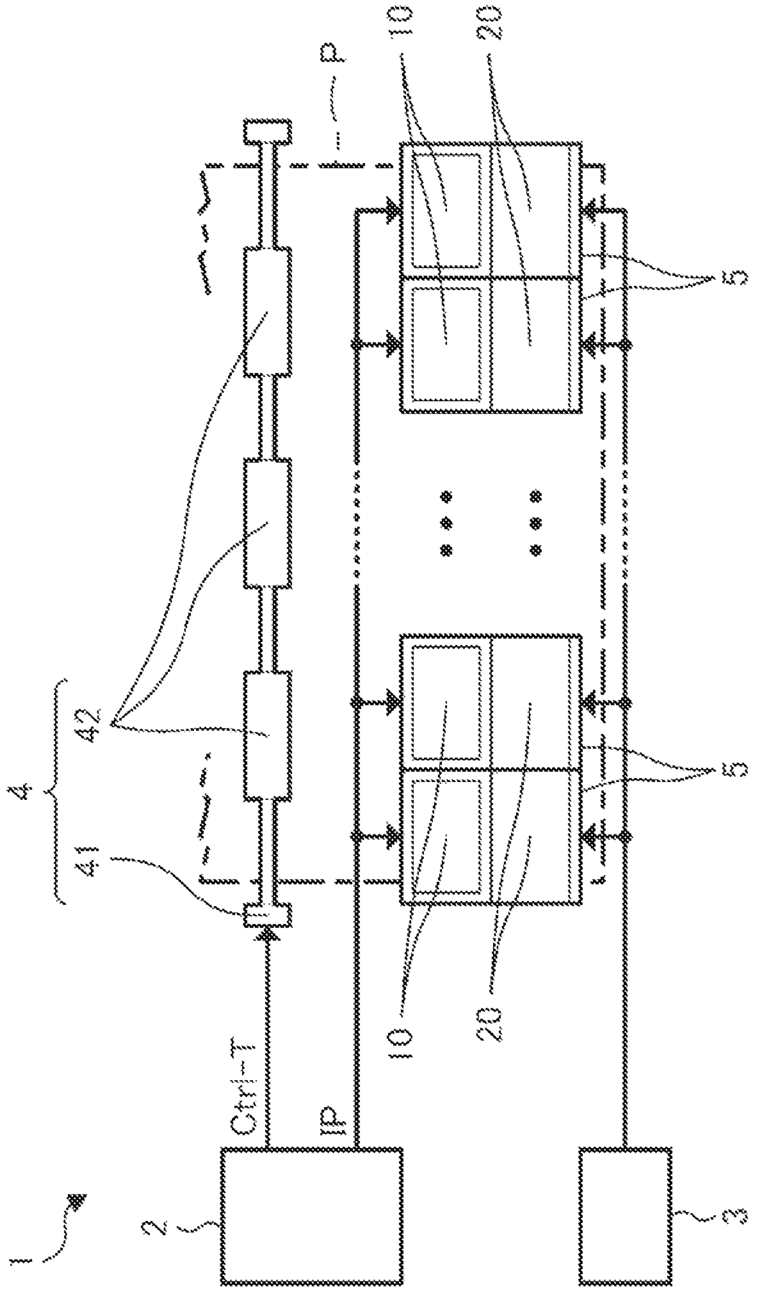
FIG. 1 is a diagram illustrating a schematic configuration of a liquid discharge device.

FIG. 1 is a diagram illustrating a schematic configuration of a liquid discharge device 1. As illustrated in FIG. 1, the liquid discharge device 1 is a so-called line-type ink jet printer that forms a desired image on a medium P by discharging ink at a desired timing on the medium P transported by a transport unit 4. Here, in the following description, a direction where the medium P is transported may be referred to as a transport direction, and a width direction of the transported medium P may be referred to as a main scanning direction.

As illustrated in FIG. 1, the liquid discharge device 1 is provided with a control unit 2, a liquid container 3, a transport unit 4, and a plurality of discharge units 5.

The control unit 2 includes a processing circuit such as a central processing unit (CPU) and a field programmable gate array (FPGA), and a storage circuit such as a semiconductor memory. The control unit 2 outputs a signal for controlling each element of the liquid discharge device 1 based on image data input from an external device such as a host computer (not illustrated) provided outside the liquid discharge device 1.

The ink as an example of the liquid supplied to the discharge unit 5 is stored in the liquid container 3. Specifically, the liquid container 3 stores inks of a plurality of colors discharged on the medium P, such as black, cyan, magenta, yellow, red, and gray.

The transport unit 4 includes a transport motor 41 and a transport roller 42. A transport control signal Ctrl-T output by the control unit 2 is input to the transport unit 4. The transport motor 41 operates based on the input transport control signal Ctrl-T, and the transport roller 42 is rotationally driven with the operation of the transport motor 41. As a result, the medium P is transported along the transport direction.

Each of the plurality of discharge units 5 includes a head drive module 10 and a liquid discharge module 20. An image information signal IP output by the control unit 2 is input to the discharge unit 5, and the ink stored in the liquid container 3 is supplied. The head drive module 10 controls the operation of the liquid discharge module 20 based on the image information signal IP input from the control unit 2, and the liquid discharge module 20 discharges the ink supplied from the liquid container 3 on the medium P according to the control of the head drive module 10.

Here, in the liquid discharge device 1 of the first embodiment, the liquid discharge modules 20 included in each of the plurality of discharge units 5 are located in a row along the main scanning direction so as to be equal to or larger than the width of the medium P. As a result, the liquid discharge module 20 can discharge ink to the entire region of the transported medium P in the width direction. That is, the liquid discharge device 1 of the first embodiment is a so-called line-type ink jet printer in which the plurality of liquid discharge modules 20 located in a row so as to be equal to or larger than the width of the medium P discharge ink as the medium P is transported to form a desired image on the medium P. The liquid discharge device 1 is not limited to the line-type ink jet printer, and may be a so-called serial type ink jet printer in which the liquid discharge module 20 reciprocates along the width direction of the medium P in the main scanning direction and discharges ink on the medium P transported in synchronization with the reciprocating movement to form a desired image on the medium P.

Figure 2:
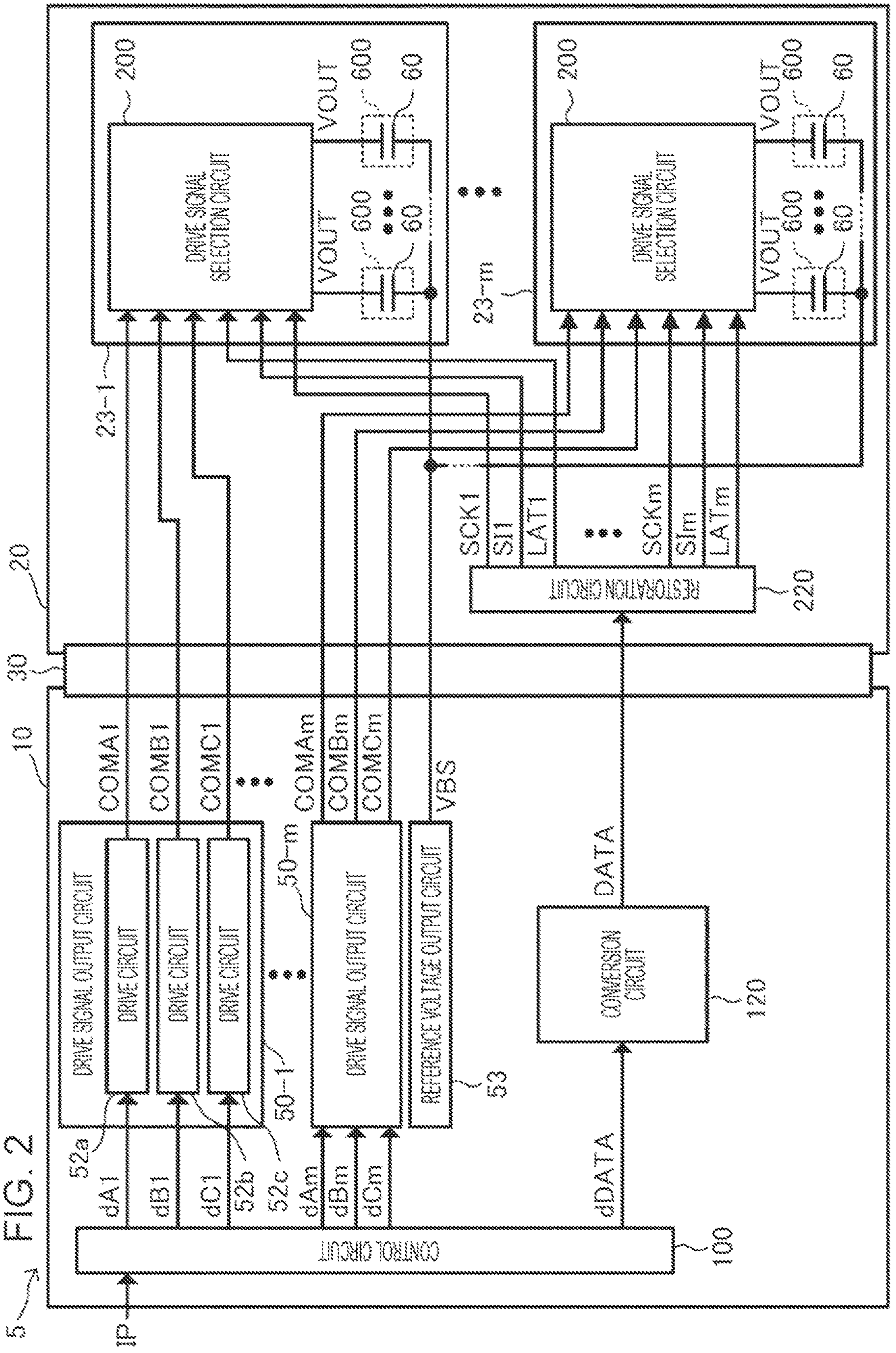
FIG. 2 is a diagram illustrating a schematic configuration of a discharge unit.

Next, a schematic configuration of the discharge unit 5 will be described. Here, the plurality of discharge units 5 included in the liquid discharge device 1 all have the same configuration, and in the following description, only one discharge unit 5 will be described. FIG. 2 is a diagram illustrating a schematic configuration of the discharge unit 5. As illustrated in FIG. 2, the discharge unit 5 includes the head drive module 10 and the liquid discharge module 20. In addition, in the discharge unit 5, the head drive module 10 and the liquid discharge module 20 are electrically coupled by a coupling member 30.

The coupling member 30 is a flexible member for electrically coupling the head drive module 10 and the liquid discharge module 20, and for example, flexible printed circuits (FPC) or a flexible flat cable (FFC) can be used. As the coupling member 30, a board to board (B to B) connector may be used instead of the FPC or FFC, or the B to B connector and the FPC or FFC may be used in combination.

The head drive module 10 includes a control circuit 100, a drive signal output circuit 50-1 to **50-*m*, a reference voltage output circuit 53, and a conversion circuit 120**.

The control circuit 100 includes a CPU, FPGA, or the like. The image information signal IP output by the control unit 2 is input to the control circuit 100. The control circuit 100 outputs a signal for controlling each element of the discharge unit 5 based on the input image information signal IP.

The control circuit 100 generates a basic data signal dDATA for controlling the operation of the liquid discharge module 20 based on the image information signal IP, and outputs a basic data signal dDATA to the conversion circuit 120. The conversion circuit 120 converts the basic data signal dDATA into a differential signal such as low voltage differential signaling (LVDS) and outputs a data signal DATA to the liquid discharge module 20. The conversion circuit 120 may convert the basic data signal dDATA into a differential signal of a high-speed transfer method such as low voltage positive emitter coupled logic (LVPECL) or current mode logic (CML) other than LVDS and output the differential signal to the liquid discharge module 20 as the data signal DATA. In addition, the conversion circuit 120 may convert a part or all of the input basic data signal dDATA into a predetermined single-ended signal and output the single-ended signal to the liquid discharge module 20 as the data signal DATA.

In addition, the control circuit 100 outputs basic drive signals dA1, dB1, and dC1 to the drive signal output circuit 50-1. The drive signal output circuit 50-1 includes drive circuits **52*a*, 52*b*, and 52*c*. The basic drive signal dA1 is input to the drive circuit 52*a*. The drive circuit 52*a* generates a drive signal COMA1 by performing digital/analog conversion of the input basic drive signal dA1 and then amplifying in class D, and outputs the drive signal COMA1 to the liquid discharge module 20. The basic drive signal dB1 is input to the drive circuit 52*b*. The drive circuit 52*b* generates a drive signal COMB1 by performing digital/analog conversion of the input basic drive signal dB1 and then amplifying in class D, and outputs the drive signal COMB1 to the liquid discharge module 20. The basic drive signal dC1 is input to the drive circuit 52*c*. The drive circuit 52*c* generates a drive signal COMC1 by performing digital/analog conversion of the input basic drive signal dC1 and then amplifying in class D, and outputs the drive signal COMC1 to the liquid discharge module 20**.

Here, each of the drive circuits **52*a*, 52*b*, and 52*c* may generate the drive signals COMA1, COMB1, and COMC1 by amplifying the waveforms defined by each of the input basic drive signals dA1, dB1, and dC1. Therefore, each of the drive circuits 52*a*, 52*b*, and 52*c* may include a class A amplifier circuit, a class B amplifier circuit, a class AB amplifier circuit, or the like in place of the class D amplifier circuit or in addition to the class D amplifier circuit. In addition, in the following description, it will be described that each of the basic drive signals dA1, dB1, and dC1 is a digital signal, and each of the basic drive signals dA1, dB1, and dC1 may be an analog signal as long as the waveforms of the corresponding drive signals COMA1, COMB1, and COMC1** can be defined.

The drive signal output circuits 50-2 to **50-*m* have the same configuration as the drive signal output circuit 50-1, except that the input signal and the output signal are different. That is, the drive signal output circuit 50-*j* (j is any one of 1 to m) includes a circuit corresponding to each of the drive circuits 52*a*, 52*b*, and 52*c*. The drive signal output circuit 50-*j* generates drive signals COMAj, COMBj, and COMCj based on the basic drive signals dAj, dBj, and dCj input from the control circuit 100, and outputs the drive signals to the liquid discharge module 20**.

Here, the drive signal output circuit 50-1 and the drive signal output circuits 50-2 to **50-*m* have the same configuration, and when it is not necessary to distinguish the drive circuits, the drive circuits may be simply referred to as a drive signal output circuit 50. In this case, it will be described that the drive signal output circuit 50 includes the drive circuits 52*a*, 52*b*, and 52*c*, the drive circuit 52*a* outputs the drive signal COMA, the drive circuit 52*b* outputs the drive signal COMB, and the drive circuit 52*c*** outputs the drive signal COMC.

In addition, the drive circuits **52*a*, 52*b*, and 52*c* included in the drive signal output circuit 50 all have the same configuration, and when it is not necessary to distinguish the drive circuits, the drive circuits may be simply referred to as a drive circuit 52. In this case, the drive circuit 52 will be described as generating a drive signal COM based on a basic drive signal do and outputting the generated drive signal COM to the liquid discharge module 20**.

On the other hand, when the drive circuits **52*a*, 52*b*, and 52*c* included in the drive signal output circuit 50-1 and the drive circuits 52*a*, 52*b*, and 52*c* included in the drive signal output circuit 50-*j* are separately described, each of the drive circuits 52*a*, 52*b*, and 52*c* included in the drive signal output circuit 50-1 may be referred to as drive circuits 52*a*1, 52*b*1, and 52*c*1, and each of the drive circuits 52*a*, 52*b*, and 52*c* included in the drive signal output circuit 50-*j* may be referred to as drive circuits 52*aj*, 52*bj*, and 52*cj*. A specific example of the configuration of the drive circuit 52** will be described later.

The reference voltage output circuit 53 generates a reference voltage signal VBS indicating a reference potential for driving a piezoelectric element 60 described later included in the liquid discharge module 20, and outputs the reference voltage signal VBS to the liquid discharge module 20. The reference voltage signal VBS is, for example, a signal having a constant potential such as 5.5V or 6V. Here, the signal having a constant potential includes a case where it can be regarded as a constant potential when various variations or errors such as a fluctuation of the potential caused by the operation of the peripheral circuit, a fluctuation of the potential caused by variations in the circuit element, and a fluctuation of the potential caused by temperature characteristics of the circuit element are taken into consideration.

The liquid discharge module 20 includes a restoration circuit 220 and discharge modules 23-1 to 23-*m*.

A data signal DATA is input to the restoration circuit 220. The restoration circuit 220 restores the data signal DATA of the input differential signal to a single-ended signal, separates the restored single-ended signal into a signal corresponding to each of the discharge modules 23-1 to 23-*m*, and outputs the signal to each of the corresponding discharge modules 23-1 to 23-*m*.

Specifically, the restoration circuit 220 restores and separates the data signal DATA to generate a clock signal SCK1, a print data signal SI1, and a latch signal LAT1, and outputs these signals to the discharge module 23-1. In addition, the restoration circuit 220 restores and separates the data signal DATA to generate a clock signal SCKj, a print data signal SIj, and a latch signal LATj, and outputs these signals to the discharge module 23-*j*. Any signal of the clock signals SCK1 to SCKm, the print data signals SI1 to SIm, and the latch signals LAT1 to LATm corresponding to each of the discharge modules 23-1 to 23-*m* output by the restoration circuit 220 may be input in common to the discharge modules 23-1 to 23-*m*.

Here, considering that the restoration circuit 220 generates the clock signals SCK1 to SCKm, the print data signals SI1 to SIm, and the latch signals LAT1 to LATm by restoring and separating the data signal DATA, the data signal DATA output by the conversion circuit 120 is a differential signal including signals corresponding to the clock signals SCK1 to SCKm, the print data signals SI1 to SIm, and the latch signals LAT1 to LATm. Therefore, the basic data signal dDATA output by the control circuit 100 includes a single-ended signal corresponding to each of the clock signals SCK1 to SCKm, the print data signals SI1 to SIm, and the latch signals LAT1 to LATm. That is, the control circuit 100 outputs the basic data signal dDATA as a signal for controlling the operation of the discharge modules 23-1 to 23-*m* included in the liquid discharge module 20.

The discharge module 23-1 includes a drive signal selection circuit 200 and a plurality of discharge portions 600. In addition, each of the plurality of discharge portions 600 includes a piezoelectric element 60. That is, the discharge module 23-1 includes a plurality of piezoelectric elements 60 having the same number as the plurality of discharge portions 600.

The drive signals COMA1, COMB1, and COMC1, the reference voltage signal VBS, the clock signal SCK1, the print data signal SI1, and the latch signal LAT1 are input to the discharge module 23-1. The drive signals COMA1, COMB1, and COMC1, the clock signal SCK1, the print data signal SI1, and the latch signal LAT1 are input to the drive signal selection circuit 200 included in the discharge module 23-1. The drive signal selection circuit 200 generates a drive signal VOUT by selecting or not selecting each of the drive signals COMA1, COMB1, and COMC1 based on the input clock signal SCK1, the print data signal SI1, and the latch signal LAT1. The drive signal selection circuit 200 supplies the generated drive signal VOUT to one end of the piezoelectric element 60 included in the corresponding discharge portion 600. In addition, a reference voltage signal VBS is supplied to the other end of the piezoelectric element 60. The piezoelectric element 60 is driven by the potential difference between the drive signal VOUT supplied to one end and the reference voltage signal VBS supplied to the other end. As a result, an amount of ink corresponding to the drive amount of the piezoelectric element 60 is discharged from the corresponding discharge portion 600.

Similarly, the discharge module 23-*j* includes the drive signal selection circuit 200 and the plurality of discharge portions 600. In addition, each of the plurality of discharge portions 600 includes a piezoelectric element 60. That is, the discharge module 23-*j* includes a plurality of discharge portions 600 and a plurality of piezoelectric elements 60 having the same number.

The drive signals COMAj, COMBj, and COMCj, the reference voltage signal VBSj, the clock signal SCKj, the print data signal SIj, and the latch signal LATj are input to the discharge module 23-*j*. The drive signals COMAj, COMBj, and COMCj, the clock signal SCKj, the print data signal SIj, and the latch signal LATj are input to the drive signal selection circuit 200 included in the discharge module 23-*j*. The drive signal selection circuit 200 generates a drive signal VOUT by selecting or not selecting each of the drive signals COMAj, COMBj, and COMCj based on the input clock signal SCKj, the print data signal SIj, and the latch signal LATj. The drive signal selection circuit 200 supplies the generated drive signal VOUT to one end of the piezoelectric element 60 included in the corresponding discharge portion 600. In addition, a reference voltage signal VBS is supplied to the other end of the piezoelectric element 60. The piezoelectric element 60 is driven by the potential difference between the drive signal VOUT supplied to one end and the reference voltage signal VBS supplied to the other end. As a result, an amount of ink corresponding to the drive amount of the piezoelectric element 60 is discharged from the corresponding discharge portion 600.

As described above, in the liquid discharge device 1, the control unit 2 controls the transport of the medium P by the transport unit 4 and controls the operation of the head drive module 10 included in each of the plurality of discharge units 5 to control the discharge of ink from the liquid discharge module 20 based on image data supplied from a host computer (not illustrated). As a result, the liquid discharge device 1 can land a desired amount of ink at a desired position on the medium P. As a result, a desired image is formed on the medium P.

Here, the discharge modules 23-1 to 23-*m* included in the liquid discharge module 20 have the same configuration except that the input signals are different. Therefore, in the following description, when it is not necessary to distinguish the discharge modules 23-1 to 23-*m*, the discharge modules may be simply referred to as a discharge module 23. In this case, the drive signals COMA1 to COMAm input to the discharge module 23 may be referred to as a drive signal COMA, the drive signals COMB1 to COMBm may be referred to as a drive signal COMB, and the drive signals COMC1 to COMCm may be referred to as a drive signal COMC. The clock signals SCK1 to SCKm may be referred to as a clock signal SCK, the print data signals SI1 to SIm may be referred to as a print data signal SI, and the latch signals LAT1 to LATm may be referred to as a latch signal LAT.

1.2 Functional Configuration of Drive Signal Selection Circuit

Next, the configuration and operation of the drive signal selection circuit 200 included in the discharge module 23 will be described. In describing the configuration and operation of the drive signal selection circuit 200 included in the discharge module 23, first, an example of signal waveforms included in the drive signals COMA, COMB, and COMC input to the drive signal selection circuit 200 will be described.

Figure 3:
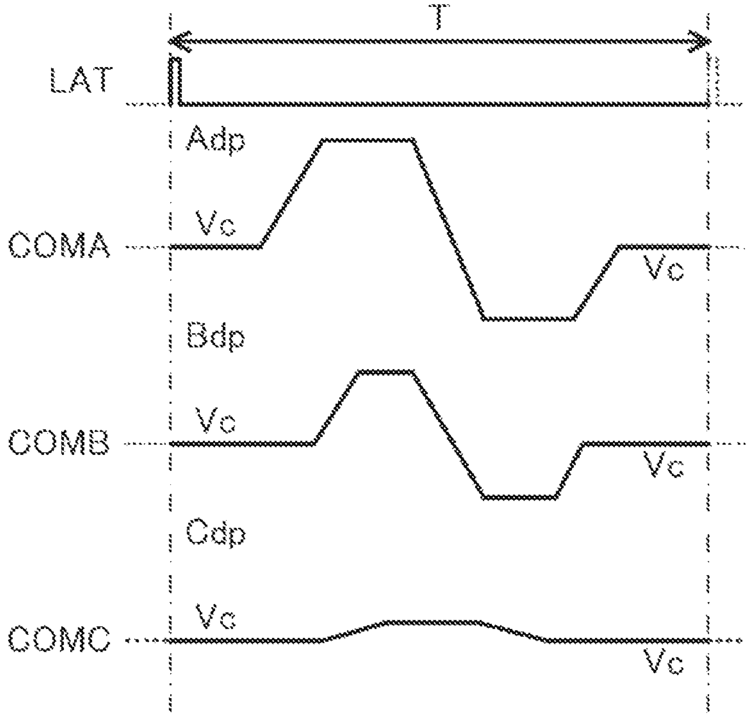
FIG. 3 is a graph illustrating an example of signal waveforms of drive signals.

FIG. 3 is a diagram illustrating an example of the signal waveforms of the drive signals COMA, COMB, and COMC. As illustrated in FIG. 3, the drive signal COMA includes a trapezoidal waveform Adp arranged in a cycle T from the rise of the latch signal LAT to the rise of the next latch signal LAT. The trapezoidal waveform Adp is a signal waveform that drives the piezoelectric element 60 so that a predetermined amount of ink is discharged from the corresponding discharge portion 600 by being supplied to one end of the piezoelectric element 60.

The drive signal COMB includes a trapezoidal waveform Bdp arranged in the cycle T. The trapezoidal waveform Bdp is a signal waveform whose voltage amplitude is smaller than that of the trapezoidal waveform Adp, and when the trapezoidal waveform Bdp is supplied to one end of the piezoelectric element 60, a smaller amount of ink than a predetermined amount is discharged from the discharge portion 600 corresponding to the piezoelectric element 60. That is, the trapezoidal waveform Bdp is a signal waveform that drives the piezoelectric element 60 so that a smaller amount of ink than a predetermined amount is discharged from the corresponding discharge portion 600 by being supplied to one end of the piezoelectric element 60.

Here, the amount of ink discharged from the discharge portion 600 corresponding to the case where the drive signal COMA is supplied to the piezoelectric element 60 is larger than the amount of ink discharged from the discharge portion 600 corresponding to the case where the drive signal COMB is supplied to the piezoelectric element 60. Therefore, the drive amount of the piezoelectric element 60 when the drive signal COMA is supplied to the piezoelectric element 60 is larger than the drive amount of the piezoelectric element 60 when the drive signal COMB is supplied to the piezoelectric element 60. In other words, the amount of ink discharged from the discharge portion 600 corresponding to the piezoelectric element 60 when the drive signal COMA is supplied to the piezoelectric element 60 is different from the amount of ink discharged from the discharge portion 600 corresponding to the piezoelectric element 60 when the drive signal COMB is supplied to the piezoelectric element 60. The amount of ink discharged from the discharge portion 600 corresponding to the piezoelectric element 60 when the drive signal COMA is supplied to the piezoelectric element 60 is larger than the amount of ink discharged from the discharge portion 600 corresponding to the piezoelectric element 60 when the drive signal COMB is supplied to the piezoelectric element 60. Therefore, the amount of current generated by the propagation of the drive signal COMA is larger than the amount of current generated by the propagation of the drive signal COMB.

In addition, the drive signal COMC includes a trapezoidal waveform Cdp arranged in the cycle T. The trapezoidal waveform Cdp is a signal waveform whose voltage amplitude is smaller than that of the trapezoidal waveforms Adp and Bdp, and when the trapezoidal waveform Cdp is supplied to one end of the piezoelectric element 60, the ink in the vicinity of a nozzle opening portion is vibrated to such an extent that the ink is not discharged from the discharge portion 600 corresponding to the piezoelectric element 60. That is, the trapezoidal waveform Cdp is a signal waveform that drives the piezoelectric element 60 to such an extent that ink is not discharged from the corresponding discharge portion 600 by being supplied to one end of the piezoelectric element 60. The trapezoidal waveform Cdp vibrates the ink in the vicinity of the nozzle opening portion of the discharge portion 600 including the piezoelectric element 60. As a result, the possibility that the viscosity of the ink increases in the vicinity of the corresponding nozzle opening portion is reduced.

As described above, the drive signals COMA and COMB drive the corresponding piezoelectric element 60 so that the ink is discharged from the discharge portion 600, and the drive signal COMC drives the corresponding piezoelectric element 60 so that the ink is not discharged from the discharge portion 600. That is, the drive amount of the piezoelectric element 60 when the drive signals COMA and COMB are supplied to the piezoelectric element 60 is larger than the drive amount of the piezoelectric element 60 when the drive signal COMC is supplied to the piezoelectric element 60. Therefore, the voltage amplitude of the drive signals COMA and COMB is larger than the voltage amplitude of the drive signal COMC, and the amount of current generated by the propagation of the drive signals COMA and COMB is larger than the amount of current generated by the propagation of the drive signal COMC.

In addition, at the start timing and end timing of each of the trapezoidal waveforms Adp, Bdp, and Cdp, the voltage values of the trapezoidal waveforms Adp, Bdp, and Cdp are all common to the voltage Vc. That is, each of the trapezoidal waveforms Adp, Bdp, and Cdp are signal waveforms that start at the voltage Vc and end at the voltage Vc.

Here, in the following description, when the trapezoidal waveform Adp is supplied to one end of the piezoelectric element 60, the amount of ink discharged from the discharge portion 600 corresponding to the piezoelectric element 60 may be referred to as a large amount. When the trapezoidal waveform Bdp is supplied to one end of the piezoelectric element 60, the amount of ink discharged from the discharge portion 600 corresponding to the piezoelectric element 60 may be referred to as a small amount different from a large amount. In addition, when the trapezoidal waveform Cdp is supplied to one end of the piezoelectric element 60, the fact that the ink in the vicinity of the nozzle opening portion is vibrated to such an extent that the ink is not discharged from the discharge portion 600 corresponding to the piezoelectric element 60 may be referred to as micro-vibration BSD.

That is, in the liquid discharge device 1 of the first embodiment, the drive circuit **52*a* outputs a drive signal COMA that drives the piezoelectric element 60 so that the discharge portion 600 included in the discharge module 23 discharges a predetermined amount of ink, which is a large amount. The drive circuit 52*b* outputs a drive signal COMB that drives the piezoelectric element 60 so that the discharge portion 600 included in the discharge module 23 discharges an amount smaller than a predetermined amount and a small amount of ink. The drive circuit 52*c* outputs a drive signal COMC that drives the piezoelectric element 60 so that the discharge portion 600 included in the discharge module 23 does not discharge ink. In other words, when the drive signal COMA is supplied to the piezoelectric element 60, a large amount of liquid is discharged from the corresponding discharge portion 600, and when the drive signal COMB is supplied to the piezoelectric element 60, a small amount of ink different from a large amount is discharged from the corresponding discharge portion 600**.

The signal waveforms of the drive signals COMA, COMB, and COMC are not limited to the shapes illustrated in FIG. 3, and signal waveforms having various shapes may be used depending on the type of ink discharged from the discharge portion 600, the number of piezoelectric elements 60 driven by drive signals COMA, COMB, and COMC, the wiring length propagated by the drive signals COMA, COMB, and COMC, and the like. Therefore, the drive signals COMA1 to COMAm may have signal waveforms having different shapes from each other, and the amount of ink discharged from the corresponding discharge portion 600 by the drive signal COMA1 and the amount of ink discharged from the corresponding discharge portion 600 by the drive signal COMAj may be different from each other. Similarly, the drive signals COMB1 to COMBm may have signal waveforms having different shapes from each other, and the amount of ink discharged from the corresponding discharge portion 600 by the drive signal COMB1 and the amount of ink discharged from the corresponding discharge portion 600 by the drive signal COMBj may be different from each other. Similarly, the drive signals COMC1 to COMCm may have signal waveforms having different shapes from each other, and the displacement amount of the piezoelectric element 60 generated by the drive signal COMC1 and the displacement amount of the piezoelectric element 60 generated by the drive signal COMCj may be different from each other.

Figure 4:
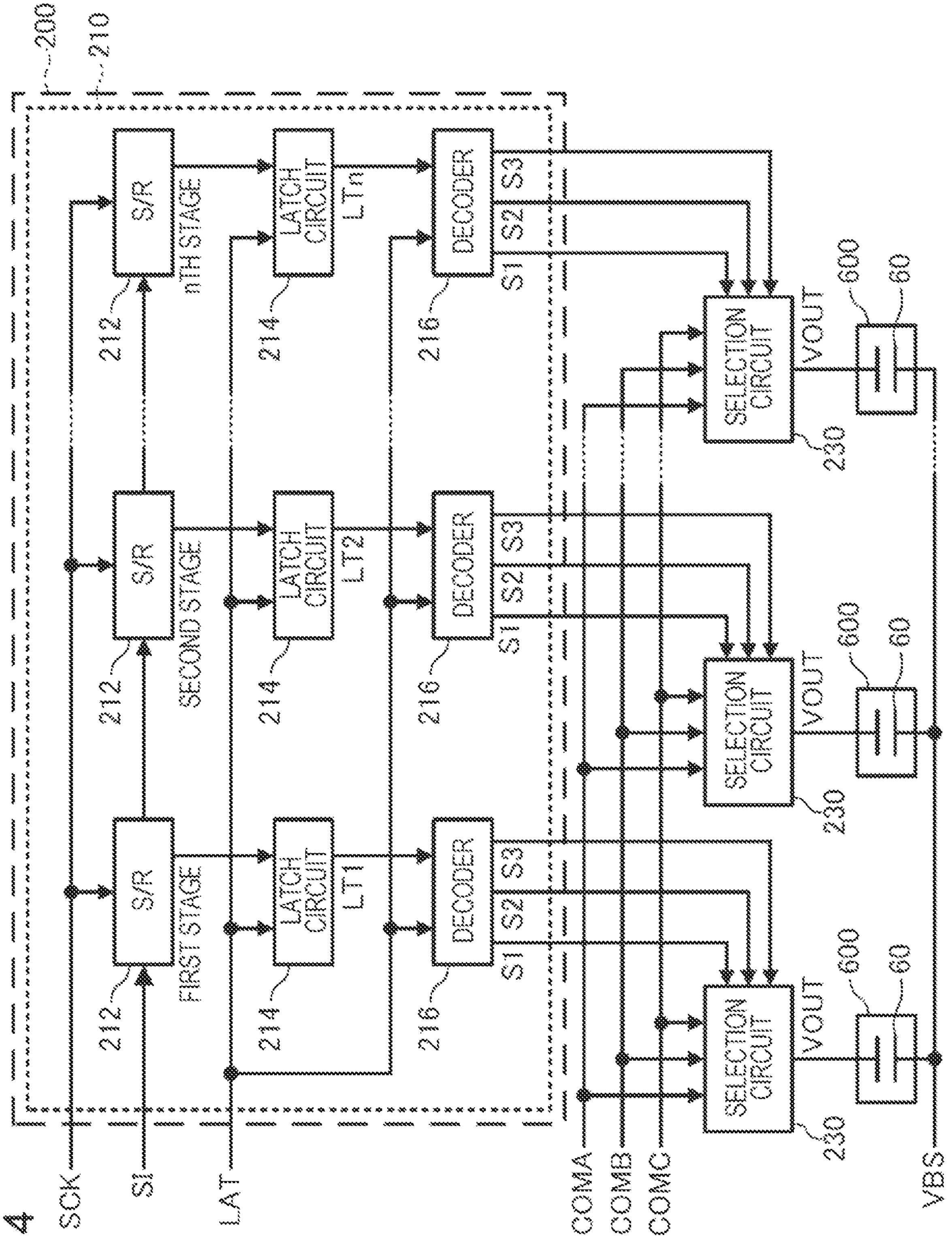
FIG. 4 is a diagram illustrating a functional configuration of a drive signal selection circuit.

Next, the configuration and operation of the drive signal selection circuit 200 that outputs the drive signal VOUT by selecting or not selecting each of the drive signals COMA, COMB, and COMC will be described. FIG. 4 is a diagram illustrating a functional configuration of the drive signal selection circuit 200. As illustrated in FIG. 4, the drive signal selection circuit 200 includes a selection control circuit 210 and a plurality of selection circuits 230.

The print data signal SI, the latch signal LAT, and the clock signal SCK are input to the selection control circuit 210. In addition, the selection control circuit 210 includes n set of a shift register (S/R) 212, a latch circuit 214, and a decoder 216 corresponding to each of the n discharge portions 600. That is, the drive signal selection circuit 200 includes n shift registers 212, n latch circuits 214, and n decoders 216, which are the same number as n discharge portions 600.

The print data signal SI is a signal synchronized with the clock signal SCK, and includes 2-bit print data [SIH, SIL] for defining the dot size formed by the ink discharged from each of the n discharge portions 600 by any of "large dot LD", "small dot SD", "non-discharge ND", and "micro-vibration BSD". This print data signal SI is held in the shift register 212 corresponding to the discharge portion 600 for each 2-bit print data [SIH, SIL].

Specifically, the n shift registers 212 corresponding to the discharge portion 600 are coupled in cascade to each other. The 2-bit print data [SIH, SIL] included in the print data signal SI is sequentially transferred to the subsequent stage of the shift register 212 sequentially coupled in cascade according to the clock signal SCK. When the supply of the clock signal SCK is stopped, the 2-bit print data [SIH, SIL] corresponding to the discharge portion 600 corresponding to the shift register 212 is held in the n shift registers 212. In FIG. 4, in order to distinguish the n shift registers 212 coupled in cascade, the shift registers are illustrated as the first stage, the second stage, . . . , and the Nth stage from the upstream to the downstream where the print data signal SI is input.

Each of the n latch circuits 214 latches simultaneously the 2-bit print data [SIH, SIL] held in the corresponding shift register 212 at the rise of the latch signal LAT.

Figures 5, 6:
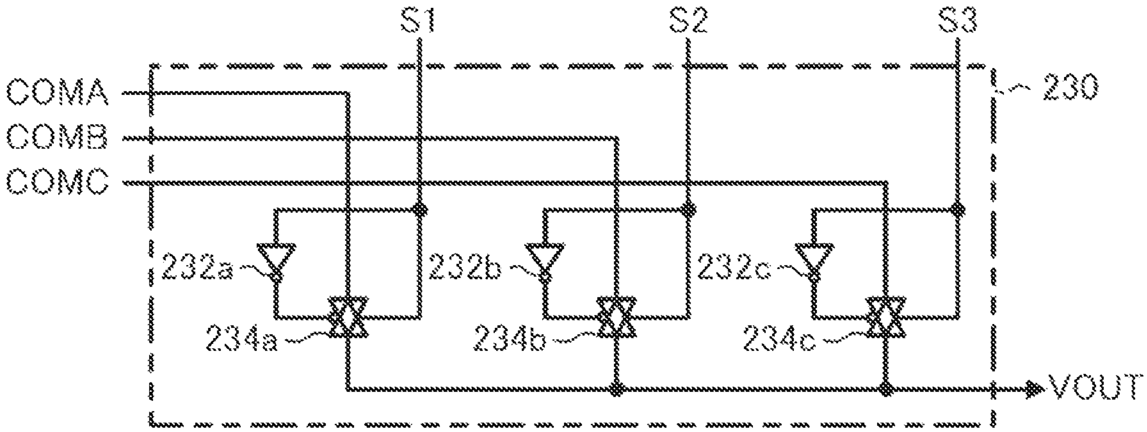
FIG. 5 is a table illustrating an example of a decoding content in a decoder.
FIG. 6 is a diagram illustrating an example of a configuration of a selection circuit corresponding to one discharge portion.

The 2-bit print data [SIH, SIL] latched by the latch circuit 214 is input to the corresponding decoder 216. Each of the n decoders 216 decodes the input 2-bit print data [SIH, SIL], and outputs the selection signals S1, S2, and S3 of the logic level according to a decoding content for each cycle T. FIG. 5 is a table illustrating an example of the decoding content in the decoder 216. The decoder 216 outputs the input 2-bit print data [SIH, SIL] and the selection signals S1, S2, and S3 of the logic level defined by the decoding content illustrated in FIG. 5. For example, when the 2-bit print data [SIH, SIL] input to the decoder 216 is [1,0], the decoder 216 sets the logic level of each of the selection signals S1, S2, and S3 to the L, H, and L levels in the cycle T.

Returning to FIG. 4, the selection circuit 230 is provided corresponding to each of the n discharge portions 600. That is, the drive signal selection circuit 200 includes n selection circuits 230. The selection signals S1, S2, and S3 output by the decoder 216 corresponding to the same discharge portion 600 and the drive signals COMA, COMB, and COMC are input to the selection circuit 230. The selection circuit 230 generates a drive signal VOUT by selecting or not selecting each of the drive signals COMA, COMB, and COMC based on the selection signals S1, S2, and S3, and outputs the drive signal VOUT to the corresponding discharge portion 600.

FIG. 6 is a diagram illustrating an example of a configuration of the selection circuit 230 corresponding to one discharge portion 600. As illustrated in FIG. 6, the selection circuit 230 includes inverters 232*a*, 232*b*, and 232*c* and transfer gates 234*a*, 234*b*, and 234*c*.

The selection signal S1 is input to a positive control end not marked with a circle at the transfer gate 234*a*, and is also input to the negative control end marked with a circle in the transfer gate 234*a* after being logically inverted by the inverter 232*a*. The drive signal COMA is input to an input terminal of the transfer gate 234*a*. The transfer gate 234*a* is conductive between the input terminal and the output terminal when the input selection signal S1 is H level, and is non-conductive between the input terminal and the output terminal when the input selection signal S1 is L level. That is, the transfer gate 234*a* outputs the drive signal COMA to the output terminal when the selection signal S1 is H level, and does not output the drive signal COMA to the output terminal when the selection signal S1 is L level.

The selection signal S2 is input to a positive control end not marked with a circle in the transfer gate 234*b*, and is also input to the negative control end marked with a circle in the transfer gate 234*b* after being logically inverted by the inverter 232*b*. The drive signal COMB is input to the input terminal of the transfer gate 234*b*. The transfer gate 234*b* is conductive between the input terminal and the output terminal when the input selection signal S2 is H level, and is non-conductive between the input terminal and the output terminal when the input selection signal S2 is L level. That is, the transfer gate 234*b* outputs the drive signal COMB to the output terminal when the selection signal S2 is H level, and does not output the drive signal COMB to the output terminal when the selection signal S2 is L level.

The selection signal S3 is input to a positive control end not marked with a circle in the transfer gate 234*c*, and is also input to the negative control end marked with a circle in the transfer gate 234*c* after being logically inverted by the inverter 232*c*. In addition, the drive signal COMC is input to the input terminal of the transfer gate 234*c*. The transfer gate 234*c* is conductive between the input terminal and the output terminal when the input selection signal S3 is H level, and is non-conductive between the input terminal and the output terminal when the input selection signal S3 is L level. That is, the transfer gate 234*c* outputs the drive signal COMC to the output terminal when the selection signal S3 is H level, and does not output the drive signal COMC to the output terminal when the selection signal S3 is L level.

In the selection circuit 230, the output terminals of the transfer gates 234*a*, 234*b*, and 234*c* are commonly coupled. That is, the drive signals COMA, COMB, and COMC selected or not selected by each of the selection signals S1, S2, and S3 are output from the output terminals of the transfer gates 234*a*, 234*b*, and 234*c* commonly coupled. The drive signal selection circuit 200 supplies the signals at the output terminals of the transfer gates 234*a*, 234*b*, and 234*c* to the piezoelectric element 60 included in the corresponding discharge portion 600 as the drive signal VOUT.

Figure 7:
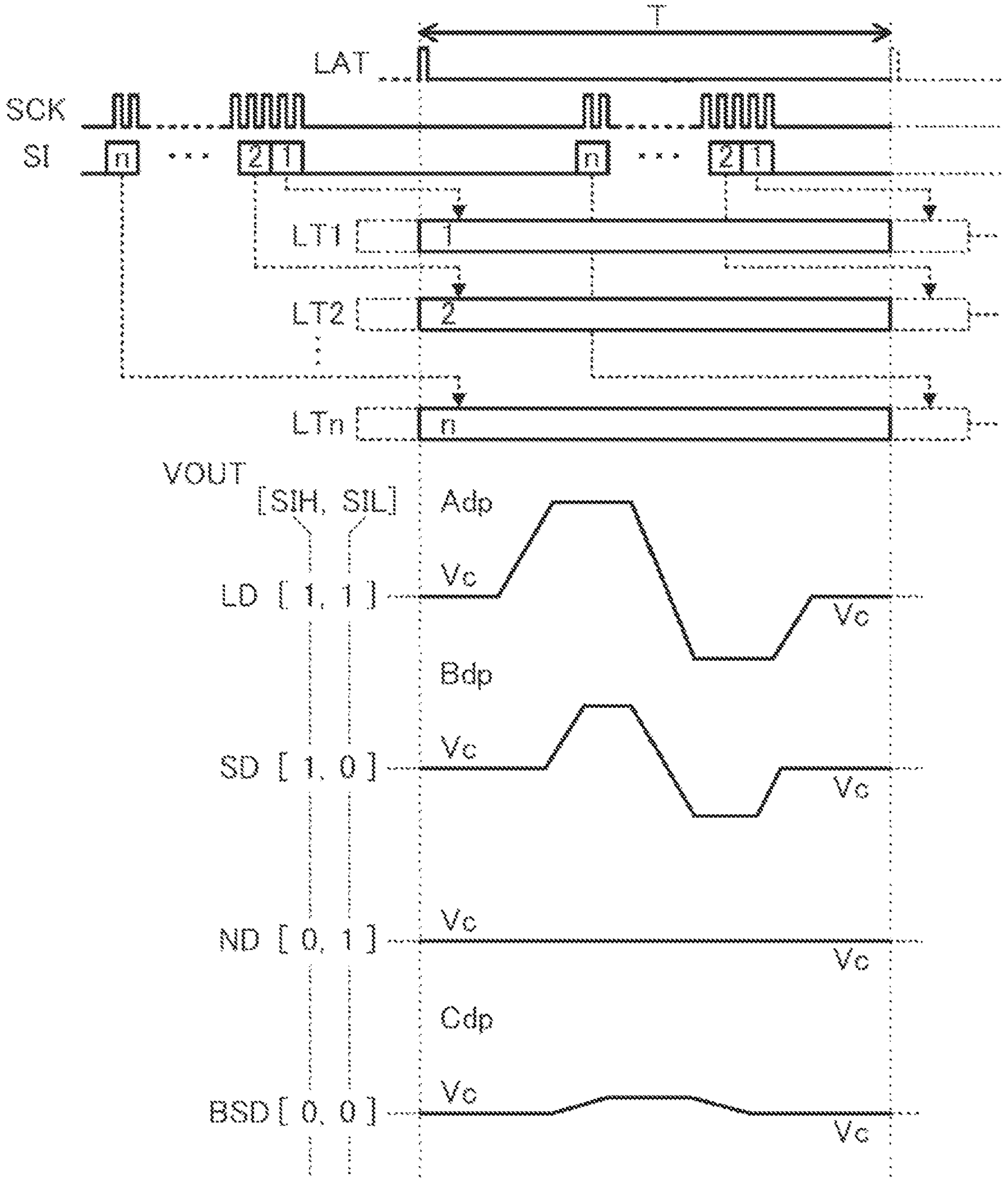
FIG. 7 is a graph for describing an operation of the drive signal selection circuit.

The operation of the drive signal selection circuit 200 configured as described above will be described. FIG. 7 is a diagram for describing the operation of the drive signal selection circuit 200. The print data signal SI is a signal serially including 2-bit print data [SIH, SIL] and is input to the drive signal selection circuit 200 in synchronization with the clock signal SCK. The 2-bit print data [SIH, SIL] included in the print data signal SI is sequentially transferred to the shift register 212 in the subsequent stage in synchronization with the clock signal SCK. Thereafter, when the input of the clock signal SCK is stopped, the 2-bit print data [SIH, SIL] corresponding to each of the discharge portions 600 is held in the shift register 212 corresponding to the same discharge portions 600.

Thereafter, when the latch signal LAT rises, the latch circuit 214 simultaneously latches the 2-bit print data [SIH, SIL] held in the shift register 212. In FIG. 7, the 2-bit print data [SIH, SIL] corresponding to each of the shift registers 212 of the first stage, the second stage, . . . , and the Nth stage latched by the latch circuit 214 is illustrated as LT1, LT2, . . . , and LTn.

The 2-bit print data [SIH, SIL] latched by the latch circuit 214 is input to the decoder 216. The decoder 216 outputs the selection signals S1, S2, and S3 of the logic level according to the dot size defined by the input 2-bit print data [SIH, SIL].

Specifically, when the input 2-bit print data [SIH, SIL] is [1, 1], the decoder 216 outputs the logic level of each of the selection signals S1, S2, and S3 to the selection circuit 230 as the H, L, and L levels in the cycle T. As a result, the selection circuit 230 selects the trapezoidal waveform Adp in the cycle T. As a result, the drive signal VOUT corresponding to the "large dot LD" illustrated in FIG. 7 is output from the drive signal selection circuit 200.

In addition, when the input 2-bit print data [SIH, SIL] is [1, 0], the decoder 216 outputs the logic level of each of the selection signals S1, S2, and S3 to the selection circuit 230 as the L, H, and L levels in the cycle T. As a result, the selection circuit 230 selects the trapezoidal waveform Bdp in the cycle T. As a result, the drive signal VOUT corresponding to the "small dot SD" illustrated in FIG. 7 is output from the drive signal selection circuit 200.

In addition, when the input 2-bit print data [SIH, SIL] is [0, 1], the decoder 216 outputs the logic level of each of the selection signals S1, S2, and S3 to the selection circuit 230 as the L, L, and L levels in the cycle T. As a result, the selection circuit 230 does not select any of the trapezoidal waveforms Adp, Bdp, and Cdp in the cycle T. As a result, the drive signal VOUT corresponding to the "non-discharge ND" illustrated in FIG. 7 is output from the drive signal selection circuit 200.

Here, when the selection circuit 230 does not select any of the trapezoidal waveforms Adp, Bdp, and Cdp, the voltage Vc supplied immediately before the piezoelectric element 60 is held by the capacitance component of the piezoelectric element 60 at one end of the corresponding piezoelectric element 60. That is, the fact that a constant drive signal VOUT is output from the drive signal selection circuit 200 at the voltage Vc includes a case where the voltage Vc immediately before being held by the capacitance component of the piezoelectric element 60 is supplied to the piezoelectric element 60 as the drive signal VOUT, when none of the trapezoidal waveforms Adp, Bdp, and Cdp is selected as the drive signal VOUT.

In addition, when the input 2-bit print data [SIH, SIL] is [0, 0], the decoder 216 outputs the logic level of each of the selection signals S1, S2, and S3 to the selection circuit 230 as the L, L, and H levels in the cycle T. As a result, the selection circuit 230 selects the trapezoidal waveform Cdp in the cycle T. As a result, the drive signal VOUT corresponding to the "micro-vibration BSD" illustrated in FIG. 7 is output from the drive signal selection circuit 200.

As described above, the drive signal selection circuit 200 generates a drive signal VOUT corresponding to each of the plurality of discharge portions 600 by selecting or not selecting the drive signals COMA, COMB, and COMC based on the print data signal SI, the latch signal LAT, and the clock signal SCK, and outputs the drive signal VOUT to the corresponding discharge portion 600. As a result, the amount of ink discharged from each of the plurality of discharge portions 600 is individually controlled.

In addition, in the liquid discharge device 1 according to the first embodiment, when a large dot is formed on the medium P, the drive signal selection circuit 200 supplies the drive signal COMA output by the drive circuit 52*a* to the discharge portion 600 as the drive signal VOUT. When a small dot is formed on the medium P, the drive signal selection circuit 200 supplies the drive signal COMB output by the drive circuit 52*b* to the discharge portion 600 as the drive signal VOUT. That is, the drive signal selection circuit 200 may select either the drive signal COMA or COMB according to the dot size formed on the medium P. Therefore, the waveform cycle of the drive signals COMA and COMB can be shortened as compared with the configuration in which one drive signal includes a plurality of signal waveforms and the dot size formed in the medium P is defined by selecting the signal waveform in a time division manner. As a result, the image formation speed at which the liquid discharge device 1 forms a desired image on the medium P can be increased.

Furthermore, in the liquid discharge device 1 according to the first embodiment, by including the drive signal COMC that drives the piezoelectric element 60 so as not to discharge ink on the medium P in addition to the drive signals COMA and COMB, it is possible to reduce the possibility that the discharge abnormality due to the thickening of the ink viscosity occurs in the discharge portion 600 without reducing the image formation speed at which the desired image is formed on the medium P. That is, in the liquid discharge device 1 according to the first embodiment, by having the drive signal COMC in addition to the drive signals COMA and COMB, it is possible to increase the image formation speed at which the desired image is formed on the medium P without deteriorating the image quality formed on the medium P, and it is possible to reduce the possibility that the ink discharge accuracy is lowered.

Here, the drive signal VOUT supplied to the piezoelectric element 60 is generated by selecting the signal waveform included in each of the drive signals COMA, COMB, and COMC. That is, when the drive signal selection circuit 200 selects the drive signal COMA, the drive signal COMA is supplied to the corresponding piezoelectric element 60 as the drive signal VOUT, when the drive signal selection circuit 200 selects the drive signal COMB, the drive signal COMB is supplied to the corresponding piezoelectric element 60 as the drive signal VOUT, and when the drive signal selection circuit 200 selects the drive signal COMC, the drive signal COMC is supplied to the corresponding piezoelectric element 60 as the drive signal VOUT. That is, the drive circuit 52*a* outputs the drive signal COMA supplied to the piezoelectric element 60, the drive circuit 52*b* outputs the drive signal COMB supplied to the piezoelectric element 60, and the drive circuit 52*c* outputs the drive signal COMC supplied to the piezoelectric element 60.

1.3 Configuration of Drive Signal Output Circuit

Figure 8:
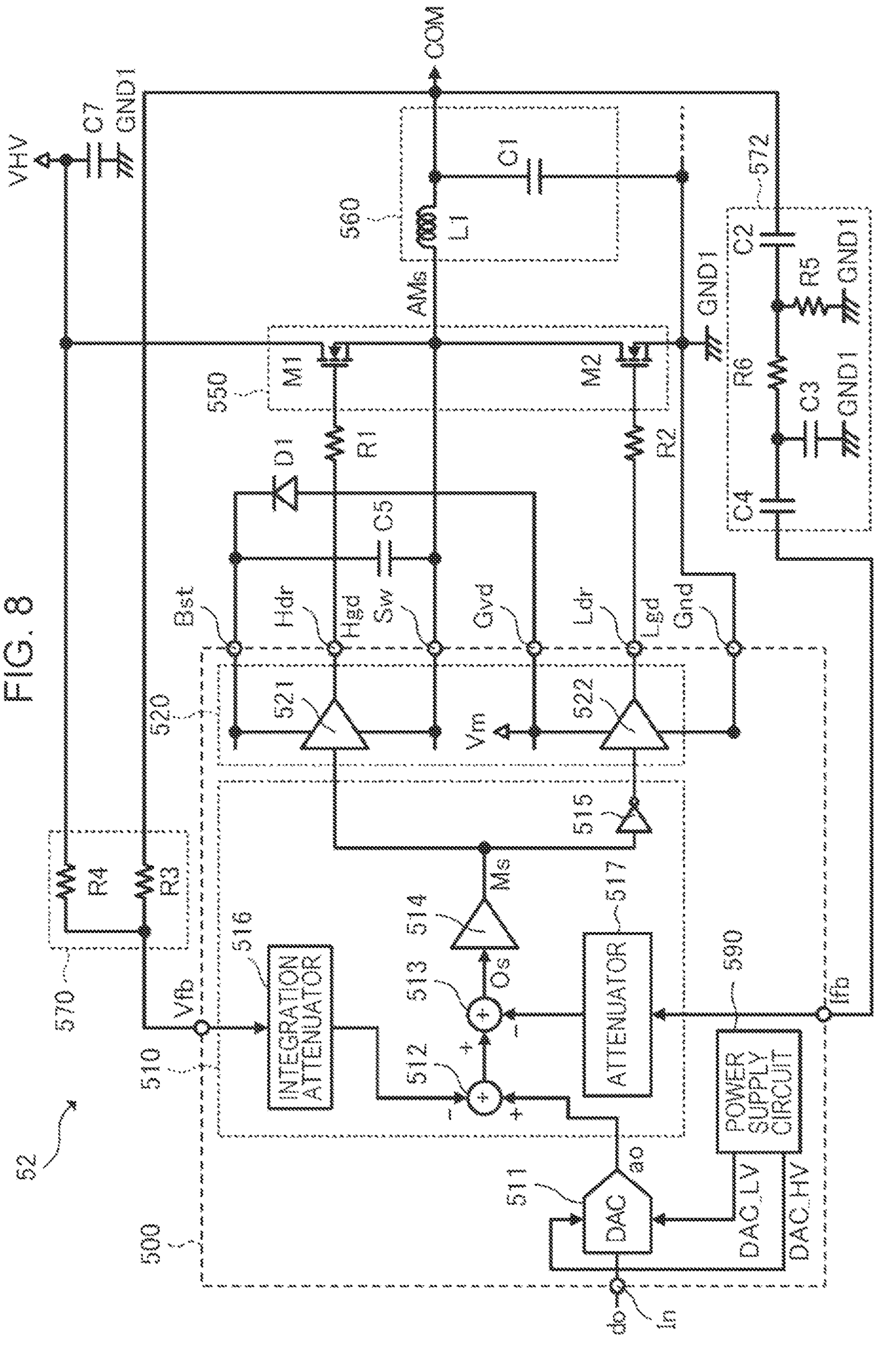
FIG. 8 is a diagram illustrating a configuration of a drive circuit.

Next, the configuration and operation of the drive circuit 52 that outputs the drive signal COM will be described. FIG. 8 is a diagram illustrating the configuration of the drive circuit 52. The drive circuit 52 includes an integrated circuit 500, an amplifier circuit 550, a demodulation circuit 560, feedback circuits 570 and 572, and other electronic components.

The integrated circuit 500 includes a plurality of terminals including a terminal In, a terminal Bst, a terminal Hdr, a terminal Sw, a terminal Gvd, a terminal Ldr, and a terminal Gnd. The integrated circuit 500 is electrically coupled to an externally provided substrate (not illustrated) via the plurality of terminals. In addition, the integrated circuit 500 includes a digital to analog converter (DAC) 511, a modulation circuit 510, a gate drive circuit 520, and a power supply circuit 590.

The power supply circuit 590 generates a voltage signal DAC_HV and a voltage signal DAC_LV and supplies the voltage signals to the DAC 511. In addition, a digital basic drive signal do that defines the signal waveform of the drive signal COM is input to the DAC 511. The DAC 511 converts the input basic drive signal do into a basic drive signal ao that is an analog signal of the voltage value between the voltage signal DAC_HV and the voltage signal DAC_LV, and outputs the basic drive signal ao to the modulation circuit 510. That is, the maximum value of the voltage amplitude of the basic drive signal ao is defined by the voltage signal DAC_HV, and the minimum value is defined by the voltage signal DAC_LV. The signal obtained by amplifying the analog basic drive signal ao output by the DAC 511 corresponds to the drive signal COM. That is, the basic drive signal ao corresponds to a target signal before amplification of the drive signal COM.

The modulation circuit 510 generates a modulation signal Ms obtained by modulating the basic drive signal ao and outputs the modulation signal Ms to the gate drive circuit 520. The modulation circuit 510 includes adders 512 and 513, a comparator 514, an inverter 515, an integration attenuator 516, and an attenuator 517.

The integration attenuator 516 attenuates and integrates the drive signal COM input via a terminal Vfb and supplies the drive signal COM to the input terminal on the − side of the adder 512. The basic drive signal ao is input to the input terminal on the + side of the adder 512. The adder 512 supplies the voltage obtained by subtracting and integrating the voltage input to the input terminal on the − side from the voltage input to the input terminal on the + side to the input terminal on the + side of the adder 513.

The attenuator 517 supplies a voltage obtained by attenuating the high frequency component of the drive signal COM input via a terminal Ifb to the input terminal on the − side of the adder 513. The voltage output from the adder 512 is input to the input terminal on the + side of the adder 513. The adder 513 generates a voltage signal Os obtained by subtracting the voltage input to the input terminal on the − side from the voltage input to the input terminal on the + side, and outputs the voltage signal Os to the comparator 514.

The comparator 514 outputs a modulation signal Ms obtained by pulse-modulating the voltage signal Os input from the adder 513. Specifically, the comparator 514 generates and outputs the modulation signal Ms that is an H level when the voltage value of the voltage signal Os input from the adder 513 is a predetermined threshold value Vth1 or more when the voltage value is increased, and that is L level when the voltage value of the voltage signal Os falls below a predetermined threshold value Vth2 when the voltage value is lowered. Here, the threshold values Vth1 and Vth2 are set in the relationship of threshold value Vth1=>threshold value Vth2.

The modulation signal Ms output by the comparator 514 is input to the gate driver 521 included in the gate drive circuit 520, and is also input to the gate driver 522 included in the gate drive circuit 520 via the inverter 515. That is, a signal having a relation in which the logic levels are exclusive is input to the gate driver 521 and the gate driver 522. Here, the relationship in which the logic levels are exclusive includes that the logic levels of the signals input to the gate driver 521 and the gate driver 522 do not simultaneously be the H level. Therefore, the modulation circuit 510 may include a timing control circuit for controlling the timing of the modulation signal Ms input to the gate driver 521 in place of or in addition to the inverter 515 and the signal in which the logic level of the modulation signal Ms input to the gate driver 522 is inverted.

The gate drive circuit 520 includes the gate driver 521 and the gate driver 522. The gate driver 521 level-shifts the modulation signal Ms output from the comparator 514 and outputs the modulation signal Ms as an amplification control signal Hgd from the terminal Hdr.

Specifically, the voltage is supplied to the higher side of the power supply voltage of the gate driver 521 via the terminal Bst, and the voltage is supplied to the lower side via the terminal Sw. The terminal Bst is coupled to one end of a capacitor C5 and the cathode of the diode D1 for preventing backflow. The terminal Sw is coupled to the other end of the capacitor C5. In addition, the anode of the diode D1 is coupled to a terminal Gvd to which a voltage Vm, which is a DC voltage of, for example, 7.5 V, is supplied from a power supply circuit (not illustrated). That is, the voltage Vm is supplied to the anode of the diode D1. Therefore, the potential difference between the terminal Bst and the terminal Sw is approximately equal to the voltage Vm. As a result, the gate driver 521 generates an amplification control signal Hgd having a voltage value larger than the terminal Sw by the voltage Vm according to the input modulation signal Ms, and outputs the amplification control signal Hgd from the terminal Hdr.

The gate driver 522 operates on the lower potential side than the gate driver 521. The gate driver 522 level-shifts the signal in which the logic level of the modulation signal Ms output from the comparator 514 is inverted by the inverter 515, and outputs the signal as an amplification control signal Lgd from the terminal Ldr.

Specifically, of the power supply voltage of the gate driver 522, the voltage Vm is supplied to the higher side, and the ground potential GND1 is supplied to the lower side via the terminal Gnd. The gate driver 522 outputs an amplification control signal Lgd having a large voltage value by the voltage Vm with respect to the terminal Gnd from the terminal Ldr according to the signal in which the logic level of the input modulation signal Ms is inverted. Here, the ground potential GND1 is a reference potential of the drive circuit 52, and is, for example, 0 V.

The amplifier circuit 550 includes the transistor M1 and the transistor M2.

The transistor M1 is a surface mount-type field effect transistor (FET), and a voltage VHV, which is a DC voltage of, for example, 42 V, is supplied to the drain of the transistor M1 as a power supply voltage for amplification of the amplifier circuit 550. In addition, the gate of the transistor M1 is electrically coupled to one end of a resistor R1 and the other end of the resistor R1 is electrically coupled to the terminal Hdr of the integrated circuit 500. That is, the amplification control signal Hgd is input to the gate of the transistor M1. In addition, the source of the transistor M1 is electrically coupled to the terminal Sw of the integrated circuit 500.

The transistor M2 is the surface mount-type FET, and a drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of a resistor R2, and the other end of the resistor R2 is electrically coupled to the terminal Ldr of the integrated circuit 500. That is, the amplification control signal Lgd is input to the gate of the transistor M2. In addition, a ground potential GND1 is supplied to the source of the transistor M2.

That is, the drive circuit 52 includes surface mount-type transistors M1 and M2 as amplification transistors. In the amplifier circuit 550, when the drain and the source of the transistor M1 are controlled to be non-conductive and the drain and the source of the transistor M2 are controlled to be conductive, the potential of the node to which the terminal Sw is coupled is the ground potential GND1. Therefore, the voltage Vm is supplied to the terminal Bst. On the other hand, when the drain and the source of the transistor M1 are controlled to be conductive and the drain and the source of the transistor M2 are controlled to be non-conductive, the potential of the node to which the terminal Sw is coupled is the voltage VHV. Therefore, a voltage signal having a potential of voltage VHV+Vm is supplied to the terminal Bst. That is, the gate driver 521 that drives the transistor M1 generates an amplification control signal Hgd of the potential where the L level is the potential of voltage VHV and the H level is voltage VHV+voltage Vm by changing the potential of the terminal Sw to the ground potential GND1 or the voltage VHV according to the operation of the transistor M1 and the transistor M2 using the capacitor C5 as a floating power source, and outputs the amplification control signal Hgd to the gate of the transistor M1.

On the other hand, the gate driver 522 that drives the transistor M2 generates an amplification control signal Lgd of the potential where the L level is the ground potential GND1 and the H level is the voltage Vm, regardless of the operation of the transistor M1 and the transistor M2 and outputs the amplification control signal Lgd to the gate of the transistor M2.

The amplifier circuit 550 configured as described above generates an amplification modulation signal AMs obtained by amplifying the modulation signal Ms based on the voltage VHV at a coupling point between the source of the transistor M1 and the drain of the transistor M2. The amplifier circuit 550 outputs the generated amplification modulation signal AMs to the demodulation circuit 560.

Here, a capacitor C7 is provided in the propagation path through which the voltage VHV input to the amplifier circuit 550 propagates. Specifically, one end of the capacitor C7 is a propagation path through which the voltage VHV propagates, and is electrically coupled to the drain of the transistor M1, and the ground potential GND1 is supplied to the other end of the capacitor C7. As a result, the possibility that the potential of the voltage VHV input to the amplifier circuit 550 fluctuates is reduced, the possibility that noise is superimposed on the voltage VHV is reduced, and the waveform accuracy of the amplification modulation signals AMs output by the amplifier circuit 550 is improved.

The demodulation circuit 560 generates a drive signal COM by demodulating the amplification modulation signal AMs output by the amplifier circuit 550, and outputs the drive signal COM from the drive circuit 52. The demodulation circuit 560 includes an inductor L1 and a capacitor C1. One end of the inductor L1 is coupled to one end of the capacitor C1. The amplification modulation signal AMs is input to the other end of the inductor L1. In addition, a ground potential GND1 is supplied to the other end of the capacitor C1. That is, in the demodulation circuit 560, the inductor L1 and the capacitor C1 form a low pass filter. The demodulation circuit 560 demodulates the amplification modulation signal AMs by smoothing the amplification modulation signal AMs with the low-pass filter, and outputs the demodulated signal as the drive signal COM. That is, the drive circuit 52 outputs the drive signal COM from one end of the inductor L1 included in the demodulation circuit 560 and one end of the capacitor C1.

The feedback circuit 570 includes a resistor R3 and a resistor R4. The drive signal COM is supplied to one end of the resistor R3, and the other end is coupled to the terminal Vfb and one end of the resistor R4. The voltage VHV is supplied to the other end of the resistor R4. As a result, the drive signal COM passed through the feedback circuit 570 is fed back to the terminal Vfb in a state of being pulled up by the voltage VHV.

The feedback circuit 572 includes capacitors C2, C3, and C4 and resistors R5 and R6. The drive signal COM is input to one end of the capacitor C2, and the other end is coupled to one end of the resistor R5 and one end of the resistor R6. The ground potential GND1 is supplied to the other end of the resistor R5. As a result, the capacitor C2 and the resistor R5 function as a high pass filter. In addition, the other end of the resistor R6 is coupled to one end of the capacitor C4 and one end of the capacitor C3. The ground potential GND1 is supplied to the other end of the capacitor C3. As a result, the resistor R6 and the capacitor C3 function as a low pass filter. That is, the feedback circuit 572 includes a high pass filter and a low pass filter, and functions as a band pass filter that passes a signal in a predetermined frequency range included in the drive signal COM.

The other end of the capacitor C4 is coupled to the terminal Ifb of the integrated circuit 500. As a result, among the high frequency components of the drive signal COM passed through the feedback circuit 572 that functions as a band pass filter, the signal in which the DC component is cut is fed back to the terminal Ifb.

The drive signal COM is a signal obtained by smoothing the amplification modulation signal AMs based on the basic drive signal do by the demodulation circuit 560. In addition, the drive signal COM is integrated and subtracted via the terminal Vfb, and then fed back to the adder 512. As a result, the drive circuit 52 self-oscillates at a frequency determined by the feedback delay and the feedback transfer function. However, the feedback path via the terminal Vfb has a large delay amount. Therefore, it may not be possible to raise the frequency of self-oscillation to such an extent that the accuracy of the drive signal COM can be sufficiently ensured only by feedback via the terminal Vfb. Therefore, by providing a path for feeding back the high frequency component of the drive signal COM via the terminal Ifb separately from the path via the terminal Vfb, the delay in the entire circuit is reduced. As a result, the frequency of the voltage signal Os can be increased to such an extent that the accuracy of the drive signal COM can be sufficiently ensured as compared with the case where the path via the terminal Ifb does not exist.

As described above, the drive circuit 52 generates a drive signal COM by performing digital/analog conversion of the input basic drive signal do and then amplifying the analog signal in class D, and outputs the generated drive signal COM.

1.4 Configuration of Liquid Discharge Module

Figure 9:
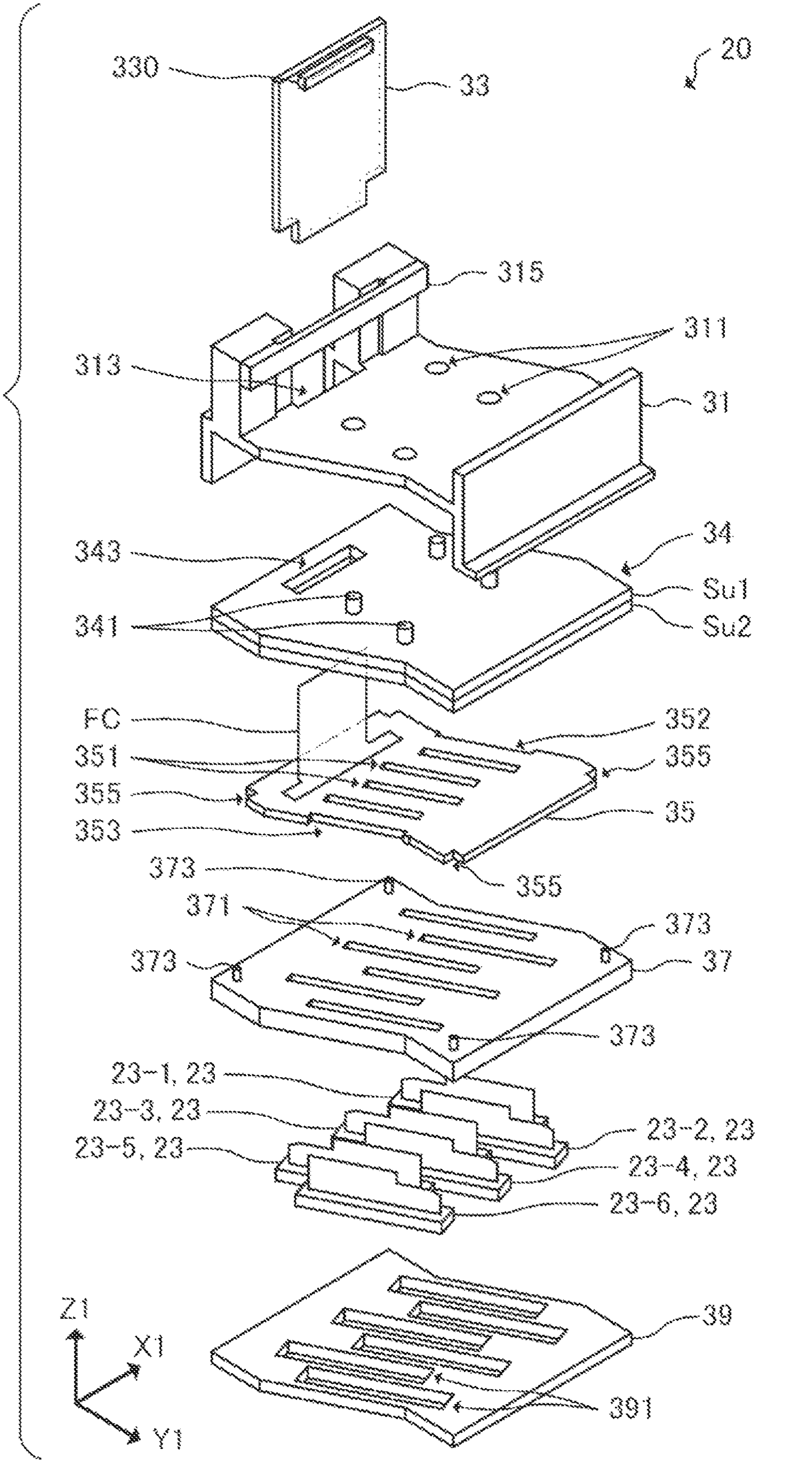
FIG. 9 is a diagram illustrating a structure of a liquid discharge module.
Figure 10:
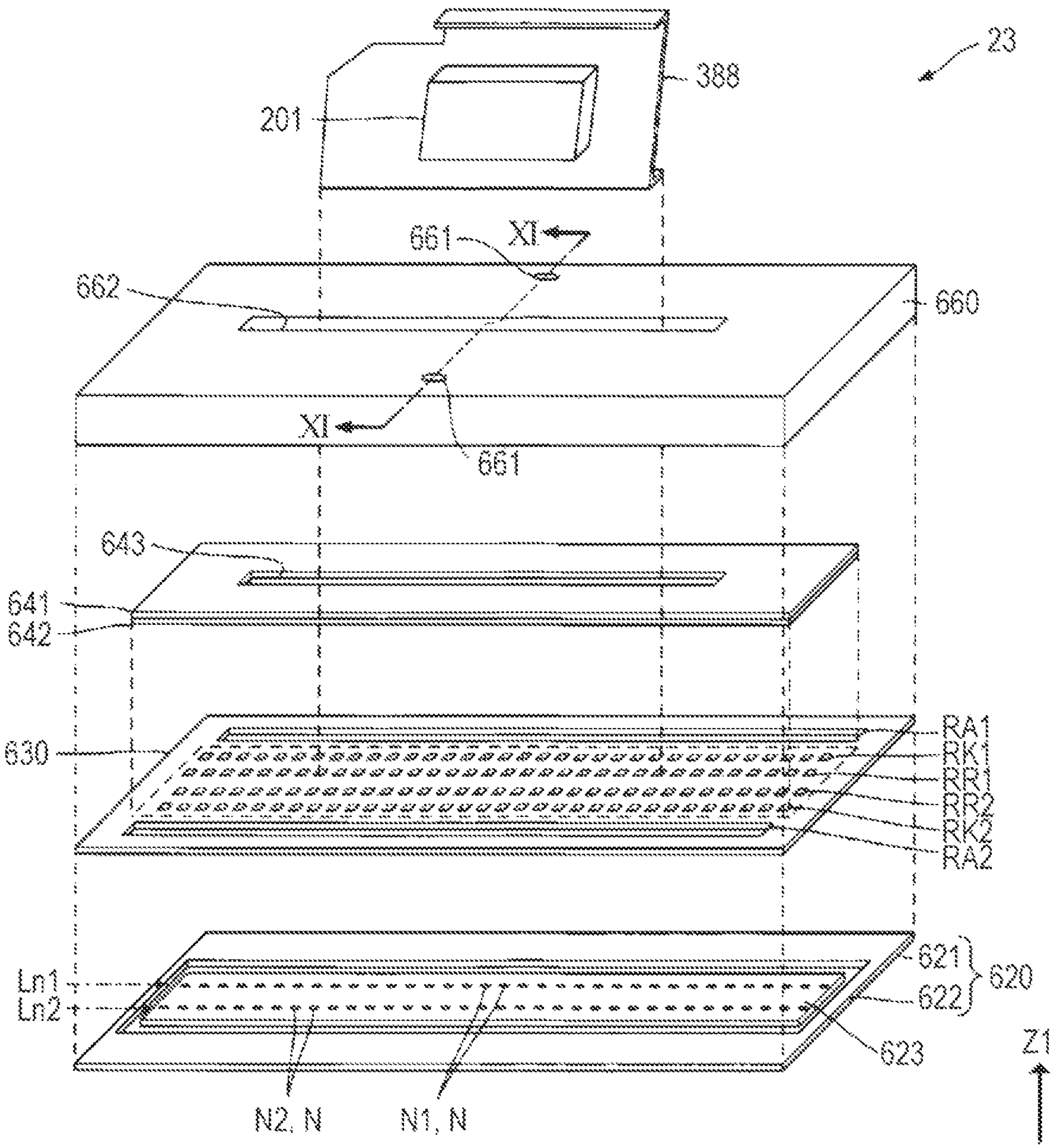
FIG. 10 is a diagram illustrating an example of a structure of a discharge module.
Figure 11:
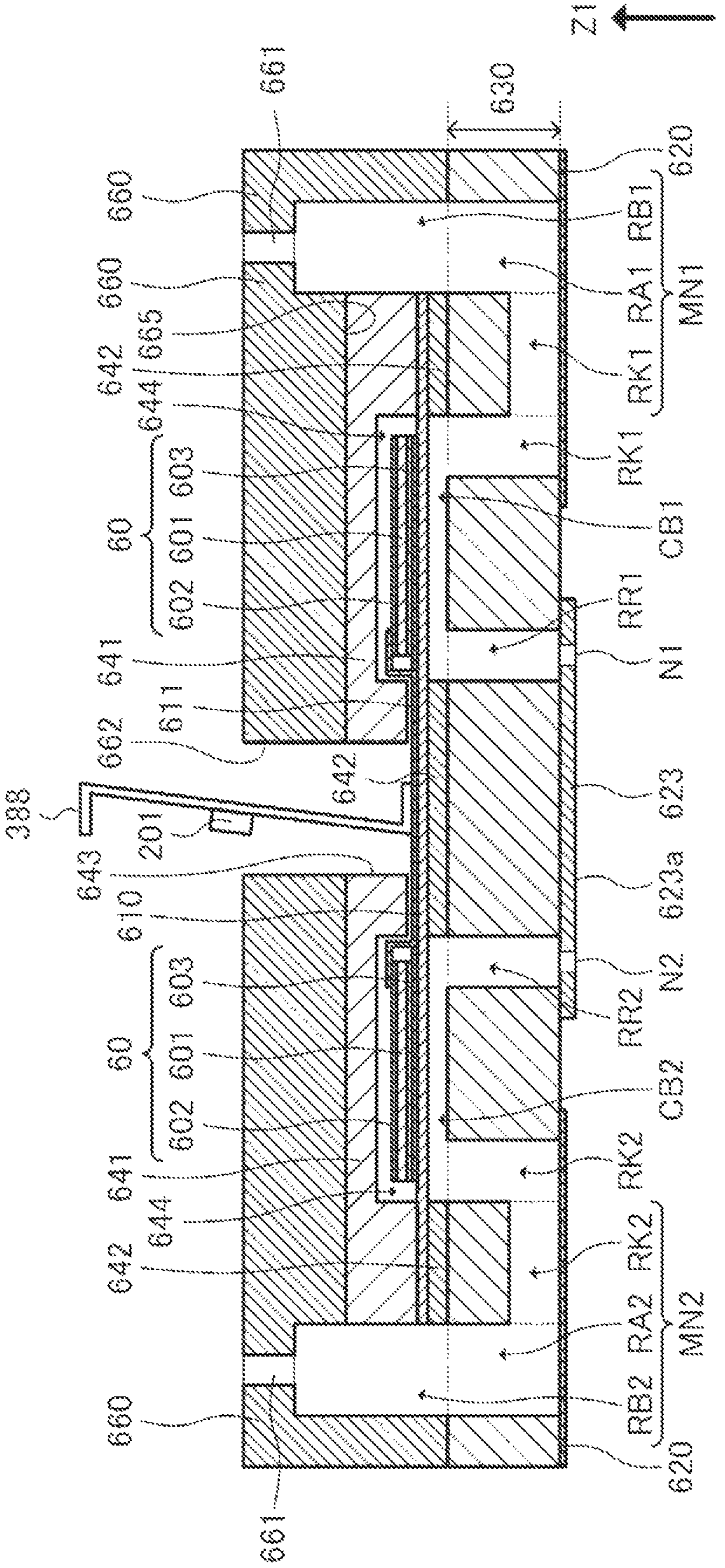
FIG. 11 is a cross-sectional view taken along the line XI-XI illustrated in FIG. 10 when the discharge module is cut.

Next, the structure of the liquid discharge module 20 will be described with reference to FIGS. 9 to 11. FIG. 9 is a diagram illustrating the structure of the liquid discharge module 20. Here, in describing the structure of the liquid discharge module 20, FIGS. 9 to 11 illustrate arrows indicating the X1 direction, the Y1 direction, and the Z1 direction orthogonal to each other. In addition, in the description of FIGS. 9 to 11, the starting point side of the arrow indicating the X1 direction may be referred to as a −X1 side, the tip end side may be referred to as a +X1 side, the starting point side of the arrow indicating the Y1 direction may be referred to as a −Y1 side, the tip end side may be referred to as a +Y1 side, the starting point side of the arrow indicating the Z1 direction may be referred to as a −Z1 side, and the tip end side may be referred to as a +Z1 side. In addition, in the following description, the liquid discharge module 20 will be described as having six discharge modules 23, and when each of the six discharge modules 23 is distinguished, the discharge modules may be referred to as discharge modules 23-1 to 23-6.

As illustrated in FIG. 9, the liquid discharge module 20 includes a housing 31, an aggregate substrate 33, a flow path structure 34, a head substrate 35, a distribution flow path 37, a fixing plate 39, and discharge modules 23-1 to 23-6. In the liquid discharge module 20, the flow path structure 34, the head substrate 35, the distribution flow path 37, and the fixing plate 39 are laminated in the order of the fixing plate 39, the distribution flow path 37, the head substrate 35, and the flow path structure 34 from the −Z1 side to the +Z1 side along the Z1 direction. The housing 31 is located around the flow path structure 34, the head substrate 35, the distribution flow path 37, and the fixing plate 39 so as to support the flow path structure 34, the head substrate 35, the distribution flow path 37, and the fixing plate 39. The aggregate substrate 33 is erected on the +Z1 side of the housing 31 while being held by the housing 31, and the six discharge modules 23 are located between the distribution flow path 37 and the fixing plate 39 so that a part of the six discharge modules 23 is exposed to the outside of the liquid discharge module 20.

In describing the structure of the liquid discharge module 20, first, the structure of the discharge module 23 included in the liquid discharge module 20 will be described. FIG. 10 is a diagram illustrating an example of the structure of the discharge module 23. In addition, FIG. 11 is a diagram illustrating an example of a cross section of the discharge module 23. Here, FIG. 11 is a cross-sectional view of the discharge module 23 when the discharge module 23 is cut along the line XI-XI illustrated in FIG. 10, and the line XI-XI illustrated in FIG. 10 is a virtual line segment that passes through an introduction path 661 of the discharge module 23 and passes through a nozzle N1 and a nozzle N2.

As illustrated in FIGS. 10 and 11, the discharge module 23 includes a plurality of nozzles N1 arranged side by side and a plurality of nozzles N2 arranged side by side. The total number of nozzles N1 and nozzles N2 included in the discharge module 23 is n, which is the same as the number of discharge portions 600 included in the discharge module 23. In the first embodiment, the number of nozzles N1 and the number of nozzles N2 included in the discharge module 23 will be described as being the same. That is, the discharge module 23 includes n/2 nozzles N1 and n/2 nozzles N2. Here, when it is not necessary to distinguish between the nozzle N1 and the nozzle N2 in the following description, the nozzles may be simply referred to as a nozzle N.

The discharge module 23 includes a wiring member 388, a case 660, a protective substrate 641, a flow path formation substrate 642, a communication plate 630, a compliance substrate 620, and a nozzle plate 623.

On the flow path formation substrate 642, pressure chambers CB1 partitioned by a plurality of partition walls by anisotropic etching from one surface side are arranged side by side corresponding to the nozzle N1, and pressure chambers CB2 partitioned by a plurality of partition walls by anisotropic etching from one surface side are arranged side by side corresponding to the nozzle N2. Here, in the following description, when it is not necessary to distinguish between the pressure chamber CB1 and the pressure chamber CB2, the pressure chambers may be simply referred to as a pressure chamber CB.

The nozzle plate 623 is located on the −Z1 side of the flow path formation substrate 642. The nozzle plate 623 is provided with a nozzle row Ln1 formed by n/2 nozzles N1 and a nozzle row Ln2 formed by n/2 nozzles N2. Here, in the following description, the surface of the nozzle plate 623 on which the nozzle N opens on the −Z1 side may be referred to as a liquid ejection surface 623*a*.

The communication plate 630 is located on the −Z1 side of the flow path formation substrate 642 and on the +Z1 side of the nozzle plate 623. The communication plate 630 is provided with a nozzle communication path RR1 that communicates with the pressure chamber CB1 and the nozzle N1, and a nozzle communication path RR2 that communicates with the pressure chamber CB2 and the nozzle N2. In addition, the communication plate 630 is provided with a pressure chamber communication path RK1 for communicating the end portion of the pressure chamber CB1 and a manifold MN1 and a pressure chamber communication path RK2 for communicating the end portion of the pressure chamber CB2 and a manifold MN2 independently corresponding to each of the pressure chambers CB1 and CB2.

The manifold MN1 includes a supply communication path RA1 and a coupling communication path RX1. The supply communication path RA1 is provided so as to penetrate the communication plate 630 along the Z1 direction, and the coupling communication path RX1 opens on the nozzle plate 623 side of the communication plate 630 without penetrating the communication plate 630 in the Z1 direction and is provided halfway in the Z1 direction. Similarly, the manifold MN2 includes a supply communication path RA2 and a coupling communication path RX2. The supply communication path RA2 is provided so as to penetrate the communication plate 630 along the Z1 direction, and the coupling communication path RX2 opens on the nozzle plate 623 side of the communication plate 630, without penetrating the communication plate 630 in the Z1 direction and is provided halfway in the Z1 direction. The coupling communication path RX1 included in the manifold MN1 communicates with the corresponding pressure chamber CB1 by the pressure chamber communication path RK1, and the coupling communication path RX2 included in the manifold MN2 communicates with the corresponding pressure chamber CB2 by the pressure chamber communication path RK2.

Here, in the following description, when it is not necessary to distinguish between the nozzle communication path RR1 and the nozzle communication path RR2, the nozzle communication paths may be simply referred to as a nozzle communication path RR, and it is not necessary to distinguish between the manifold MN1 and the manifold MN2, the manifolds may be simply referred to as a manifold MN. When it is not necessary to distinguish between the supply communication path RA1 and the supply communication path RA2, the supply communication paths may be simply referred to as a supply communication path RA, and when it is not necessary to distinguish between the coupling communication path RX1 and the coupling communication path RX2, the coupling communication paths may be simply referred to as a coupling communication path RX.

A diaphragm 610 is located on the surface of the flow path formation substrate 642 on the +Z1 side. In addition, n piezoelectric elements 60 corresponding to each of the nozzles N1 and N2 are formed in two rows on the surface of the diaphragm 610 on the +Z1 side.

The piezoelectric element 60 has a piezoelectric body 601 and a pair of electrodes 602, 603 provided so as to interpose the piezoelectric body 601. The electrode 602 and the piezoelectric body 601 are formed for each pressure chamber CB on the +Z1 side surface of the diaphragm 610, and the electrode 603 is configured as a common electrode common to the pressure chamber CB on the +Z1 side surface of the diaphragm 610. The piezoelectric element 60 is driven so that the piezoelectric body 601 is displaced in the vertical direction by supplying the drive signal VOUT from the drive signal selection circuit 200 to the electrode 602, and supplying the reference voltage signal VBS to the electrode 603, which is a common electrode.

The protective substrate 641 is bonded to the surface of the flow path formation substrate 642 on the +Z1 side. The protective substrate 641 forms a protective space 644 for protecting the piezoelectric element 60. In addition, the protective substrate 641 is provided with a through-hole 643 penetrating along the Z1 direction. A lead electrode 611 drawn from each of the electrodes 602 and 603 of the piezoelectric element 60 is extended so that the end portion is exposed inside the through-hole 643. The wiring member 388 is electrically coupled to the lead electrode 611 exposed inside the through-hole 643.

In addition, a case 660 that defines a part of the manifold MN communicating with a plurality of pressure chambers CB is fixed to the protective substrate 641 and the communication plate 630. The case 660 is bonded to the protective substrate 641 and also to the communication plate 630. Specifically, the case 660 includes a recessed portion 665 in which the flow path formation substrate 642 and the protective substrate 641 are accommodated on the surface on the −Z1 side. The recessed portion 665 has a wider opening area than that of the surface on which the protective substrate 641 is bonded to the flow path formation substrate 642. The flow path formation substrate 642 or the like is accommodated in the recessed portion 665. The opening surface of the recessed portion 665 on the −Z1 side is sealed by the communication plate 630 in a state where the flow path formation substrate 642 and the like are accommodated in the recessed portion 665. As a result, a supply communication path RB1 and a supply communication path RB2 are defined by the case 660, the flow path formation substrate 642, and the protective substrate 641 on an outer peripheral portion of the flow path formation substrate 642. Here, when it is not necessary to distinguish between the supply communication path RB1 and the supply communication path RB2, the supply communication paths may be simply referred to as a supply communication path RB.

In addition, a compliance substrate 620 is provided on the surface of the communication plate 630 where the supply communication path RA and the coupling communication path RX are opened. The compliance substrate 620 seals the openings of the supply communication path RA and the coupling communication path RX. Such a compliance substrate 620 includes a sealing film 621 and a fixed substrate 622. The sealing film 621 is formed of a flexible thin film or the like, and the fixed substrate 622 is formed of a hard material such as a metal such as stainless steel.

In addition, the case 660 is provided with an introduction path 661 for supplying ink to the manifold MN. Furthermore, the case 660 is an opening that communicates with the through-hole 643 of the protective substrate 641 and penetrates along the Z1 direction, and is provided with a coupling port 662 through which the wiring member 388 is inserted.

The wiring member 388 is a flexible member for electrically coupling the discharge module 23 and the head substrate 35, and for example, an FPC can be used. An integrated circuit 201 is mounted on the wiring member 388 by chip on film (COF). At least a part of the drive signal selection circuit 200 described above is mounted on the integrated circuit 201.

In the discharge module 23 configured as described above, the wiring member 388 propagates the drive signals COMA, COMB, and COMC, the reference voltage signal VBS, the clock signal SCK, the print data signal SI, and the latch signal LAT. Among these signals, the drive signals COMA, COMB, and COMC, the clock signal SCK, the print data signal SI, and the latch signal LAT are input to the drive signal selection circuit 200 including the integrated circuit 201 provided in the wiring member 388. The drive signal selection circuit 200 generates and outputs a drive signal VOUT by selecting or not selecting the drive signals COMA, COMB, and COMC based on the input clock signal SCK, the print data signal SI, and the latch signal LAT. The drive signal VOUT output by the drive signal selection circuit 200 propagates through the wiring member 388 and is supplied to the electrode 602 via the lead electrode 611. In addition, the reference voltage signal VBS propagates through the wiring member 388 and is supplied to the electrode 603 via the lead electrode 611. As a result, the piezoelectric body 601 is deformed according to the potential difference between the drive signal VOUT supplied to the electrode 602 and the reference voltage signal VBS supplied to the electrode 603. That is, the piezoelectric element 60 is driven. As the piezoelectric element 60 is driven, the diaphragm 610 provided with the piezoelectric element 60 is displaced in the vertical direction. As a result, the internal pressure of the corresponding pressure chamber CB changes, and the ink stored inside the pressure chamber CB is discharged from the nozzle N in response to the change in the internal pressure of the pressure chamber CB.

In the discharge module 23 configured as described above, the configuration including the nozzle N, the nozzle communication path RR, the pressure chamber CB, the piezoelectric element 60, and the diaphragm 610 corresponds to the discharge portion 600 described above. That is, the discharge module 23 includes the piezoelectric element 60, and includes a plurality of discharge portions 600 that discharge ink in response to the drive of the piezoelectric element 60.

Returning to FIG. 9, the fixing plate 39 is located on the −Z1 side of the discharge module 23. Six discharge modules 23 are fixed to the fixing plate 39. Specifically, the fixing plate 39 penetrates the fixing plate 39 along the Z2 direction and has six opening portions 391 corresponding to each of the six discharge modules 23. The six discharge modules 23 are fixed to the fixing plate 39 so that the liquid ejection surface 623*a* is exposed from each of the six opening portions 391.

The distribution flow path 37 is located on the +Z1 side of the discharge module 23. Four introduction portions 373 are provided on the surface of the distribution flow path 37 on the +Z1 side. The four introduction portions 373 are flow path tubes that protrude from the surface of the distribution flow path 37 on the +Z1 side toward the +Z1 side along the Z1 direction, and communicate with a flow path hole (not illustrated) formed on the surface of the flow path structure 34 on the −Z1 side. In addition, a flow path tube (not illustrated) that communicates with the four introduction portions 373 is located on the surface of the distribution flow path 37 on the −Z1 side. The flow path tube (not illustrated) located on the surface of the distribution flow path 37 on the −Z1 side communicates with the introduction path 661 included in each of the six discharge modules 23. In addition, the distribution flow path 37 includes six opening portions 371 penetrating along the Z1 direction. The wiring member 388 included in each of the six discharge modules 23 is inserted into the six opening portions 371.

The head substrate 35 is located on the +Z1 side of the distribution flow path 37. A wiring member FC electrically coupled to the aggregate substrate 33 described later is attached to the head substrate 35. In addition, the head substrate 35 is formed with four opening portions 351 and cutout portions 352 and 353. The wiring members 388 included in the discharge modules 23-2 to 23-5 are inserted through four opening portions 351 and electrically coupled to the head substrate 35 by soldering or the like. In addition, the wiring member 388 included in the discharge module 23-1 passes through the cutout portion 352, and the wiring member 388 included in the discharge module 23-6 passes through the cutout portion 353. The wiring member 388 included in each of the discharge modules 23-1 and 23-6 passed through each of the cutout portions 352 and 353 is electrically coupled to the head substrate 35 by soldering or the like.

In addition, four cutout portions 355 are formed at the four corners of the head substrate 35. The introduction portion 373 passes through the four cutout portions 355. The four introduction portions 373 passed through the cutout portion 355 are coupled to the flow path structure 34 located on the +Z1 side of the head substrate 35.

The flow path structure 34 includes a flow path plate Su1 and a flow path plate Su2. The flow path plate Su1 and the flow path plate Su2 are laminated along the Z1 direction in a state where the flow path plate Su1 is located on the +Z1 side and the flow path plate Su2 is located on the −Z1 side, and are bonded to each other by an adhesive or the like. In addition, the flow path structure 34 includes four introduction portions 341 protruding toward the +Z1 side along the Z1 direction on the surface on the +Z1 side. The four introduction portions 341 communicate with the flow path hole (not illustrated) formed on the surface of the flow path structure 34 on the −Z1 side via an ink flow path formed inside the flow path structure 34. A flow path hole (not illustrated) formed on the surface of the flow path structure 34 on the −Z1 side communicates with the four introduction portions 373. Furthermore, the flow path structure 34 is formed with a through-hole 343 penetrating along the Z1 direction. The wiring member FC electrically coupled to the head substrate 35 is inserted into the through-hole 343.

Here, inside the flow path structure 34, in addition to the ink flow path that communicates with the introduction portion 341 and the flow path hole (not illustrated) formed on the surface on the −Z1 side, a capture filter or the like for capturing foreign matter contained in the ink flowing through the ink flow path may be provided.

The housing 31 is located so as to cover the periphery of the flow path structure 34, the head substrate 35, the distribution flow path 37, and the fixing plate 39, and supports the flow path structure 34, the head substrate 35, the distribution flow path 37, and the fixing plate 39. The housing 31 includes four opening portions 311, an aggregate substrate insertion portion 313, and a holding member 315.

The four introduction portions 341 included in the flow path structure 34 are inserted into the four opening portions 311. Ink is supplied from the liquid container 3 to the four introduction portions 341 through which the four opening portions 311 are inserted through a tube (not illustrated) or the like.

The holding member 315 interposes the aggregate substrate 33 in a state where the aggregate substrate insertion portion 313 is partially inserted between the holding member 315 and the housing 31. The aggregate substrate 33 is provided with a coupling portion 330. The coupling member 30 that propagates various signals such as a data signal DATA, drive signals COMA, COMB, and COMC, a reference voltage signal VBS, and other power supply voltages output by the head drive module 10 is attached to the coupling portion 330. In addition, the wiring member FC included in the head substrate 35 is electrically coupled to the aggregate substrate 33. As a result, the aggregate substrate 33 and the head substrate 35 are electrically coupled to each other. Here, the aggregate substrate 33 may be provided with a semiconductor device corresponding to the above-described restoration circuit 220. In addition, although FIG. 9 illustrates a case where one coupling portion 330 is provided on the aggregate substrate 33, the aggregate substrate 33 may include a plurality of coupling portions 330.

In the liquid discharge module 20 configured as described above, when the liquid container 3 and the introduction portion 341 communicate with each other via a tube (not illustrated) or the like, the ink stored in the liquid container 3 is supplied to the liquid discharge module 20. The ink supplied to the liquid discharge module 20 is guided to a flow path hole (not illustrated) formed on the surface of the flow path structure 34 on the −Z1 side via the ink flow path formed inside the flow path structure 34, and then is supplied to the four introduction portions 373 included in the distribution flow path 37. The ink supplied to the distribution flow path 37 is distributed correspondingly to each of the six discharge modules 23 in an ink flow path (not illustrated) formed inside the distribution flow path 37, and then supplied to the introduction path 661 included in the corresponding discharge module 23. The ink supplied to the discharge module 23 via the introduction path 661 is stored in the pressure chamber CB included in the discharge portion 600.

In addition, various signals including the drive signals COMA1 to COMA6, COMB1 to COMB6, and COMC1 to COMC6, the reference voltage signal VBS, and the data signal DATA output by the head drive module 10 propagate through the coupling member 30 and are input to the liquid discharge module 20 via the coupling portion 330. Various signals including the drive signals COMA1 to COMA6, COMB1 to COMB6, and COMC1 to COMC6, the reference voltage signal VBS, and the data signal DATA input to the liquid discharge module 20 propagate through the aggregate substrate 33 and the head substrate 35. At this time, the restoration circuit 220 generates clock signals SCK1 to SCK6, print data signals SI1 to SI6, and latch signals LAT1 to LAT6 corresponding to each of the discharge modules 23-1 to 23-6 from the data signal DATA and separates these signals corresponding to each of the discharge modules 23-1 to 23-6. Each of the drive signals COMA1 to COMA6, COMB1 to COMB6, and COMC1 to COMC6, the reference voltage signal VBS, the clock signals SCK1 to SCK6, the print data signals SI1 to SI6, and the latch signals LAT1 to LAT6 is input to the wiring member 388 of the corresponding discharge module 23. The drive signals COMA, COMB, and COMC, the reference voltage signal VBS, the clock signal SCK, the print data signal SI, and the latch signal LAT supplied to the wiring member 388 propagate through the wiring member 388. At this time, the integrated circuit 201 including the drive signal selection circuit 200 provided in the wiring member 388 generates a drive signal VOUT corresponding to each of the n discharge portions 600, and supplies the drive signal VOUT to the electrode 602 of the piezoelectric element 60 included in the corresponding discharge portion 600. As a result, the n piezoelectric elements 60 are individually driven according to the drive signal VOUT. As a result, the ink stored in the pressure chamber CB corresponding to the piezoelectric element 60 is discharged from the corresponding nozzle N.

As described above, in the liquid discharge device 1 of the first embodiment, the liquid discharge module 20 includes the electrode 602 and the electrode 603, includes the plurality of piezoelectric elements 60 driven by the drive signal VOUT supplied to the electrode 602 and the reference voltage signal VBS supplied to the electrode 603, and includes the plurality of discharge modules 23 for discharging ink by driving the piezoelectric element 60.

1.5 Head Drive Module Structure

Figure 12:
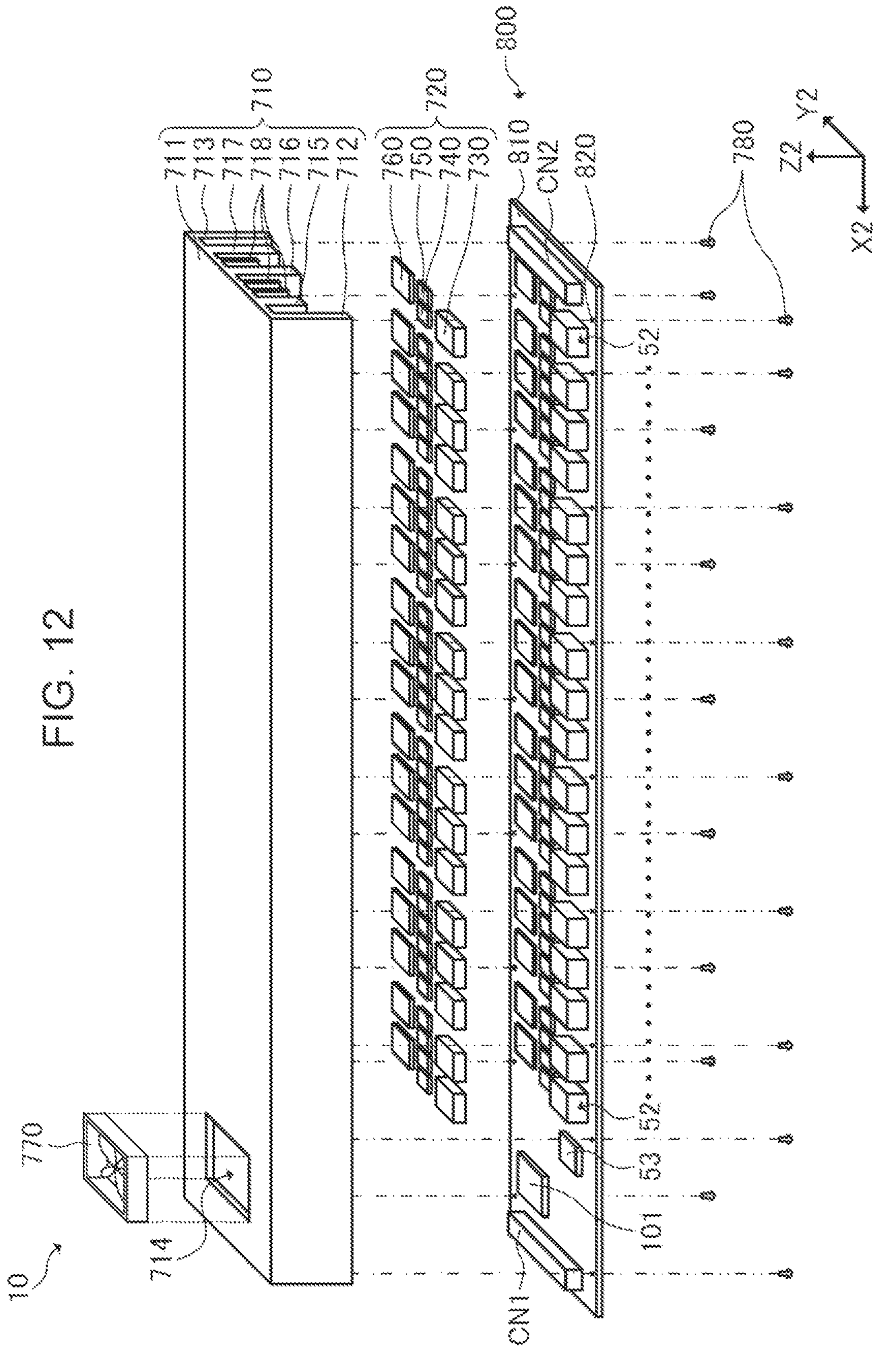
FIG. 12 is a diagram illustrating an example of a structure of a head drive module.

Next, the structure of the head drive module 10 will be described with reference to FIG. 12. Here, in describing the structure of the head drive module 10, FIG. 12 illustrates arrows indicating the X2 direction, the Y2 direction, and the Z2 direction which are independent of the above-described X1 direction, Y1 direction, and Z1 direction and are orthogonal to each other. In addition, in the following description, the starting point side of the arrow indicating the X2 direction may be referred to as a −X2 side, the tip end side may be referred to as a +X2 side, the starting point side of the arrow indicating the Y2 direction may be referred to as a −Y2 side, the tip end side may be referred to as a +Y2 side, the starting point side of the arrow indicating the Z2 direction may be referred to as a −Z2 side, and the tip end side may be referred to as a +Z2 side.

FIG. 12 is a diagram illustrating an example of the structure of the head drive module 10. As illustrated in FIG. 12, the head drive module 10 includes a drive circuit substrate 800, a heat conductive member group 720, a plurality of screws 780, and a cooling fan 770.

The drive circuit substrate 800 receives an image information signal IP from the control unit 2 and outputs a plurality of signals including the drive signals COMA, COMB, and COMC, the reference voltage signal VBS, and the data signal DATA to the liquid discharge module 20. That is, the drive circuit substrate 800 drives the piezoelectric element 60 of the liquid discharge module 20.

The drive circuit substrate 800 includes a plurality of drive circuits 52, a reference voltage output circuit 53, an integrated circuit 101, coupling portions CN1 and CN2, and a wiring substrate 810. The wiring substrate 810 includes a plurality of through-holes 820 that penetrate the wiring substrate 810 along the Z2 direction. In addition, the wiring substrate 810 is provided with the plurality of drive circuits 52, the reference voltage output circuit 53, the integrated circuit 101, and the coupling portions CN1 and CN2.

The coupling portion CN1 is located on the +X2 side of the wiring substrate 810. A cable (not illustrated) for electrically coupling the control unit 2 and the drive circuit substrate 800 is attached to the coupling portion CN1. As a result, the image information signal IP output by the control unit 2 is input to the drive circuit substrate 800. The coupling portion CN2 is located on the −X2 side of the wiring substrate 810. The coupling member 30 for electrically coupling the drive circuit substrate 800 and the liquid discharge module 20 is attached to the coupling portion CN2. As a result, a signal including the drive signals COMA, COMB, and COMC, the reference voltage signal VBS, and the data signal DATA output by the drive circuit substrate 800 are propagated to the liquid discharge module 20.

The integrated circuit 101, the reference voltage output circuit 53, and the plurality of drive circuits 52 are located between the coupling portions CN1 and CN2 on the wiring substrate 810. Specifically, the integrated circuit 101 is located on the −X2 side of the coupling portion CN1, the reference voltage output circuit 53 is located on the −X2 side of the integrated circuit 101, and the plurality of drive circuits 52 are located side by side along the X2 direction on the −X2 side of the reference voltage output circuit 53. That is, the wiring substrate 810 is provided with drive circuits **52*a*1 to 52*a*6, 52*b*1 to 52*b*6, and 52*c*1 to 52*c*6 as a plurality of drive circuits 52, and a reference voltage output circuit 53. The configuration including the integrated circuit 101, the reference voltage output circuit 53, and the plurality of drive circuits 52 provided on the wiring substrate 810 generates a signal including the drive signal COMA, COMB, and COMC, the reference voltage signal VBS, and the data signal DATA based on the image information signal IP input from the coupling portion CN1, and outputs the signal to the liquid discharge module 20**.

Here, the wiring substrate 810 may be provided with a plurality of electronic components in addition to the plurality of drive circuits 52, the reference voltage output circuit 53, the integrated circuit 101, and the coupling portions CN1 and CN2. The details of the drive circuit substrate 800 including the wiring substrate 810 will be described later.

The heat sink 710 is located on the +Z2 side of the drive circuit substrate 800 and is attached to the wiring substrate 810 by the plurality of screws 780. The heat sink 710 includes a bottom portion 711, side portions 712 and 713, protruding portions 715, 716, and 717, and a plurality of fin portions 718.

The bottom portion 711 is a substantially rectangular shape located facing the wiring substrate 810 and extending in a plane formed by the X2 direction and the Y2 direction. The side portion 712 protrudes from the end portion of the bottom portion 711 on the −Y2 side toward the −Z2 side and extends along the X2 direction. At least a part of the end portion of the side portion 712 on the −Z2 side is in contact with the end portion of the wiring substrate 810 on the −Y2 side. The side portion 713 protrudes from the end portion of the bottom portion 711 on the +Y2 side toward the −Z2 side and extends along the X2 direction. At least a part of the end portion of the side portion 713 on the −Z2 side is in contact with the end portion of the wiring substrate 810 on the +Y2 side. That is, the heat sink 710 includes the bottom portion 711 and the side portions 712 and 713, and constitutes an accommodation space that opens on the −Z2 side. The plurality of drive circuits 52 included in the drive circuit substrate 800 are accommodated in the accommodation space constituted by the heat sink 710. In other words, the heat sink 710 is attached to the wiring substrate 810 and is provided so as to cover the plurality of drive circuits 52.

The protruding portions 715, 716, and 717 are provided corresponding to the inductor L1, the transistors M1 and M2, and the integrated circuit 500 included in each of the plurality of drive circuits 52 provided on the wiring substrate 810 inside the accommodation space configured to include the bottom portion 711 and the side portions 712 and 713. Specifically, the protruding portion 715 is located corresponding to the inductor L1 provided on the wiring substrate 810, protrudes from the bottom portion 711 toward the −Z2 side, and extends along the X2 direction. The protruding portion 716 is located corresponding to the transistors M1 and M2 provided on the wiring substrate 810, protrudes from the bottom portion 711 toward the −Z2 side, and extends along the X2 direction. The protruding portion 717 is located corresponding to the integrated circuit 500 provided on the wiring substrate 810, protrudes from the bottom portion 711 toward the −Z2 side, and extends along the X2 direction.

Each of the plurality of fin portions 718 protrudes from the bottom portion 711 toward the −Z2 side, extends along the X2 direction, and is located apart from each other in the Y2 direction. Since the heat sink 710 includes the plurality of fin portions 718, the surface area of the heat sink 710 is increased. As a result, the heat radiation performance of the heat sink 710 is improved. The number of such fin portions 718 is set based on the amount of heat released by the heat sink 710, the length of the fin portion 718 along the Z2 direction, and an optimum interval defined according to the air flow applied to the fin portion 718, and the like.

The heat sink 710 configured as described above is attached to the wiring substrate 810 of the drive circuit substrate 800 to release the heat generated by the plurality of drive circuits 52 provided on the wiring substrate 810. Furthermore, the heat sink 710 is attached so as to cover the plurality of drive circuits 52 provided on the wiring substrate 810, and thus functions as a protective member for protecting the plurality of drive circuits 52 provided on the wiring substrate 810 from impacts and the like. Therefore, it is preferable that the heat sink 710 is a substance having sufficient rigidity for protecting the drive circuit 52 in addition to high thermal conductivity for releasing the heat generated by the drive circuit 52, and is configured to contain a metal such as aluminum, iron, or copper.

The heat conductive member group 720 is located between the drive circuit substrate 800 and the heat sink 710. The heat conductive member group 720 comes into contact with both the plurality of drive circuits 52 provided on the wiring substrate 810 and the heat sink 710 by attaching the heat sink 710 to the wiring substrate 810. As a result, the heat conductive member group 720 enhances the contact efficiency between the plurality of drive circuits 52 and the heat sink 710, and enhances the heat conduction efficiency conducted from the drive circuit substrate 800 to the heat sink 710. Such a heat conductive member group 720 is preferably a substance having elasticity, flame retardancy, and electrical insulation, in addition to thermal conductivity. For example, a gel sheet or rubber sheet containing silicone or acrylic resin and having high thermal conductivity can be used. As a result, the heat conductive member group 720 functions as a conductive member that conducts the heat generated in the drive circuit substrate 800 to the heat sink 710.

Furthermore, since the heat conductive member group 720 is configured to include a gel sheet or a rubber sheet, the heat conductive member group 720 functions as an insulating member for ensuring electrical insulation performance between the drive circuit substrate 800 and the heat sink 710, and also functions as a cushioning member for relieving stress which may occur when the heat sink 710 is attached to the drive circuit substrate 800.

Specifically, the heat conductive member group 720 includes heat conductive members 730, 740, 750, and 760. The heat conductive member 730 is located between the inductor L1 included in each of the plurality of drive circuits 52 and the protruding portion 715 included in the heat sink 710, and comes into contact with both the inductor L1 and the protruding portion 715 included in each of the plurality of drive circuits 52 by attaching the heat sink 710 to the drive circuit substrate 800. As a result, the heat conductive member 730 enhances the conduction efficiency of heat generated by the inductor L1 to the heat sink 710. The heat conductive member 740 is located between the transistor M1 included in each of the plurality of drive circuits 52 and the protruding portion 716 included in the heat sink 710, and comes into contact with both the transistor M1 and the protruding portion 716 included in each of the plurality of drive circuits 52 by attaching the heat sink 710 to the drive circuit substrate 800. As a result, the heat conductive member 740 enhances the conduction efficiency of heat generated by the transistor M1 to the heat sink 710. The heat conductive member 750 is located between the transistor M2 included in each of the plurality of drive circuits 52 and the protruding portion 716 included in the heat sink 710, and comes into contact with both the transistor M2 and the protruding portion 716 included in each of the plurality of drive circuits 52 by attaching the heat sink 710 to the drive circuit substrate 800. As a result, the heat conductive member 750 enhances the conduction efficiency of heat generated by the transistor M2 to the heat sink 710. The heat conductive member 760 is located between the integrated circuit 500 included in each of the plurality of drive circuits 52 and the protruding portion 717 included in the heat sink 710, and comes into contact with both the integrated circuit 500 and the protruding portion 717 included in each of the plurality of drive circuits 52 by attaching the heat sink 710 to the drive circuit substrate 800. As a result, the heat conductive member 760 enhances the conduction efficiency of heat generated by the transistor M2 to the heat sink 710.

Each of the plurality of screws 780 inserts each of the plurality of through-holes 820 included in the wiring substrate 810 included in the drive circuit substrate 800 from the −Z2 side toward the +Z2 side. Each of the plurality of screws 780 is fastened to the heat sink 710. As a result, the heat sink 710 is attached to the wiring substrate 810 included in the drive circuit substrate 800.

The cooling fan 770 is located on the −Z2 side of the heat sink 710. The cooling fan 770 introduces the outside air into the head drive module 10 through an opening portion 714 provided in an upper portion of the heat sink 710 on the +X2 side. Specifically, the heat sink 710 includes an opening portion 714 that penetrates the outside of the heat sink 710 and the accommodation space formed by the heat sink 710. The cooling fan 770 is attached to the heat sink 710 so as to cover the opening portion 714. By operating the cooling fan 770, outside air is introduced into the accommodation space formed by the heat sink 710 through the opening portion 714. As a result, the circulation efficiency of the air floating inside the accommodation space formed by the heat sink 710 is improved, and the heat release efficiency generated in the drive circuit 52 accommodated in the accommodation space is further improved.

Here, the cooling fan 770 may be attached so as to increase the circulation efficiency of the air floating inside the accommodation space formed by the heat sink 710. Therefore, the opening portion 714 to which the cooling fan 770 is attached may be located on any side surface of the accommodation space formed by the heat sink 710. In addition, the fact that the cooling fan 770 operates so as to introduce outside air into the accommodation space formed by the heat sink 710 is not limited to the fact that the cooling fan 770 operates so as to take in outside air into the accommodation space, and includes the case where the cooling fan 770 operates so as to exhaust the air floating inside the accommodation space.

The image information signal IP output by the control unit 2 is input to the head drive module 10 configured as described above via the coupling portion CN2. The integrated circuit 101 included in the head drive module 10 generates and outputs basic drive signals dA1 to dA6, dB1 to dB6, and dC1 to dC6, and a data signal DATA based on the input image information signal IP, and the reference voltage output circuit 53 generates and outputs a reference voltage signal VBS. The basic drive signals dA1 to dA6, dB1 to dB6, and dC1 to dC6 propagate through the wiring substrate 810 and are input to the corresponding drive circuits **52*a*1 to 52*a*6, 52*b*1 to 52*b*6, and 52*c*1 to 52*c*6. Each of the drive circuits 52*a*1 to 52*a*6, 52*b*1 to 52*b*6, and 52*c*1 to 52*c*6 generates and outputs drive signals COMA1 to COMA6, COMB1 to COMB6, and COMC1 to COMC6 corresponding to the basic drive signals dA1 to dA6, dB1 to dB6, and dC1 to dC6 input corresponding thereto. The data signal DATA output by the integrated circuit 101, the drive signals COMA1 to COMA6, COMB1 to COMB6, and COMC1 to COMC6 output by each of the drive circuits 52*a*1 to 52*a*6, 52*b*1 to 52*b*6, and 52*c*1 to 52*c*6, and the reference voltage signal VBS output by the reference voltage output circuit 53 propagate through the wiring substrate 810 and are output to the liquid discharge module 20** via the coupling portion CN2.

1.6 Configuration of Drive Circuit Substrate

As described above, in the liquid discharge device 1 of the first embodiment, the piezoelectric element 60 included in each of the discharge modules 23-1 to 23-6 included in the liquid discharge module 20 is driven according to the potential difference between the drive signals COMA1 to COMA6, COMB1 to COMB6, and COMC1 to COMC6 output by the head drive module 10 and the reference voltage signal VBS. Each of the discharge modules 23-1 to 23-6 discharges an amount of ink corresponding to the drive amount of the piezoelectric element 60 from the corresponding nozzle N. Therefore, in order to improve the discharge accuracy of the ink discharged by the liquid discharge module 20, in addition to improving the waveform accuracy of the drive signals COMA1 to COMA6, COMB1 to COMB6, and COMC1 to COMC6 for driving the piezoelectric element 60, the stability of the potential of the reference voltage signal VBS, which is the reference potential for driving the piezoelectric element 60, is required.

Therefore, from the viewpoint of improving the waveform accuracy of the drive signals COMA1 to COMA6, COMB1 to COMB6, and COMC1 to COMC6 that drive the piezoelectric element 60, and improving the potential stability of the reference voltage signal VBS, an example of the configuration of the drive circuit substrate 800 that generates the drive signals COMA1 to COMA6, COMB1 to COMB6, COMC1 to COMC6, and the reference voltage signal VBS and outputs these signals to the liquid discharge module 20 will be described more specifically.

Figure 13:
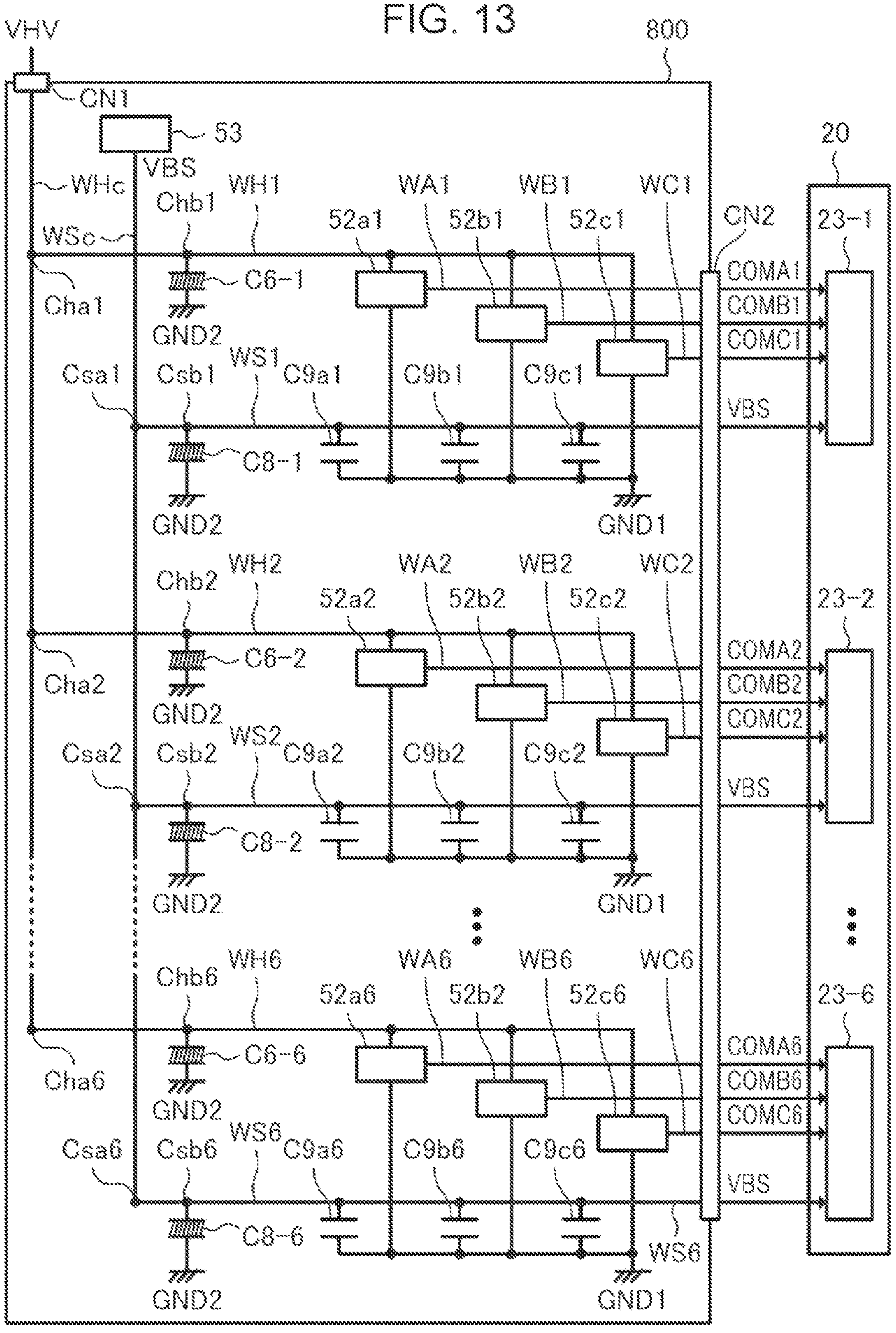
FIG. 13 is a diagram illustrating an example of an electrical coupling relationship of a drive circuit substrate.

FIG. 13 is a diagram illustrating an example of an electrical coupling relationship of the drive circuit substrate 800. Here, in FIG. 13, the integrated circuit 101 which has a small contribution to the waveform accuracy of the drive signals COMA, COMB, and COMC, and the reference voltage signal VBS, and the wiring through which the data signal DATA output by the integrated circuit 101 is propagated are omitted. On the other hand, the voltage VHV input to each of the drive circuits **52*a*1 to 52*a*6, 52*b*1 to 52*b*6, and 52*c*1 to 52*c*6 significantly contributes to the waveform accuracy of the drive signals COMA1 to COMA6, COMB1 to COMB6, and COMC1 to COMC6 output by each of the drive circuits 52*a*1 to 52*a*6, 52*b*1 to 52*b*6, and 52*c*1 to 52*c*6. Therefore, FIG. 13 illustrates the voltage VHV input to the plurality of drive circuits 52 and the propagation path through which the voltage VHV propagates. Although the voltage VHV is illustrated in FIG. 13 as being supplied from a power supply circuit (not illustrated) configured outside the drive circuit substrate 800, the power supply circuit that generates the voltage VHV may be provided on the drive circuit substrate 800**.

As described above, the drive circuit substrate 800 includes the drive circuits **52*a*1 to 52*a*6, 52*b*1 to 52*b*6, and 52*c*1 to 52*c*6, the reference voltage output circuit 53, the coupling portions CN1 and CN2, and capacitors C6-1 to C6-6, C8-1 to C8-6, C9*a*1 to C9*a*6, C9*b*1 to C9*b*6, and C9*c*1 to C9*c*6. In addition, the wiring substrate 810 included in the drive circuit substrate 800 includes wirings WA1 to WA6 propagated by each of the drive signals COMA1 to COMA6, wirings WB1 to WB6 propagated by each of the drive signals COMB1 to COMB6, and wirings WC1 to WC6 propagated by each of the drive signals COMC1 to COMC6, wirings WSc and WS1 to WS6 propagated the reference voltage signal VBS, and wirings WHc and WH1 to WH6** propagated the voltage VHV.

The voltage VHV is input to the drive circuit substrate 800 via the coupling portion CN1. The voltage VHV propagates through the wiring WHc provided on the wiring substrate 810.

The wiring WH1 is electrically coupled to the wiring WHc at a contact Cha1. In addition, the wiring WH1 is also electrically coupled to the drive circuits **52*a*1, 52*b*1, and 52*c*1. As a result, the voltage VHV propagating through the wiring WHc is input to each of the drive circuits 52*a*1, 52*b*1**, and 52c1 via the contact Cha1 and the wiring WH1. Each of the drive circuits 52a1, 52b1, and 52c1 generates and outputs drive signals COMA1, COMB1, and COMC1 by amplifying and demodulating the modulation signal Ms based on the input voltage VHV. At this time, the drive signal COMA1 output by the drive circuit 52a1 propagates through the wiring WA1 included in the wiring substrate 810 and is input to the discharge module 23-1 via the coupling portion CN2, the drive signal COMB1 output by the drive circuit 52b1 propagates through the wiring WB1 included in the wiring substrate 810 and is input to the discharge module 23-1 included in the liquid discharge module 20 via the coupling portion CN2, and the drive signal COMC1 output by the drive circuit 52c1 propagates through the wiring WC1 included in the wiring substrate 810 and is input to the discharge module 23-1 included in the liquid discharge module 20 via the coupling portion CN2.

In addition, the capacitor C6-1 is electrically coupled to the wiring WH1. Specifically, one end of the capacitor C6-1 is electrically coupled to the wiring WH1 at a contact Chb1, and a ground potential GND2 is supplied to the other end. Here, the ground potential GND2 is a reference potential for the operation of the drive circuit substrate 800, and may be the same potential as the ground potential GND1 described above. That is, in the drive circuit substrate 800, the capacitor C6-1 and the capacitor C7 of each of the drive circuits 52a1, 52b1, and 52c1 described above are electrically coupled to each other in parallel.

The capacitor C6-1 and the capacitor C7 of each of the drive circuits 52a1, 52b1, and 52c1 reduce the voltage fluctuations that may occur in the voltage VHV supplied to each of the drive circuits 52a1, 52b1, and 52c1 and reduce the possibility that noise is superimposed on the voltage VHV supplied to each of the drive circuits 52a1, 52b1, and 52c1. Therefore, it is preferable that the capacitor C6-1 and the capacitor C7 have a large capacitance that can reduce voltage fluctuations and are located in the vicinity of the drive circuits 52a1, 52b1, and 52c1 from the viewpoint of noise reduction.

In the liquid discharge device 1 of the first embodiment, the capacitor C6-1 and the capacitor C7 included in each of the drive circuits 52a1, 52b1, and 52c1 are provided in the supply paths for supplying the voltage VHV to each of the drive circuits 52a1, 52b1, and 52c1. The capacitor C6-1 reduces the possibility that the voltage VHV supplied to each of the drive circuits 52a1, 52b1, and 52c1 fluctuates, and the capacitor C7 of each of the drive circuits 52a1, 52b1, and 52c1 reduces the possibility that noise is superimposed on the voltage VHV supplied to the corresponding drive circuits 52a1, 52b1, and 52c1. As such a capacitor C6-1, an electrolytic capacitor that can obtain a large capacitance can be used, and as the capacitor C7 included in each of the drive circuits 52a1, 52b1, and 52c1, a chip ceramic capacitor that is a chip capacitor which is unlikely to be affected by the heat generated in the drive circuits 52a1, 52b1, and 52c1 and can be mounted in a small space can be used. As a result, the accuracy of the voltage VHV supplied to each of the drive circuits 52a1, 52b1, and 52c1 is improved.

Similarly, each of the wirings WH2 to WH5 is electrically coupled to the wiring WHc at each of the contacts Chat to Cha6. In addition, the wiring WH2 is also electrically coupled to the drive circuits 52a2, 52b2, and 52c2, the wiring WH3 is also electrically coupled to the drive circuits 52a3, 52b3, and 52c3, the wiring WH4 is also electrically coupled to the drive circuits 52a4, 52b4, and 52c4, the wiring WH5 is also electrically coupled to the drive circuits 52a5, 52b5, and 52c5, and the wiring WH6 is also electrically coupled to the drive circuits 52a6, 52b6, and 52c6. As a result, the voltage VHV propagating through the wiring WHc is input to each of the drive circuits 52a2, 52b2, and 52c2, each of the drive circuits 52a3, 52b3, and 52c3, each of the drive circuits 52a4, 52b4, and 52c4, each of the drive circuits 52a5, 52b5, and 52c5, and each of the drive circuits 52a6, 52b6, and 52c6.

Each of the drive circuits 52a2 to 52a6, 52b2 to 52b6, and 52c2 to 52c6 generates and outputs drive signals COMA2 to COMA6, COMB2 to COMB6, and COMC1 to COMC6 by amplifying and demodulating the modulation signal Ms based on the input voltage VHV. At this time, the drive signals COMA2, COMB2, and COMC2 output by each of the drive circuits 52a2, 52b2, and 52c2 propagate through each of the wirings WA2, WB2, and WC2 included in the wiring substrate 810, and are input to the discharge module 23-2 via the coupling portion CN2. The drive signals COMA3, COMB3, and COMC3 output by each of the drive circuits 52a3, 52b3, and 52c3 propagate through each of the wirings WA3, WB3, and WC3 included in the wiring substrate 810, and are input to the discharge module 23-3 via the coupling portion CN2. The drive signals COMA4, COMB4, and COMC4 output by each of the drive circuits 52a4, 52b4, and 52c4 propagate through each of the wirings WA4, WB4, and WC4 included in the wiring substrate 810, and are input to the discharge module 23-4 via the coupling portion CN2. The drive signals COMA5, COMB5, and COMC5 output by each of the drive circuits 52a5, 52b5, and 52c5 propagate through each of the wirings WA5, WB5, and WC5 included in the wiring substrate 810, and are input to the discharge module 23-5 via the coupling portion CN2. The drive signals COMA6, COMB6, and COMC6 output by each of the drive circuits 52a6, 52b6, and 52c6 propagate through each of the wirings WA6, WB6, and WC6 included in the wiring substrate 810, and are input to the discharge module 23-6 via the coupling portion CN2.

In addition, a capacitor C6-2 is electrically coupled to the wiring WH2. Specifically, one end of the capacitor C6-2 is electrically coupled to the wiring WH2 at a contact Chb2, and the ground potential GND2 is supplied to the other end. That is, in the drive circuit substrate 800, the capacitor C6-2 and the capacitor C7 of each of the drive circuits 52a2, 52b2, and 52c2 described above are electrically coupled to each other in parallel. In this case, an electrolytic capacitor that can obtain a large capacitance is used as the capacitor C6-2, so that the possibility of voltage fluctuation in the voltage VHV input to each of the drive circuits 52a2, 52b2, and 52c2 is reduced. The capacitor C7 included in each of the drive circuits 52a2, 52b2, and 52c2 is disposed in the vicinity of each of the corresponding drive circuits 52a2, 52b2, and 52c2, and is a chip ceramic capacitor that is a chip capacitor which is unlikely to be affected by the heat generated in the drive circuits 52a2, 52b2, and 52c2 and can be mounted in a small space. Therefore, the accuracy of the voltage VHV supplied to each of the drive circuits 52a2, 52b2, and 52c2 is improved.

In addition, a capacitor C6-3 is electrically coupled to the wiring WH3. Specifically, one end of the capacitor C6-3 is electrically coupled to the wiring WH3 at a contact Chb3, and the ground potential GND2 is supplied to the other end. That is, in the drive circuit substrate 800, the capacitors C6-3 and the capacitors C7 of each of the drive circuits 52a3, 52b3, and 52c3 described above are electrically coupled to each other in parallel. In this case, an electrolytic capacitor that can obtain a large capacitance is used as the capacitor C6-3, so that the possibility of voltage fluctuation in the voltage VHV input to each of the drive circuits 52a3, 52b3, and 52*c*3 is reduced. The capacitor C7 included in each of the drive circuits 52*a*3, 52*b*3, and 52*c*3 is disposed in the vicinity of each of the corresponding drive circuits 52*a*3, 52*b*3, and 52*c*3, and is a chip ceramic capacitor that is a chip capacitor which is unlikely to be affected by the heat generated in the drive circuits 52*a*3, 52*b*3, and 52*c*3 and can be mounted in a small space. Therefore, the accuracy of the voltage VHV supplied to each of the drive circuits 52*a*3, 52*b*3, and 52*c*3 is improved.

In addition, a capacitor C6-4 is electrically coupled to the wiring WH4. Specifically, one end of the capacitor C6-4 is electrically coupled to the wiring WH4 at a contact Chb4, and the ground potential GND2 is supplied to the other end. That is, in the drive circuit substrate 800, the capacitors C6-4 and the capacitors C7 of each of the drive circuits 52*a*4, 52*b*4, and 52*c*4 described above are electrically coupled to each other in parallel. In this case, an electrolytic capacitor that can obtain a large capacitance is used as the capacitor C6-4, so that the possibility of voltage fluctuation in the voltage VHV input to each of the drive circuits 52*a*4, 52*b*4, and 52*c*4 is reduced. The capacitor C7 included in each of the drive circuits 52*a*4, 52*b*4, and 52*c*4 is disposed in the vicinity of each of the corresponding drive circuits 52*a*4, 52*b*4, and 52*c*4, and is a chip ceramic capacitor that is a chip capacitor which is unlikely to be affected by the heat generated in the drive circuits 52*a*4, 52*b*4, and 52*c*4 and can be mounted in a small space. Therefore, the accuracy of the voltage VHV supplied to each of the drive circuits 52*a*4, 52*b*4, and 52*c*4 is improved.

In addition, a capacitor C6-5 is electrically coupled to the wiring WH5. Specifically, one end of the capacitor C6-5 is electrically coupled to the wiring WH5 at a contact Chb5, and the ground potential GND2 is supplied to the other end. That is, in the drive circuit substrate 800, the capacitors C6-5 and the capacitors C7 of each of the drive circuits 52*a*5, 52*b*5, and 52*c*5 described above are electrically coupled to each other in parallel. In this case, an electrolytic capacitor that can obtain a large capacitance is used as the capacitor C6-5, so that the possibility of voltage fluctuation in the voltage VHV input to each of the drive circuits 52*a*5, 52*b*5, and 52*c*5 is reduced. The capacitor C7 included in each of the drive circuits 52*a*5, 52*b*5, and 52*c*5 is disposed in the vicinity of each of the corresponding drive circuits 52*a*5, 52*b*5, and 52*c*5, and is a chip ceramic capacitor that is a chip capacitor which is unlikely to be affected by the heat generated in the drive circuits 52*a*5, 52*b*5, and 52*c*5 and can be mounted in a small space. Therefore, the accuracy of the voltage VHV supplied to each of the drive circuits 52*a*5, 52*b*5, and 52*c*5 is improved.

In addition, a capacitor C6-6 is electrically coupled to the wiring WH6. Specifically, one end of the capacitor C6-6 is electrically coupled to the wiring WH6 at a contact Chb6, and the ground potential GND2 is supplied to the other end. That is, in the drive circuit substrate 800, the capacitors C6-6 and the capacitors C7 of each of the drive circuits 52*a*6, 52*b*6, and 52*c*6 described above are electrically coupled to each other in parallel. In this case, an electrolytic capacitor that can obtain a large capacitance is used as the capacitor C6-6, so that the possibility of voltage fluctuation in the voltage VHV input to each of the drive circuits 52*a*6, 52*b*6, and 52*c*6 is reduced. The capacitor C7 included in each of the drive circuits 52*a*6, 52*b*6, and 52*c*6 is disposed in the vicinity of each of the corresponding drive circuits 52*a*6, 52*b*6, and 52*c*6, and is a chip ceramic capacitor that is a chip capacitor which is unlikely to be affected by the heat generated in the drive circuits 52*a*6, 52*b*6, and 52*c*6 and can be mounted in a small space. Therefore, the accuracy of the voltage VHV supplied to each of the drive circuits 52*a*6, 52*b*6, and 52*c*6 is improved.

The reference voltage output circuit 53 generates and outputs a reference voltage signal VBS having a predetermined voltage value by stepping down or stepping up the voltage VHV or a voltage signal (not illustrated). The reference voltage signal VBS output by the reference voltage output circuit 53 propagates through the wiring WSc provided on the wiring substrate 810.

The wiring WS1 is electrically coupled to the wiring WSc at a contact Csa1. In addition, the wiring WH1 is electrically coupled to the discharge module 23-1 via the coupling portion CN2. As a result, the reference voltage signal VBS is input to the discharge module 23-1. That is, the wiring WH1 is electrically coupled to the contact Csa1 and the electrode 603 of the piezoelectric element 60 included in the discharge module 23-1. As a result, the reference voltage signal VBS output by the reference voltage output circuit 53 propagates through the wiring WS1 via the contact Csa1 and is supplied to the electrodes 603 of the plurality of piezoelectric elements 60 included in the discharge module 23-1.

Similarly, each of the wirings WS2 to WS6 is electrically coupled to the wiring WSc at each of the contacts Csa2 to Csa6. In addition, the wiring WH2 is electrically coupled to the discharge module 23-2 via the coupling portion CN2, the wiring WH3 is electrically coupled to the discharge module 23-3 via the coupling portion CN2, the wiring WH4 is electrically coupled to the discharge module 23-4 via the coupling portion CN2, the wiring WH5 is electrically coupled to the discharge module 23-5 via the coupling portion CN2, and the wiring WH6 is electrically coupled to the discharge module 23-6 via the coupling portion CN2. That is, the wiring WH2 is electrically coupled to the contact Csa2 and the electrode 603 of the piezoelectric element 60 included in the discharge module 23-2, the wiring WH3 is electrically coupled to the contact Csa3 and the electrode 603 of the piezoelectric element 60 included in the discharge module 23-3, the wiring WH4 is electrically coupled to the contact Csa4 and the electrode 603 of the piezoelectric element 60 included in the discharge module 23-4, the wiring WH5 is electrically coupled to the contact Csa5 and the electrode 603 of the piezoelectric element 60 included in the discharge module 23-5, and the wiring WH6 is electrically coupled to the contact Csa6 and the electrode 603 of the piezoelectric element 60 included in the discharge module 23-6.

As a result, the reference voltage signal VBS output by the reference voltage output circuit 53 propagates through the wiring WS2 via the contact Csa2, is supplied to the electrodes 603 of the plurality of piezoelectric elements 60 included in the discharge module 23-2, propagates through the wiring WS3 via the contact Csa3, is supplied to the electrodes 603 of the plurality of piezoelectric elements 60 included in the discharge module 23-3, propagates through the wiring WS4 via the contact Csa4, is supplied to the electrodes 603 of the plurality of piezoelectric elements 60 included in the discharge module 23-4, propagates through the wiring WS5 via the contact Csa5, is supplied to the electrodes 603 of the plurality of piezoelectric elements 60 included in the discharge module 23-5, propagates through the wiring WS6 via the contact Csa6, and is supplied to the electrodes 603 of the plurality of piezoelectric elements 60 included in the discharge module 23-6.

That is, the electrodes 603 of the piezoelectric element 60 included in each of the discharge modules 23-1 to 23-6 are electrically coupled to each other via the wiring WSc and WH1 to WH6. The reference voltage signal VBS propagates through the wiring WSc and WH1 to WH6, and is supplied to the electrodes 603 of the piezoelectric elements 60 included in each of the discharge modules 23-1 to 23-6. In other words, the reference voltage signal VBS propagates through a propagation path configured to include the wirings WH1 to WH6 and the wiring WSc, and the propagation path is electrically coupled to the electrode 603 of the piezoelectric element 60 included in each of the discharge modules 23-1 to 23-6, so that the reference voltage signal VBS is supplied to the electrode 603 of the piezoelectric element 60 included in each of the discharge modules 23-1 to 23-6.

The capacitor C8-1 is provided between the propagation path for supplying the reference voltage signal VBS to the electrode 603 of the piezoelectric element 60 included in the discharge module 23-1 and the ground potential GND2, one end of the capacitor C8-1 is electrically coupled to the propagation path for supplying the reference voltage signal VBS to the electrode 603 of the piezoelectric element 60 at the contact Csb1, and the ground potential GND2 is supplied to the other end. That is, the capacitor C8-1 is electrically coupled to the propagation path through which the reference voltage signal VBS propagates at the contact Csb1 provided in the propagation path through which the reference voltage signal VBS propagates. In this case, the contact Csb1 to which the capacitor C8-1 is electrically coupled is located between the electrode 603 of the piezoelectric element 60 included in the discharge module 23-1 and the contact Csa1 in the propagation path through which the reference voltage signal VBS propagates. In other words, the contact Csb1 is located in the wiring WS1 that electrically couples the contact Csa1 and the electrode 603 of the piezoelectric element 60 included in the discharge module 23-1 in the propagation path through which the reference voltage signal VBS propagates.

The capacitor C8-2 is provided between the propagation path for supplying the reference voltage signal VBS to the electrode 603 of the piezoelectric element 60 included in the discharge module 23-2 and the ground potential GND2, one end of the capacitor C8-2 is electrically coupled to the propagation path for supplying the reference voltage signal VBS to the electrode 603 of the piezoelectric element 60 at the contact Csb2, and the ground potential GND2 is supplied to the other end. That is, the capacitor C8-2 is electrically coupled to the propagation path through which the reference voltage signal VBS propagates at the contact Csb2 provided in the propagation path through which the reference voltage signal VBS propagates. In this case, the contact Csb2 to which the capacitor C8-2 is electrically coupled is located between the electrode 603 of the piezoelectric element 60 included in the discharge module 23-2 and the contact Csa2 in the propagation path through which the reference voltage signal VBS propagates. In other words, the contact Csb2 is located in the wiring WS2 that electrically couples the contact Csa2 and the electrode 603 of the piezoelectric element 60 included in the discharge module 23-2 in the propagation path through which the reference voltage signal VBS propagates.

The capacitor C8-3 is provided between the propagation path for supplying the reference voltage signal VBS to the electrode 603 of the piezoelectric element 60 included in the discharge module 23-3 and the ground potential GND2, one end of the capacitor C8-3 is electrically coupled to the propagation path for supplying the reference voltage signal VBS to the electrode 603 of the piezoelectric element 60 at the contact Csb3, and the ground potential GND2 is supplied to the other end. That is, the capacitor C8-3 is electrically coupled to the propagation path through which the reference voltage signal VBS propagates at the contact Csb3 provided in the propagation path through which the reference voltage signal VBS propagates. In this case, the contact Csb3 to which the capacitor C8-3 is electrically coupled is located between the electrode 603 of the piezoelectric element 60 included in the discharge module 23-3 and the contact Csa3 in the propagation path through which the reference voltage signal VBS propagates. In other words, the contact Csb3 is located in the wiring WS3 that electrically couples the contact Csa3 and the electrode 603 of the piezoelectric element 60 included in the discharge module 23-3 in the propagation path through which the reference voltage signal VBS propagates.

The capacitor C8-4 is provided between the propagation path for supplying the reference voltage signal VBS to the electrode 603 of the piezoelectric element 60 included in the discharge module 23-4 and the ground potential GND2, one end of the capacitor C8-4 is electrically coupled to the propagation path for supplying the reference voltage signal VBS to the electrode 603 of the piezoelectric element 60 at the contact Csb4, and the ground potential GND2 is supplied to the other end. That is, the capacitor C8-4 is electrically coupled to the propagation path through which the reference voltage signal VBS propagates at the contact Csb4 provided in the propagation path through which the reference voltage signal VBS propagates. In this case, the contact Csb4 to which the capacitor C8-4 is electrically coupled is located between the electrode 603 of the piezoelectric element 60 included in the discharge module 23-4 and the contact Csa4 in the propagation path through which the reference voltage signal VBS propagates. In other words, the contact Csb4 is located in the wiring WS4 that electrically couples the contact Csa4 and the electrode 603 of the piezoelectric element 60 included in the discharge module 23-4 in the propagation path through which the reference voltage signal VBS propagates.

The capacitor C8-5 is provided between the propagation path for supplying the reference voltage signal VBS to the electrode 603 of the piezoelectric element 60 included in the discharge module 23-5 and the ground potential GND2, one end of the capacitor C8-5 is electrically coupled to the propagation path for supplying the reference voltage signal VBS to the electrode 603 of the piezoelectric element 60 at the contact Csb5, and the ground potential GND2 is supplied to the other end. That is, the capacitor C8-5 is electrically coupled to the propagation path through which the reference voltage signal VBS propagates at the contact Csb5 provided in the propagation path through which the reference voltage signal VBS propagates. In this case, the contact Csb5 to which the capacitor C8-5 is electrically coupled is located between the electrode 603 of the piezoelectric element 60 included in the discharge module 23-5 and the contact Csa5 in the propagation path through which the reference voltage signal VBS propagates. In other words, the contact Csb5 is located in the wiring WS5 that electrically couples the contact Csa5 and the electrode 603 of the piezoelectric element 60 included in the discharge module 23-5 in the propagation path through which the reference voltage signal VBS propagates.

The capacitor C8-6 is provided between the propagation path for supplying the reference voltage signal VBS to the electrode 603 of the piezoelectric element 60 included in the discharge module 23-6 and the ground potential GND2, one end of the capacitor C8-6 is electrically coupled to the propagation path for supplying the reference voltage signal VBS to the electrode 603 of the piezoelectric element 60 at the contact Csb6, and the ground potential GND2 is supplied to the other end. That is, the capacitor C8-6 is electrically coupled to the propagation path through which the reference voltage signal VBS propagates at the contact Csb6 provided in the propagation path through which the reference voltage signal VBS propagates. In this case, the contact Csb6 to which the capacitor C8-6 is electrically coupled is located between the electrode 603 of the piezoelectric element 60 included in the discharge module 23-6 and the contact Csa6 in the propagation path through which the reference voltage signal VBS propagates. In other words, the contact Csb6 is located in the wiring WS6 that electrically couples the contact Csa6 and the electrode 603 of the piezoelectric element 60 included in the discharge module 23-6 in the propagation path through which the reference voltage signal VBS propagates.

One end of the capacitors C9*a*1, C9*b*1 and C9*c*1 is electrically coupled to the wiring WS1, and the ground potential GND1 is supplied to the other end. In addition, the ground potential GND1 is also supplied to each of the drive circuits 52*a*1, 52*b*1, and 52*c*1. The capacitor C9*a*1 is provided corresponding to the drive circuit 52*a*1, the capacitor C9*b*1 is provided corresponding to the drive circuit 52*b*1, and the capacitor C9*c*1 is provided corresponding to the drive circuit 52*c*1. Here, the fact that "provided corresponding to" includes that the capacitor C9*a*1 is located in the vicinity of the drive circuit 52*a*1 on the wiring substrate 810 and is coupled to the same reference potential as the drive circuit 52*a*1, the capacitor C9*b*1 is located in the vicinity of the drive circuit 52*b*1 on the wiring substrate 810 and is coupled to the same reference potential as the drive circuit 52*b*1, and the capacitor C9*c*1 is located in the vicinity of the drive circuit 52*c*1 on the wiring substrate 810 and is coupled to the same reference potential as the drive circuit 52*c*1.

One end of the capacitors C9*a*2, C9*b*2, and C9*c*2 is electrically coupled to the wiring WS2, and the ground potential GND1 is supplied to the other end. In addition, the ground potential GND1 is also supplied to each of the drive circuits 52*a*2, 52*b*2, and 52*c*2. The capacitor C9*a*2 is provided corresponding to the drive circuit 52*a*2, the capacitor C9*b*2 is provided corresponding to the drive circuit 52*b*2, and the capacitor C9*c*2 is provided corresponding to the drive circuit 52*c*2. Here, the fact that "provided corresponding to" includes that the capacitor C9*a*2 is located in the vicinity of the drive circuit 52*a*2 on the wiring substrate 810 and is coupled to the same reference potential as the drive circuit 52*a*2, the capacitor C9*b*2 is located in the vicinity of the drive circuit 52*b*2 on the wiring substrate 810 and is coupled to the same reference potential as the drive circuit 52*b*2, and the capacitor C9*c*2 is located in the vicinity of the drive circuit 52*c*2 on the wiring substrate 810 and is coupled to the same reference potential as the drive circuit 52*c*2.

One end of the capacitors C9*a*3, C9*b*3, and C9*c*3 is electrically coupled to the wiring WS3, and the ground potential GND1 is supplied to the other end. In addition, the ground potential GND1 is also supplied to each of the drive circuits 52*a*3, 52*b*3, and 52*c*3. The capacitor C9*a*3 is provided corresponding to the drive circuit 52*a*3, the capacitor C9*b*3 is provided corresponding to the drive circuit 52*b*3, and the capacitor C9*c*3 is provided corresponding to the drive circuit 52*c*3. Here, the fact that "provided corresponding to" includes that the capacitor C9*a*3 is located in the vicinity of the drive circuit 52*a*3 on the wiring substrate 810 and is coupled to the same reference potential as the drive circuit 52*a*3, the capacitor C9*b*3 is located in the vicinity of the drive circuit 52*b*3 on the wiring substrate 810 and is coupled to the same reference potential as the drive circuit 52*b*3, and the capacitor C9*c*3 is located in the vicinity of the drive circuit 52*c*3 on the wiring substrate 810 and is coupled to the same reference potential as the drive circuit 52*c*3.

One end of the capacitors C9*a*4, C9*b*4, and C9*c*4 is electrically coupled to the wiring WS4, and the ground potential GND1 is supplied to the other end. In addition, the ground potential GND1 is also supplied to each of the drive circuits 52*a*4, 52*b*4, and 52*c*4. The capacitor C9*a*4 is provided corresponding to the drive circuit 52*a*4, the capacitor C9*b*4 is provided corresponding to the drive circuit 52*b*4, and the capacitor C9*c*4 is provided corresponding to the drive circuit 52*c*4. Here, the fact that "provided corresponding to" includes that the capacitor C9*a*4 is located in the vicinity of the drive circuit 52*a*4 on the wiring substrate 810 and is coupled to the same reference potential as the drive circuit 52*a*4, the capacitor C9*b*4 is located in the vicinity of the drive circuit 52*b*4 on the wiring substrate 810 and is coupled to the same reference potential as the drive circuit 52*b*4, and the capacitor C9*c*4 is located in the vicinity of the drive circuit 52*c*4 on the wiring substrate 810 and is coupled to the same reference potential as the drive circuit 52*c*4.

One end of the capacitors C9*a*5, C9*b*5, and C9*c*5 is electrically coupled to the wiring WS5, and the ground potential GND1 is supplied to the other end. In addition, the ground potential GND1 is also supplied to each of the drive circuits 52*a*5, 52*b*5, and 52*c*5. The capacitor C9*a*5 is provided corresponding to the drive circuit 52*a*5, the capacitor C9*b*5 is provided corresponding to the drive circuit 52*b*5, and the capacitor C9*c*5 is provided corresponding to the drive circuit 52*c*5. Here, the fact that "provided corresponding to" includes that the capacitor C9*a*5 is located in the vicinity of the drive circuit 52*a*5 on the wiring substrate 810 and is coupled to the same reference potential as the drive circuit 52*a*5, the capacitor C9*b*5 is located in the vicinity of the drive circuit 52*b*5 on the wiring substrate 810 and is coupled to the same reference potential as the drive circuit 52*b*5, and the capacitor C9*c*5 is located in the vicinity of the drive circuit 52*c*5 on the wiring substrate 810 and is coupled to the same reference potential as the drive circuit 52*c*5.

One end of the capacitors C9*a*6, C9*b*6, and C9*c*6 is electrically coupled to the wiring WS6, and the ground potential GND1 is supplied to the other end. In addition, the ground potential GND1 is also supplied to each of the drive circuits 52*a*6, 52*b*6, and 52*c*6. The capacitor C9*a*6 is provided corresponding to the drive circuit 52*a*6, the capacitor C9*b*6 is provided corresponding to the drive circuit 52*b*6, and the capacitor C9*c*6 is provided corresponding to the drive circuit 52*c*6. Here, the fact that "provided corresponding to" includes that the capacitor C9*a*6 is located in the vicinity of the drive circuit 52*a*6 on the wiring substrate 810 and is coupled to the same reference potential as the drive circuit 52*a*6, the capacitor C9*b*6 is located in the vicinity of the drive circuit 52*b*6 on the wiring substrate 810 and is coupled to the same reference potential as the drive circuit 52*b*6, and the capacitor C9*c*6 is located in the vicinity of the drive circuit 52*c*6 on the wiring substrate 810 and is coupled to the same reference potential as the drive circuit 52*c*6.

As described above, in the liquid discharge device 1 of the first embodiment, the capacitor C8-1 provided in the propagation path propagating the reference voltage signal VBS to the discharge module 23-1 reduces the possibility that the voltage value of the reference voltage signal VBS supplied to the discharge module 23-1 fluctuates, and reduces the possibility that the voltage value of the reference voltage signal VBS input to the discharge modules 23-2 to 23-6 fluctuates, even when the amount of current generated by the reference voltage signal VBS supplied to the discharge module 23-1 fluctuates because of the discharge operation of the ink by the discharge module 23-1, and thus, the voltage value of the reference voltage signal VBS supplied to the discharge module 23-1 fluctuates. That is, the accuracy of the reference voltage signal VBS input to the discharge module 23-1 is improved by providing the capacitor C8-1 in the wiring WS1 in the propagation path propagating the reference voltage signal VBS in the discharge module 23-1.

In addition, the current generated by the drive signals COMA1, COMB1, and COMC1 supplied to the electrode 602 of the piezoelectric element 60 included in the discharge module 23-1 returns to each of the drive circuits 52*a*1, 52*b*1, and 52*c*1 via the wiring WS1 electrically coupled to the electrode 603 of the electrode 602 of the piezoelectric element 60 included in the discharge module 23-1 and the wiring pattern to which the ground potential GND1 is supplied. In the liquid discharge device 1 of the first embodiment, each of the capacitors C9*a*1, C9*b*1, and C9*c*1 corresponds to each of the drive circuits 52*a*1, 52*b*1, and 52*c*1 that supply the drive signals COMA1, COMB1, and COMC1 to the discharge module 23-1, one end is electrically coupled to a propagation path propagating the reference voltage signal VBS to the discharge module 23-1, and the same ground potential as that of each of the drive circuits 52*a*1, 52*b*1, and 52*c*1 is supplied to the other end. Therefore, it possible to shorten the path through which the current generated by the drive signals COMA1, COMB1, and COMC1 supplied to the electrode 602 of the piezoelectric element 60 included in the discharge module 23-1 flows. As a result, the inductance component that can be generated because of the current generated by the drive signals COMA1, COMB1, and COMC1 supplied to the electrode 602 of the piezoelectric element 60 included in the discharge module 23-1 is reduced. As a result, the waveform accuracy of the drive signals COMA1, COMB1, and COMC1 supplied to the electrode 602 of the piezoelectric element 60 included in the discharge module 23-1 is improved, and the stability of the voltage value of the reference voltage signal VBS supplied to the electrode 603 of the piezoelectric element 60 included in the discharge module 23-1 is also improved. That is, each of the capacitors C9*a*1, C9*b*1, and C9*c*1 is provided corresponding to each of the drive circuits 52*a*1, 52*b*1, and 52*c*1 that supply the drive signals COMA1, COMB1, and COMC1 to the discharge module 23-1. Therefore, the accuracy of the drive signals COMA1, COMB1, and COMC1 and the reference voltage signal VBS input to the discharge module 23-1 is improved.

Similarly, the accuracy of the reference voltage signal VBS input to the discharge module 23-2 is improved by providing the capacitor C8-2 in the wiring WS2 in the propagation path propagating the reference voltage signal VBS in the discharge module 23-2. In addition, each of the capacitors C9*a*2, C9*b*2, and C9*c*2 is provided corresponding to each of the drive circuits 52*a*2, 52*b*2, and 52*c*2 that supply the drive signals COMA2, COMB2, and COMC2 to the discharge module 23-2. Therefore, the accuracy of the drive signals COMA2, COMB2, and COMC2 and the reference voltage signal VBS input to the discharge module 23-2 is improved.

Similarly, the accuracy of the reference voltage signal VBS input to the discharge module 23-3 is improved by providing the capacitor C8-3 in the wiring WS3 in the propagation path propagating the reference voltage signal VBS in the discharge module 23-3. In addition, each of the capacitors C9*a*3, C9*b*3 and C9*c*3 is provided corresponding to each of the drive circuits 52*a*3, 52*b*3 and 52*c*3 for supplying the drive signals COMA3, COMB3 and COMC3 to the discharge module 23-3. Therefore, the accuracy of the drive signals COMA3, COMB3, and COMC3 and the reference voltage signal VBS input to the discharge module 23-3 is improved.

Similarly, the accuracy of the reference voltage signal VBS input to the discharge module 23-4 is improved by providing the capacitor C8-4 in the wiring WS4 in the propagation path propagating the reference voltage signal VBS in the discharge module 23-4. In addition, each of the capacitors C9*a*4, C9*b*4 and C9*c*4 is provided corresponding to each of the drive circuits 52*a*4, 52*b*4 and 52*c*4 for supplying the drive signals COMA4, COMB4 and COMC4 to the discharge module 23-4. Therefore, the accuracy of the drive signals COMA4, COMB4, and COMC4 and the reference voltage signal VBS input to the discharge module 23-4 is improved.

Similarly, the accuracy of the reference voltage signal VBS input to the discharge module 23-5 is improved by providing the capacitor C8-5 in the wiring WS5 in the propagation path propagating the reference voltage signal VBS in the discharge module 23-5. In addition, each of the capacitors C9*a*5, C9*b*5, and C9*c*5 is provided corresponding to each of the drive circuits 52*a*5, 52*b*5, and 52*c*5 that supply the drive signals COMA5, COMB5, and COMC5 to the discharge module 23-5. Therefore, the accuracy of the drive signals COMA5, COMB5, and COMC5 and the reference voltage signal VBS input to the discharge module 23-5 is improved.

Similarly, the accuracy of the reference voltage signal VBS input to the discharge module 23-6 is improved by providing the capacitor C8-6 in the wiring WS6 in the propagation path propagating the reference voltage signal VBS in the discharge module 23-6. In addition, each of the capacitors C9*a*6, C9*b*6, and C9*c*6 is provided corresponding to each of the drive circuits 52*a*6, 52*b*6, and 52*c*6 that supply the drive signals COMA6, COMB6, and COMC6 to the discharge module 23-6. Therefore, the accuracy of the drive signals COMA6, COMB6, and COMC6 and the reference voltage signal VBS input to the discharge module 23-6 is improved.

As described above, the drive circuit substrate 800 is provided with the drive circuit 52*a*1 that includes the transistors M1 and the capacitors C1 and C7 in which the ground potential GND1 is supplied to one end, and that outputs the drive signal COMA1 driving the piezoelectric element 60 included in the discharge module 23-1 so that ink is discharged from the nozzle N included in the discharge module 23-1 of the liquid discharge module 20 to the electrode 602 of the piezoelectric element 60, the drive circuit 52*b*1 that includes the transistors M1 and the capacitors C1 and C7 in which the ground potential GND1 is supplied to one end, and that outputs the drive signal COMB1 driving the piezoelectric element 60 included in the discharge module 23-1 so that ink is discharged from the nozzle N included in the discharge module 23-1 of the liquid discharge module 20 to the electrode 602 of the piezoelectric element 60, the drive circuit 52*c*1 that includes the transistors M1 and the capacitors C1 and C7 in which the ground potential GND1 is supplied to one end, and that outputs the drive signal COMC1 driving the piezoelectric element 60 included in the discharge module 23-1 so that ink is not discharged from the nozzle N included in the discharge module 23-1 of the liquid discharge module 20 to the electrode 602 of the piezoelectric element 60, the capacitors C9*a*1, C9*b*1, and C9*c*1 in which one end is electrically coupled to the electrode 603 of the piezoelectric element 60 included in the discharge module 23-1 and the ground potential GND1 is supplied to the other end, and the capacitor C8-1 in which one end is electrically coupled to the electrode 603 of the piezoelectric element 60 included in the discharge module 23-1, and the ground potential GND2 is supplied to the other end.

Furthermore, the drive circuit substrate 800 is provided with the drive circuit 52*a*2 that includes the transistors M1 and the capacitors C1 and C7 in which the ground potential GND1 is supplied to one end, and that outputs the drive signal COMA2 driving the piezoelectric element 60 included in the discharge module 23-2 so that ink is discharged from the nozzle N included in the discharge module 23-2 of the liquid discharge module 20 to the electrode 602 of the piezoelectric element 60, the drive circuit 52*b*2 that includes the transistors M1 and the capacitors C1 and C7 in which the ground potential GND1 is supplied to one end, and that outputs the drive signal COMB2 driving the piezoelectric element 60 included in the discharge module 23-2 so that ink is discharged from the nozzle N included in the discharge module 23-2 of the liquid discharge module 20 to the electrode 602 of the piezoelectric element 60, the drive circuit 52*c*2 that includes the transistors M1 and the capacitors C1 and C7 in which the ground potential GND1 is supplied to one end, and that outputs the drive signal COMC2 driving the piezoelectric element 60 included in the discharge module 23-2 so that ink is not discharged from the nozzle N included in the discharge module 23-2 of the liquid discharge module 20 to the electrode 602 of the piezoelectric element 60, the capacitors C9*a*2, C9*b*2, and C9*c*2 in which one end is electrically coupled to the electrode 603 of the piezoelectric element 60 included in the discharge module 23-2 and the ground potential GND1 is supplied to the other end, and the capacitor C8-2 in which one end is electrically coupled to the electrode 603 of the piezoelectric element 60 included in the discharge module 23-2, and the ground potential GND2 is supplied to the other end.

Furthermore, the drive circuit substrate 800 is provided with the drive circuit 52*a*3 that includes the transistors M1 and the capacitors C1 and C7 in which the ground potential GND1 is supplied to one end, and that outputs the drive signal COMA3 driving the piezoelectric element 60 included in the discharge module 23-3 so that ink is discharged from the nozzle N included in the discharge module 23-3 of the liquid discharge module 20 to the electrode 602 of the piezoelectric element 60, the drive circuit 52*b*3 that includes the transistors M1 and the capacitors C1 and C7 in which the ground potential GND1 is supplied to one end, and that outputs the drive signal COMB3 driving the piezoelectric element 60 included in the discharge module 23-3 so that ink is discharged from the nozzle N included in the discharge module 23-3 of the liquid discharge module 20 to the electrode 602 of the piezoelectric element 60, the drive circuit 52*c*3 that includes the transistors M1 and the capacitors C1 and C7 in which the ground potential GND1 is supplied to one end, and that outputs the drive signal COMC3 driving the piezoelectric element 60 included in the discharge module 23-3 so that ink is not discharged from the nozzle N included in the discharge module 23-3 of the liquid discharge module 20 to the electrode 602 of the piezoelectric element 60, the capacitors C9*a*3, C9*b*3, and C9*c*3 in which one end is electrically coupled to the electrode 603 of the piezoelectric element 60 included in the discharge module 23-3 and the ground potential GND1 is supplied to the other end, and the capacitor C8-3 in which one end is electrically coupled to the electrode 603 of the piezoelectric element 60 included in the discharge module 23-3, and the ground potential GND2 is supplied to the other end.

Furthermore, the drive circuit substrate 800 is provided with the drive circuit 52*a*4 that includes the transistors M1 and the capacitors C1 and C7 in which the ground potential GND1 is supplied to one end, and that outputs the drive signal COMA4 driving the piezoelectric element 60 included in the discharge module 23-4 so that ink is discharged from the nozzle N included in the discharge module 23-4 of the liquid discharge module 20 to the electrode 602 of the piezoelectric element 60, the drive circuit 52*b*4 that includes the transistors M1 and the capacitors C1 and C7 in which the ground potential GND1 is supplied to one end, and that outputs the drive signal COMB4 driving the piezoelectric element 60 included in the discharge module 23-4 so that ink is discharged from the nozzle N included in the discharge module 23-4 of the liquid discharge module 20 to the electrode 602 of the piezoelectric element 60, the drive circuit 52*c*4 that includes the transistors M1 and the capacitors C1 and C7 in which the ground potential GND1 is supplied to one end, and that outputs the drive signal COMC4 driving the piezoelectric element 60 included in the discharge module 23-4 so that ink is not discharged from the nozzle N included in the discharge module 23-4 of the liquid discharge module 20 to the electrode 602 of the piezoelectric element 60, the capacitors C9*a*4, C9*b*4, and C9*c*4 in which one end is electrically coupled to the electrode 603 of the piezoelectric element 60 included in the discharge module 23-4 and the ground potential GND1 is supplied to the other end, and the capacitor C8-4 in which one end is electrically coupled to the electrode 603 of the piezoelectric element 60 included in the discharge module 23-4, and the ground potential GND2 is supplied to the other end.

Furthermore, the drive circuit substrate 800 is provided with the drive circuit 52*a*5 that includes the transistors M1 and the capacitors C1 and C7 in which the ground potential GND1 is supplied to one end, and that outputs the drive signal COMA5 driving the piezoelectric element 60 included in the discharge module 23-5 so that ink is discharged from the nozzle N included in the discharge module 23-5 of the liquid discharge module 20 to the electrode 602 of the piezoelectric element 60, the drive circuit 52*b*5 that includes the transistors M1 and the capacitors C1 and C7 in which the ground potential GND1 is supplied to one end, and that outputs the drive signal COMB5 driving the piezoelectric element 60 included in the discharge module 23-5 so that ink is discharged from the nozzle N included in the discharge module 23-5 of the liquid discharge module 20 to the electrode 602 of the piezoelectric element 60, the drive circuit 52*c*5 that includes the transistors M1 and the capacitors C1 and C7 in which the ground potential GND1 is supplied to one end, and that outputs the drive signal COMC5 driving the piezoelectric element 60 included in the discharge module 23-5 so that ink is not discharged from the nozzle N included in the discharge module 23-5 of the liquid discharge module 20 to the electrode 602 of the piezoelectric element 60, the capacitors C9*a*5, C9*b*5, and C9*c*5 in which one end is electrically coupled to the electrode 603 of the piezoelectric element 60 included in the discharge module 23-5 and the ground potential GND1 is supplied to the other end, and the capacitor C8-5 in which one end is electrically coupled to the electrode 603 of the piezoelectric element 60 included in the discharge module 23-5, and the ground potential GND2 is supplied to the other end.

Furthermore, the drive circuit substrate 800 is provided with the drive circuit 52*a*6 that includes the transistors M1 and the capacitors C1 and C7 in which the ground potential GND1 is supplied to one end, and that outputs the drive signal COMA6 driving the piezoelectric element 60 included in the discharge module 23-6 so that ink is discharged from the nozzle N included in the discharge module 23-6 of the liquid discharge module 20 to the electrode 602 of the piezoelectric element 60, the drive circuit **52*b*6 that includes the transistors M1 and the capacitors C1 and C7 in which the ground potential GND1 is supplied to one end, and that outputs the drive signal COMB6 driving the piezoelectric element 60 included in the discharge module 23-6 so that ink is discharged from the nozzle N included in the discharge module 23-6 of the liquid discharge module 20 to the electrode 602 of the piezoelectric element 60, the drive circuit 52*c*6 that includes the transistors M1 and the capacitors C1 and C7 in which the ground potential GND1 is supplied to one end, and that outputs the drive signal COMC6 driving the piezoelectric element 60 included in the discharge module 23-6 so that ink is not discharged from the nozzle N included in the discharge module 23-6 of the liquid discharge module 20 to the electrode 602 of the piezoelectric element 60, the capacitors C9*a*6, C9*b*6, and C9*c*6 in which one end is electrically coupled to the electrode 603 of the piezoelectric element 60 included in the discharge module 23-6 and the ground potential GND1 is supplied to the other end, and the capacitor C8-6 in which one end is electrically coupled to the electrode 603 of the piezoelectric element 60 included in the discharge module 23-6, and the ground potential GND2** is supplied to the other end.

Furthermore, the drive circuit substrate 800 is provided with the reference voltage output circuit 53 that outputs the reference voltage signal VBS to the electrode 603 of the piezoelectric element 60 included in the discharge module 23-1, the electrode 603 of the piezoelectric element 60 included in the discharge module 23-2, the electrode 603 of the piezoelectric element 60 included in the discharge module 23-3, the electrode 603 of the piezoelectric element 60 included in the discharge module 23-4, the electrode 603 of the piezoelectric element 60 included in the discharge module 23-5, and the electrode 603 of the piezoelectric element 60 included in the discharge module 23-6.

In such a drive circuit substrate 800, each of the capacitors C**9*a*1 to C9*a*6, C9*b*1 to C9*b*6, and C9*c*1 to C9*c*6 is a chip capacitor, and each of the capacitors C8-1 to C8-6 is an electrolytic capacitor. That is, each of the capacitances of the capacitors C9*a*1 to C9*a*6, C9*b*1 to C9*b*6, and C9*c*1 to C9*c*6 is smaller than each of the capacitances of the capacitors C8-1 to C8-6**.

Here, the capacitors C**9*a*1 to C9*a*6, C9*b*1 to C9*b*6, and C9*c*1 to C9*c*6 all have the same use, function, and configuration, and may be simply referred to as a capacitor C9 when it is not necessary to distinguish the capacitors in the following description. In addition, the capacitors C6-1 to C6-6 all have the same use, function, and configuration, and may be simply referred to as a capacitor C6 when it is not necessary to distinguish the capacitors in the following description. In addition, the capacitors C8-1 to C8-6 all have the same use, function, and configuration, and may be simply referred to as a capacitor C8 when it is not necessary to distinguish the capacitors in the following description. In addition, in the following description, the wiring WSc and WS1 to WS6** through which the reference voltage signal VBS propagates may be collectively referred to as wiring WS.

Figure 14:
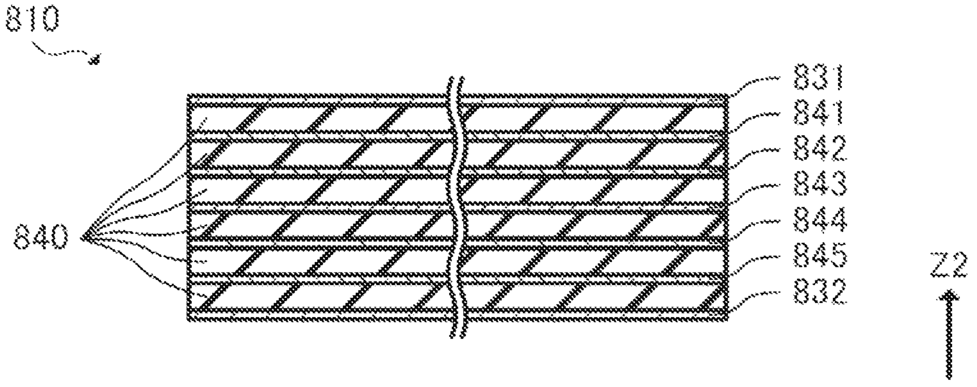
FIG. 14 is a diagram illustrating an example of a cross-sectional structure of a wiring substrate included in a drive circuit substrate.

Next, a specific example of the drive circuit substrate 800 corresponding to the electrical coupling relationship of the drive circuit substrate 800 illustrated in FIG. 13 will be described. FIG. 14 is a diagram illustrating an example of a cross-sectional structure of the wiring substrate 810 included in the drive circuit substrate 800. As illustrated in FIG. 14, the wiring substrate 810 includes a surface 831 and a surface 832. The surface 831 and the surface 832 are located so as to face each other along the Z2 direction so that the surface 831 is on the +Z2 side and the surface 832 is on the −Z2 side.

The wiring substrate 810 includes a plurality of layers 840 and layers 841 to 845. The layers 841 to 845 are located between the surfaces 831 and 832, and are located in the order of the layer 841, the layer 842, the layer 843, the layer 844, and the layer 845 from the +Z2 side where the surface 831 is located toward the −Z2 side where the surface 832 is located in the direction along the Z2 direction. The plurality of layers 840 are located between the surface 831 and the layer 841, between the layer 841 and the layer 842, between the layer 842 and the layer 843, between the layer 843 and the layer 844, between the layer 844 and the layer 845, and between the layer 845 and the surface 832, respectively in the direction along the Z2 direction.

On the surfaces 831 and 832, a plurality of electronic components constituting various circuits including the plurality of drive circuits 52, and a part of a plurality of wiring patterns for electrically coupling the electronic components to each other and propagating various signals are provided. In addition, the layers 841 to 845 are provided with a part of the plurality of wiring patterns for electrically coupling the electronic components provided on the surfaces 831 and 832 and propagating various signals. The layer 840 insulates the surfaces 831 and 832 and the layers 841 to 845 from each other. That is, the surfaces 831, 832 and the layers 841 to 845 correspond to the wiring layer provided with the wiring pattern for propagating various signals, and the plurality of layers 840 correspond to the insulating layer.

Each of the surfaces 831 and 832 corresponding to the wiring layer and the layers 841 to 845 has a plurality of wiring patterns formed by etching a copper foil, which is a material having excellent electrical conductivity for propagating various signals. The plurality of layers 840 corresponding to the insulating layer are substances having excellent insulating performance, and are configured to include an epoxy glass or the like formed by impregnating a glass fiber cloth with an epoxy resin.

As described above, the wiring substrate 810 according to the first embodiment is a so-called multilayer substrate including the surface 831 and the surface 832 different from the surface 831 and having a plurality of layers between the surface 831 and the surface 832.

Figure 15:
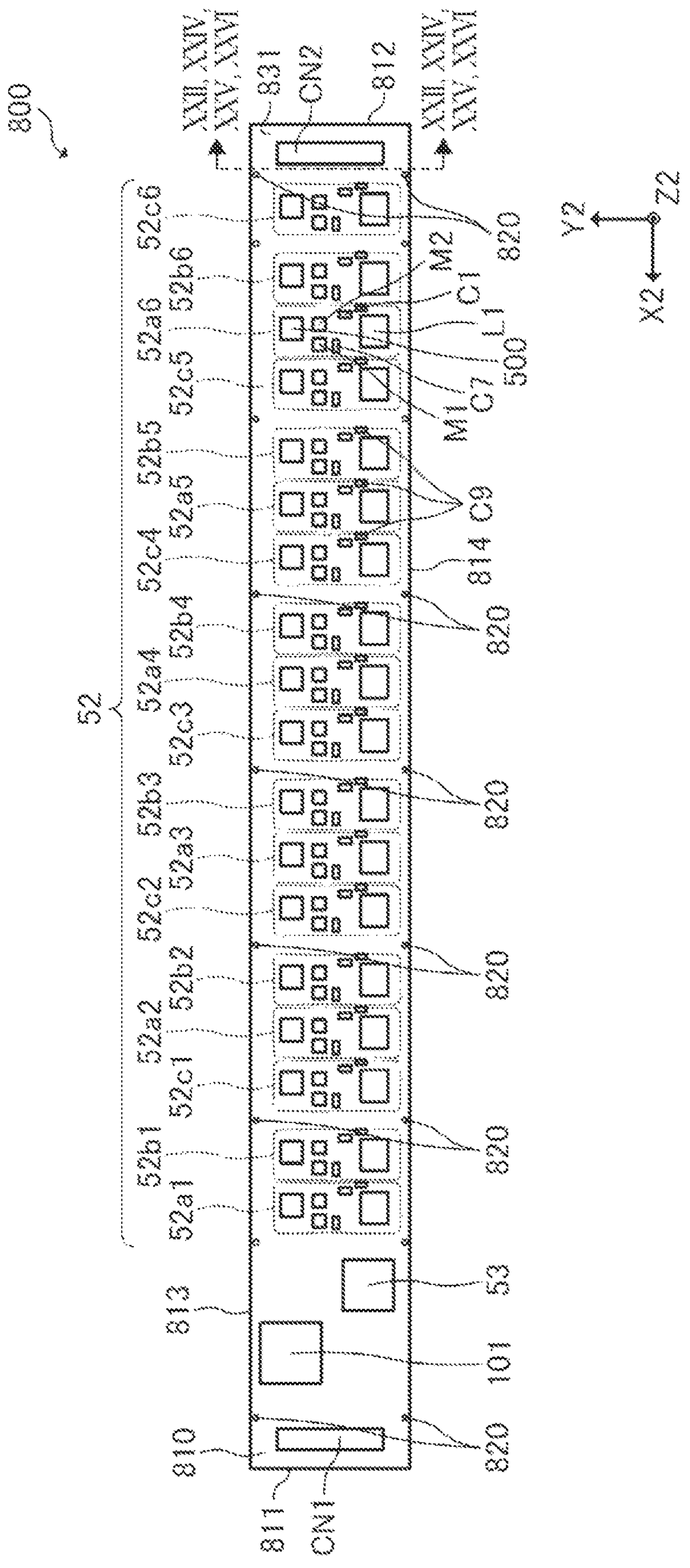
FIG. 15 is a diagram illustrating an example of a configuration of a surface of the wiring substrate.

First, a specific example of the configuration of the surfaces 831, 832 on which various electronic components are mounted will be described. FIG. 15 is a diagram illustrating an example of a configuration of the surface 831 of the wiring substrate 810. Here, FIG. 15 illustrates an example of the configuration of the surface 831 when the wiring substrate 810 is viewed from the +Z2 side along the Z2 direction. In the following description, the case where the wiring substrate 810 is viewed from the +Z2 side along the Z2 direction may be referred to as a plan view of the wiring substrate 810.

As illustrated in FIG. 15, the wiring substrate 810 is a substantially rectangular shape including sides 811 and 812 facing each other along the X2 direction and sides 813 and 814 facing each other along the Y2 direction. Specifically, the side 811 is located on the +X2 side of the wiring substrate 810, and the side 812 is located on the −X2 side of the wiring substrate 810. The side 813 intersects both sides 811 and 812 and is located on the +Y2 side of the wiring substrate 810. The side 814 intersects both sides 811 and 812 and is located on the −Y2 side of the wiring substrate 810.

As illustrated in FIG. 15, the coupling portions CN1 and CN2, the integrated circuit 101, the plurality of drive circuits 52, the reference voltage output circuit 53, and the plurality of capacitors C9 provided corresponding to each of the plurality of drive circuits 52 are provided on the surface 831 of the wiring substrate 810.

The coupling portion CN1 is located along the side 811 and is electrically coupled to the control unit 2. Specifically, a cable (not illustrated) electrically coupled to the control unit 2 is attached to the coupling portion CN1. As a result, a signal including the image information signal IP output by the control unit 2 is supplied to the head drive module 10. The coupling portion CN1 may be a board to board (B to B) connector that enables electrical coupling between the control unit 2 and the head drive module 10 without using a cable.

The coupling portion CN2 is located along the side 812 of the wiring substrate 810 and is electrically coupled to the liquid discharge module 20. Specifically, one end of the coupling member 30 is attached to the coupling portion CN2. In addition, the other end of the coupling member 30 is coupled to the coupling portion 330 included in the liquid discharge module 20. As a result, the signal including the drive signals COMA1 to COMA6, COMB1 to COMB6, and COMC1 to COMC6 and the data signal DATA output by the head drive module 10 are supplied to the liquid discharge module 20 via the coupling portion CN2 and the coupling member 30. Here, the coupling portions CN2 and 330 may be B to B connectors as described above.

The integrated circuit 101 is located on the −X2 side of the coupling portion CN1. The integrated circuit 101 includes all of the above-described control circuit 100 and all of the conversion circuit 120. The integrated circuit 101 generates and outputs various signals including the data signal DATA, the basic drive signal dA1 to dA6, dB1 to dB6, and dC1 to dC6 based on the image information signal IP input via the coupling portion CN1. The data signal DATA output by the integrated circuit 101 propagates through a wiring pattern (not illustrated) provided on the wiring substrate 810, and is output to the liquid discharge module 20 via the coupling portion CN2. In addition, each of the basic drive signals dA1 to dA6, dB1 to dB6, and dC1 to dC6 output by the integrated circuit 101 propagates through a wiring pattern (not illustrated) provided on the wiring substrate 810, and is input to the corresponding drive circuits 52*a*1 to 52*a*6, 52*b*1 to 52*b*6, and 52*c*1 to 52*c*6. A part of the control circuit 100 included in the integrated circuit 101 or a part of the conversion circuit 120 may be configured outside the integrated circuit 101.

The reference voltage output circuit 53 is located on the −X2 side of the integrated circuit 101. The reference voltage output circuit 53 generates and outputs a reference voltage signal VBS by stepping down or stepping up the voltage VHV input from the coupling portion CN1 or a voltage signal (not illustrated). The reference voltage signal VBS propagates through the wiring pattern provided on the wiring substrate 810 and is supplied to the liquid discharge module 20 via the coupling portion CN2. Such a reference voltage output circuit 53 may be configured to include one or a plurality of semiconductor devices, or may be configured to include a plurality of electronic components.

Here, FIG. 15 illustrates a case where the integrated circuit 101 and the reference voltage output circuit 53 are disposed on the surface 831 of the wiring substrate 810 together with the plurality of drive circuits 52, but at least one of the integrated circuit 101 and the reference voltage output circuit 53 may be disposed on the surface 832 of the wiring substrate 810. Furthermore, at least one of the integrated circuit 101 and the reference voltage output circuit 53 may be provided on a circuit substrate (not illustrated) different from the wiring substrate 810.

The plurality of drive circuits 52 including the drive circuits 52*a*1 to 52*a*6, 52*b*1 to 52*b*6, and 52*c*1 to 52*c*6 are located between the reference voltage output circuit 53 and the coupling portion CN2, and are located side by side along the X2 direction. Specifically, the drive circuits 52*a*1 to 52*a*6, 52*b*1 to 52*b*6, and 52*c*1 to 52*c*6 corresponding to each of the discharge modules 23-1 to 23-6 included in the liquid discharge module 20 are located side by side in the order of the drive circuits 52*a*1, 52*b*1, 52C1, 52*a*2, 52*b*2, 52*c*2, 52*a*3, 52*b*3, 52*c*3, 52*a*4, 52*b*4, 52*c*4, 52*a*5, 52*b*5, 52*c*5, 52*a*6, 52*b*6, and 52*c*6 on the surface 831 of the wiring substrate 810 from the +X2 side to the −X2 side along the X2 direction.

In addition, in this case, the transistor M1 and the transistor M2 included in each of the plurality of drive circuits 52 are located side by side so that the transistor M1 is on the +X2 side and the transistor M2 is on the −X2 side in the direction along the X2 direction. The inductor L1 is located on the −Y2 side of the transistors M1 and M2 located side by side in the direction along the X2 direction, and the integrated circuit 500 is located on the +Y2 side of the transistors M1 and M2 located side by side in the direction along the X2 direction. That is, the integrated circuit 500, the transistors M1 and M2, and the inductor L1 included in the drive circuit 52 are located side by side in the order of the integrated circuit 500, the transistors M1 and M2 arranged side by side, and the inductor L1 along the direction from the side 813 to the side 814 in the surface 831 of the wiring substrate 810.

In addition, the capacitors C1 and C7 of each of the plurality of drive circuits 52 are located between the transistors M1 and M2 arranged side by side along the direction from the side 813 toward the side 814 and the inductor L1. In this case, the capacitor C7 is located in the vicinity of the transistor M1, and the capacitor C1 is located in the vicinity of the inductor L1.

The capacitor C7 reduces noise that can be superimposed on the voltage VHV supplied to the drain of the transistor M1 and also reduces voltage fluctuations that can occur in the voltage VHV. By locating such a capacitor C7 in the vicinity of the transistor M1, the wiring length between the capacitor C1 and the drain of the transistor M1 can be shortened. As a result, the possibility that noise is superimposed on the voltage VHV can be further reduced, and the possibility that the voltage value of the voltage VHV input to the drain of the transistor M1 fluctuates can be further reduced. As a result, the accuracy of the voltage VHV supplied to the transistor M1 is improved, and the accuracy of the amplification modulation signals AMs output by the amplifier circuit 550 including the transistor M1 is improved.

The capacitor C1 and the inductor L1 constitute low-pass filter. The capacitor C1 constituting such a low-pass filter that generates a drive signal COM by demodulating the amplification modulation signal AMs output by the amplifier circuit 550 by a low-pass filter including the capacitor C1 and the inductor L1 is located in the vicinity of the inductor L1, so that the wiring length that electrically couples the capacitor C1 and the inductor L1 can be shortened. As a result, the operational stability of the low-pass filter configured to include the capacitor C1 and the inductor L1 can be shortened. Therefore, the waveform accuracy of the drive signal COM output by the demodulation circuit 560 including the low-pass filter configured to include the capacitor C1 and the inductor L1 is improved.

Here, in the wiring substrate 810, the integrated circuits 500 included in each of the plurality of drive circuits 52 are located side by side along the X2 direction. The transistors M1 and M2 arranged side by side are alternately located side by side along the X2 direction, and the inductors L1 are located side by side along the X2 direction. That is, the plurality of drive circuits 52 are located on the surface 831 of the wiring substrate 810 so that a row of integrated circuits 500 arranged side by side from the side 812 to the side 811, a row of transistors M1 and M2 arranged side by side from the side 812 to the side 811, and a row of inductor L1 arranged side by side from the side 812 to the side 811 are formed.

The plurality of capacitors C9 are provided corresponding to each of the plurality of drive circuits 52. Specifically, at least one of the plurality of capacitors C9 is located on the −X2 side of the drive circuit 52*a*1 in the vicinity of the inductor L1 and the capacitor C1 included in the drive circuit 52*a*1. The capacitor C9 located in the vicinity of the inductor L1 and the capacitor C1 included in the drive circuit 52*a*1 corresponds to the capacitor C9*a*1 corresponding to the drive circuit 52*a*1. In addition, at least one of the plurality of capacitors C9 is located on the −X2 side of the drive circuit 52*b*1 in the vicinity of the inductor L1 and the capacitor C1 included in the drive circuit 52*b*1. The capacitor C9 located in the vicinity of the inductor L1 and the capacitor C1 included in the drive circuit 52*b*1 corresponds to the capacitor C9*b*1 corresponding to the drive circuit 52*b*1. In addition, at least one of the plurality of capacitors C9 is located on the −X2 side of the drive circuit 52*c*1 in the vicinity of the inductor L1 and the capacitor C1 included in the drive circuit 52*c*1. The capacitor C9 located in the vicinity of the inductor L1 and the capacitor C1 included in the drive circuit 52*c*1 corresponds to the capacitor C9*c*1 corresponding to the drive circuit 52*c*1.

Similarly, the plurality of capacitors C9 are located on the −X2 side of each of the drive circuits 52*a*2 to 52*a*6 in the vicinity of the inductor L1 and the capacitors C1 included in each of the drive circuits 52*a*2 to 52*a*6. The capacitors C9 located in the vicinity of the inductor L1 and the capacitors C1 included in each of the drive circuits 52*a*2 to 52*a*6 correspond to the capacitors C9*a*2 to C9*a*6 corresponding to each of the drive circuits 52*a*2 to 52*a*6. In addition, the plurality of capacitors C9 are located on the −X2 side of each of the drive circuits 52*b*2 to 52*b*6 in the vicinity of the inductor L1 and the capacitors C1 included in each of the drive circuits 52*b*2 to 52*b*6. The capacitors C9 located in the vicinity of the inductor L1 and the capacitors C1 included in each of the drive circuits 52*b*2 to 52*b*6 correspond to the capacitors C9*b*2 to C9*b*6 corresponding to each of the drive circuits 52*b*2 to 52*b*6. In addition, the plurality of capacitors C9 are located on the −X2 side of each of the drive circuits 52*c*2 to 52*c*6 in the vicinity of the inductor L1 and the capacitors C1 included in each of the drive circuits 52*c*2 to 52*c*6. The capacitors C9 located in the vicinity of the inductor L1 and the capacitors C1 included in each of the drive circuits 52*c*2 to 52*c*6 correspond to the capacitors C9*c*2 to C9*c*1 corresponding to each of the drive circuits 52*c*2 to 52*c*6.

As described above, in the liquid discharge device 1 of the first embodiment, the transistors M1 and the capacitors C1 and C7 included in each of the drive circuits 52*a*1 to 52*a*6, 52*b*1 to 52*b*6, and 52*c*1 to 52*c*6, and each of the capacitors C9*a*1 to C9*a*6, C9*b*1 to C9*b*6, and C9*c*1 to C9*c*6 corresponding to each of the drive circuits 52*a*1 to 52*a*6, 52*b*1 to 52*b*6, and 52*c*1 to 52*c*6 are provided on the surface 831 of the wiring substrate 810.

Figure 16:
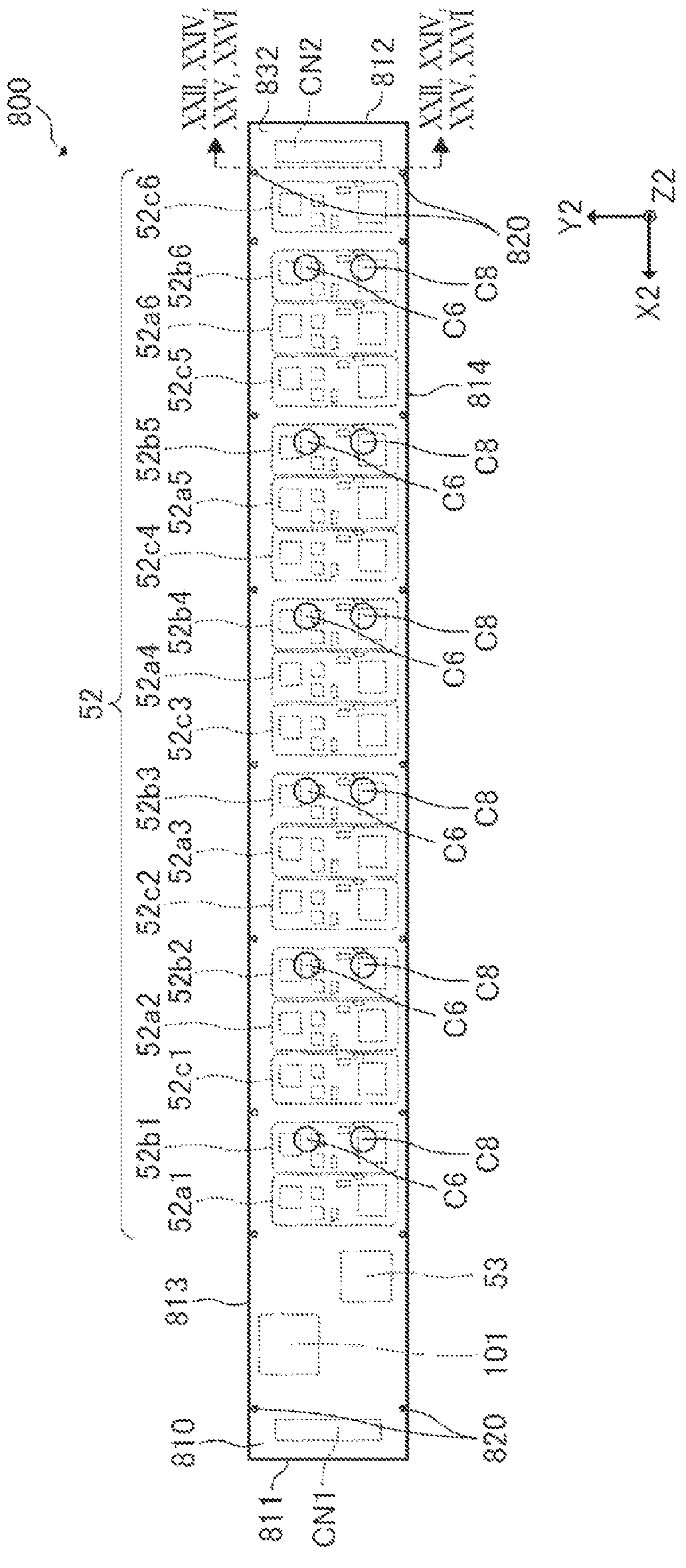
FIG. 16 is a diagram illustrating an example of a configuration of a surface of the wiring substrate.

FIG. 16 is a diagram illustrating an example of a configuration of the surface 832 of the wiring substrate 810. Here, FIG. 16 is a perspective view illustrating an example of the configuration of the surface 832 in a plan view of the wiring substrate 810. In FIG. 16, a part of the configuration provided other than the surface 832 of the wiring substrate 810 is illustrated by a broken line.

As illustrated in FIG. 16, a plurality of capacitors C6 and a plurality of capacitors C8 are provided on the surface 832 of the wiring substrate 810.

One of the plurality of capacitors C6 is provided on the surface 832 of the wiring substrate 810 so that at least a part thereof overlaps with at least one of the drive circuits 52*a*1, 52*b*1, and 52*c*1 in a plan view of the wiring substrate 810. The capacitor C6 provided so that at least one of the drive circuits 52*a*1, 52*b*1, and 52*c*1 and at least a part thereof overlap with each other corresponds to the capacitor C6-1 for stabilizing the voltage value of the voltage VHV input to the drive circuits 52*a*1, 52*b*1, and 52*c*1 that output each of the drive signals COMA1, COMB1, and COMC1 to the discharge module 23-1. In addition, one of the plurality of capacitors C8 is provided on the surface 832 of the wiring substrate 810 so that at least a part thereof overlaps with at least one of the drive circuits 52*a*1, 52*b*1, and 52*c*1 in a plan view of the wiring substrate 810. The capacitor C8 provided so that at least one of the drive circuits 52*a*1, 52*b*1, and 52*c*1 and at least a part thereof overlap with each other corresponds to the capacitor C8-1 for stabilizing the voltage value of the reference voltage signal VBS supplied to the discharge module 23-1.

One of the plurality of capacitors C6 is provided on the surface 832 of the wiring substrate 810 so that at least a part thereof overlaps with at least one of the drive circuits 52*a*2, 52*b*2, and 52*c*2 in a plan view of the wiring substrate 810. The capacitor C6 provided so that at least one of the drive circuits 52*a*2, 52*b*2, and 52*c*2 and at least a part thereof overlap with each other corresponds to the capacitor C6-2 for stabilizing the voltage value of the voltage VHV input to the drive circuits 52*a*2, 52*b*2, and 52*c*2 that output each of the drive signals COMA2, COMB2, and COMC2 to the discharge module 23-2. In addition, one of the plurality of capacitors C8 is provided on the surface 832 of the wiring substrate 810 so that at least a part thereof overlaps with at least one of the drive circuits 52*a*2, 52*b*2, and 52*c*2 in a plan view of the wiring substrate 810. The capacitor C8 provided so that at least one of the drive circuits 52*a*2, 52*b*2, and 52*c*2 and at least a part thereof overlap with each other corresponds to the capacitor C8-2 for stabilizing the voltage value of the reference voltage signal VBS supplied to the discharge module 23-2.

One of the plurality of capacitors C6 is provided on the surface 832 of the wiring substrate 810 so that at least a part thereof overlaps with at least one of the drive circuits 52*a*3, 52*b*3, and 52*c*3 in a plan view of the wiring substrate 810. The capacitor C6 provided so that at least one of the drive circuits 52*a*3, 52*b*3, and 52*c*3 and at least a part thereof overlap with each other corresponds to the capacitor C6-3 for stabilizing the voltage value of the voltage VHV input to the drive circuits 52*a*3, 52*b*3, and 52*c*3 that output each of the drive signals COMA3, COMB3, and COMC3 to the discharge module 23-3. In addition, one of the plurality of capacitors C8 is provided on the surface 832 of the wiring substrate 810 so that at least a part thereof overlaps with at least one of the drive circuits 52*a*3, 52*b*3, and 52*c*3 in a plan view of the wiring substrate 810. The capacitor C8 provided so that at least one of the drive circuits 52*a*3, 52*b*3, and 52*c*3 and at least a part thereof overlap with each other corresponds to the capacitor C8-3 for stabilizing the voltage value of the reference voltage signal VBS supplied to the discharge module 23-3.

One of the plurality of capacitors C6 is provided on the surface 832 of the wiring substrate 810 so that at least a part thereof overlaps with at least one of the drive circuits 52*a*4, 52*b*4, and 52*c*4 in a plan view of the wiring substrate 810. The capacitor C6 provided so that at least one of the drive circuits 52*a*4, 52*b*4, and 52*c*4 and at least a part thereof overlap with each other corresponds to the capacitor C6-4 for stabilizing the voltage value of the voltage VHV input to the drive circuits 52*a*4, 52*b*4, and 52*c*4 that output each of the drive signals COMA4, COMB4, and COMC4 to the discharge module 23-4. In addition, one of the plurality of capacitors C8 is provided on the surface 832 of the wiring substrate 810 so that at least a part thereof overlaps with at least one of the drive circuits 52*a*4, 52*b*4, and 52*c*4 in a plan view of the wiring substrate 810. The capacitor C8 provided so that at least one of the drive circuits 52*a*4, 52*b*4, and 52*c*4 and at least a part thereof overlap with each other corresponds to the capacitor C8-4 for stabilizing the voltage value of the reference voltage signal VBS supplied to the discharge module 23-4.

One of the plurality of capacitors C6 is provided on the surface 832 of the wiring substrate 810 so that at least a part thereof overlaps with at least one of the drive circuits 52*a*5, 52*b*5, and 52*c*5 in a plan view of the wiring substrate 810. The capacitor C6 provided so that at least one of the drive circuits 52*a*5, 52*b*5, and 52*c*5 and at least a part thereof overlap with each other corresponds to the capacitor C6-5 for stabilizing the voltage value of the voltage VHV input to the drive circuits 52*a*5, 52*b*5, and 52*c*5 that output each of the drive signals COMA5, COMB5, and COMC5 to the discharge module 23-5. In addition, one of the plurality of capacitors C8 is provided on the surface 832 of the wiring substrate 810 so that at least a part thereof overlaps with at least one of the drive circuits 52*a*5, 52*b*5, and 52*c*5 in a plan view of the wiring substrate 810. The capacitor C8 provided so that at least one of the drive circuits 52*a*5, 52*b*5, and 52*c*5 and at least a part thereof overlap with each other corresponds to the capacitor C8-5 for stabilizing the voltage value of the reference voltage signal VBS supplied to the discharge module 23-5.

One of the plurality of capacitors C6 is provided on the surface 832 of the wiring substrate 810 so that at least a part thereof overlaps with at least one of the drive circuits 52*a*6, 52*b*6, and 52*c*6 in a plan view of the wiring substrate 810. The capacitor C6 provided so that at least one of the drive circuits 52*a*6, 52*b*6, and 52*c*6 and at least a part thereof overlap with each other corresponds to the capacitor C6-6 for stabilizing the voltage value of the voltage VHV input to the drive circuits 52*a*6, 52*b*6, and 52*c*6 that output each of the drive signals COMA6, COMB6, and COMC6 to the discharge module 23-6. In addition, one of the plurality of capacitors C8 is provided on the surface 832 of the wiring substrate 810 so that at least a part thereof overlaps with at least one of the drive circuits 52*a*6, 52*b*6, and 52*c*6 in a plan view of the wiring substrate 810. The capacitor C8 provided so that at least one of the drive circuits 52*a*6, 52*b*6, and 52*c*6 and at least a part thereof overlap with each other corresponds to the capacitor C8-6 for stabilizing the voltage value of the reference voltage signal VBS supplied to the discharge module 23-6.

As described above, in the liquid discharge device 1 of the first embodiment, the capacitors C8-1 to C8-6 for stabilizing the voltage value of the reference voltage signal VBS input to each of the discharge modules 23-1 to 23-6 are provided on the surface 832 of the wiring substrate 810. That is, the capacitors C8-1 to C8-6 are provided on the surface of the wiring substrate 810, which is different from the plurality of drive circuits 52.

Here, the capacitors C8-1 to C8-6 preferably have a large capacitance as described above, and thus are configured to include an electrolytic capacitor. Therefore, the size of the capacitors C8-1 to C8-6 is larger than that of the plurality of capacitors C9 provided on the surface 831 of the wiring substrate 810 and configured to include the chip capacitors. Specifically, a mounting area where the capacitor C9 is mounted on the wiring substrate 810 is smaller than a mounting area where the capacitor C8 is mounted on the wiring substrate 810. In other words, the size of the capacitor C9 when the wiring substrate 810 is viewed along the normal direction and the Z2 direction is smaller than the size of the capacitor C8 when the wiring substrate 810 is viewed along the normal direction and the Z2 direction.

The capacitor C9 that can be provided on the wiring substrate 810 with such a small mounting area is provided on the same mounting surface as that of the plurality of drive circuits 52 on the wiring substrate 810, and the capacitor C8 provided on the wiring substrate 810 with a large mounting area is provided on the wiring substrate 810 on a mounting surface different from that of the plurality of drive circuits 52. Therefore, the mounting area of the wiring substrate 810 can be effectively utilized, and the possibility that the size of the drive circuit substrate 800 is increased can be reduced.

Next, the configurations of the layers 841 to 845 located between the surface 831 and the surface 832 of the wiring layers of the wiring substrate 810 will be described. As illustrated in FIG. 14, the layers 841 to 845 included in the wiring substrate 810 are located in the order of the layer 841, the layer 842, the layer 843, the layer 844, and the layer 845 from the +Z2 side where the surface 831 is located toward the −Z2 side where the surface 832 is located in the direction along the Z2 direction. The layer 841 is provided with a wiring pattern through which the ground potential GND1 propagates in the reference potential of the drive circuit substrate 800. In addition, the layer 842 is provided with wirings WA1 to WA6 through which the drive signals COMA1 to COMA6 propagate. In addition, the layer 843 is provided with wirings WC1 to WC6 through which the drive signals COMC1 to COMC6 propagate, and wiring WS through which the reference voltage signal VBS propagates. In addition, the layer 844 is provided with wirings WB1 to WB6 through which the drive signals COMB1 to COMB6 propagate. In addition, the layer 845 is provided with a wiring pattern through which the ground potential GND2 propagates in the reference potential of the drive circuit substrate 800.

That is, the wiring substrate 810 includes the layer 841 including the wiring pattern through which the ground potential GND1 propagates in the reference potential having a constant potential of the drive circuit substrate 800, the layer 842 provided with each of the wirings WA1 to WA6 through which each of the drive signals COMA1 to COMA6 propagates, the layer 843 provided with each of the wirings WC1 to WC6 through which each of the drive signals COMC1 to COMC6 propagates and the wiring WS through which the reference voltage signal VBS propagates, and located between the layer 842 and the layer 844 along the Z2 direction as one direction, the layer 844 provided with each of the wirings WB1 to WB6 through which each of the drive signals COMB1 to COMB6 propagates, and the layer 845 including the wiring pattern through which the ground potential GND2 propagates in the reference potential of the drive circuit substrate 800.

That is, in the wiring substrate 810, the surface 831 provided with the plurality of drive circuits 52 and the plurality of capacitors C9, and the layer 841 provided with the wiring pattern through which the ground potential GND1, to which the plurality of drive circuits 52 and the plurality of capacitors C9 are electrically coupled, propagates are located adjacent to each other. The surface 832 provided with the plurality of capacitors C6 and C8, and the layer 845 provided with the wiring pattern through which the ground potential GND2, to which the plurality of capacitors C6 and C8 are electrically coupled, propagates are located adjacent to each other. In other words, the shortest distance between the surface 831 and the layer 841 is shorter than the shortest distance between the surface 831 and the layer 845, and the shortest distance between the surface 832 and the layer 845 is shorter than the shortest distance between the surface 832 and the layer 841.

Figure 17:
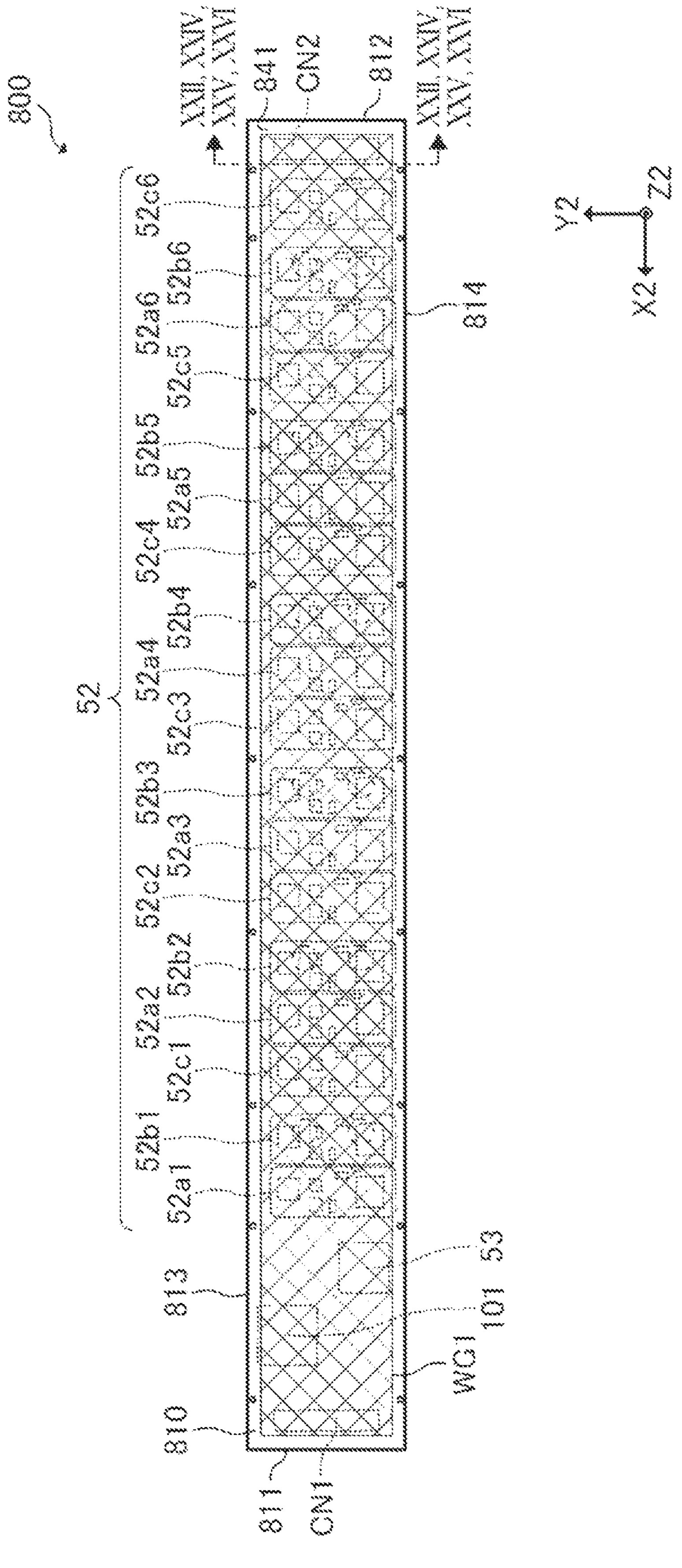
FIG. 17 is a diagram illustrating an example of a configuration of a layer of the wiring substrate.

First, a specific example of the configuration of the layer 841 of the inner layers of the wiring substrate 810 will be described. FIG. 17 is a diagram illustrating an example of a configuration of the layer 841 of the wiring substrate 810. Here, FIG. 17 is a perspective view illustrating an example of the configuration of the layer 841 in a plan view of the wiring substrate 810. In FIG. 17, a part of the configuration provided other than the layer 841 of the wiring substrate 810 is illustrated by a broken line.

As illustrated in FIG. 17, the wiring WG1 is formed on substantially one surface of the layer 841 in the layer 841. Specifically, the layer 841 is formed with the wiring WG1 so that at least a part thereof overlaps with each of the drive circuits 52*a*1 to 52*a*6, 52*b*1 to 52*b*6, and 52*c*1 to 52*c*6 in a plan view of the wiring substrate 810. The ground potential GND1 is supplied to the wiring WG1 of the reference potentials of the drive circuit substrate 800. That is, the other end of each of the capacitors C9*a*1 to C9*a*6, C9*b*1 to C9*b*6, and C9*c*1 to C9*c*6, the other end of the capacitors C1, the source of the transistor M2, and the other end of the capacitors C7 included in each of the drive circuits 52*a*1 to 52*a*6, 52*b*1 to 52*b*6, and 52*c*1 to 52*c*6, and the like are electrically coupled to the wiring WG1 formed on the layer 841.

Therefore, the other end of the capacitor C1, the source of the transistor M2, and the other end of the capacitor C7 included in each of the drive circuits 52*a*1 to 52*a*6, 52*b*1 to 52*b*6, and 52*c*1 to 52*c*6, and the other end of each of the capacitors C9*a*1 to C9*a*6, C9*b*1 to C9*b*6, and C9*c*1 to C9*c*6 are electrically coupled to the wiring WG1 through which the ground potential GND1 propagates without using the wiring pattern through which the ground potential GND2 propagates.

As a result, the wiring length of the feedback path in which the current generated by the propagation of the drive signals COMA1 to COMA6, COMB1 to COMB6, and COMC1 to COMC6 returns to each of the drive circuits 52*a*1 to 52*a*6, 52*b*1 to 52*b*6, and 52*c*1 to 52*c*6 via each of the capacitors C9*a*1 to C9*a*6, C9*b*1 to C9*b*6, and C9*c*1 to C9*c*6, and the wiring pattern through which the ground potential GND1 propagates can be shortened. As a result, the waveform accuracy of the drive signals COMA1 to COMA6, COMB1 to COMB6, and COMC1 to COMC6, and the stability of the voltage value of the reference voltage signal VBS are improved. As a result, the discharge accuracy of the ink discharged from each of the discharge modules 23-1 to 23-6 is improved.

Here, in FIG. 17, the case where only the wiring WG1 is formed on substantially one surface of the layer 841 is illustrated, but the present disclosure is not limited thereto. That is, in addition to the wiring WG1, the layer 841 may be provided with a wiring pattern through which various signals such as the data signals DATAs, the clock signals SCK1 to SCK6 generated by restoring the data signal DATA, the print data signals SI1 to SI6, and the latch signals LAT1 to LAT6 and a power supply voltage propagate. Furthermore, the layer 841 may be provided with via wiring for electrically coupling the layers of the wiring substrate 810 to each other. Therefore, the fact that the wiring WG1 is formed on substantially one surface of the layer 841 is not limited to the fact that the wiring WG1 is formed in the entire region of the layer 841. Specifically, the wiring WG1 may occupy most of the region of the layer 841, and for example, the wiring WG1 may occupy 50% or more of the entire region of the layer 841.

Figure 18:
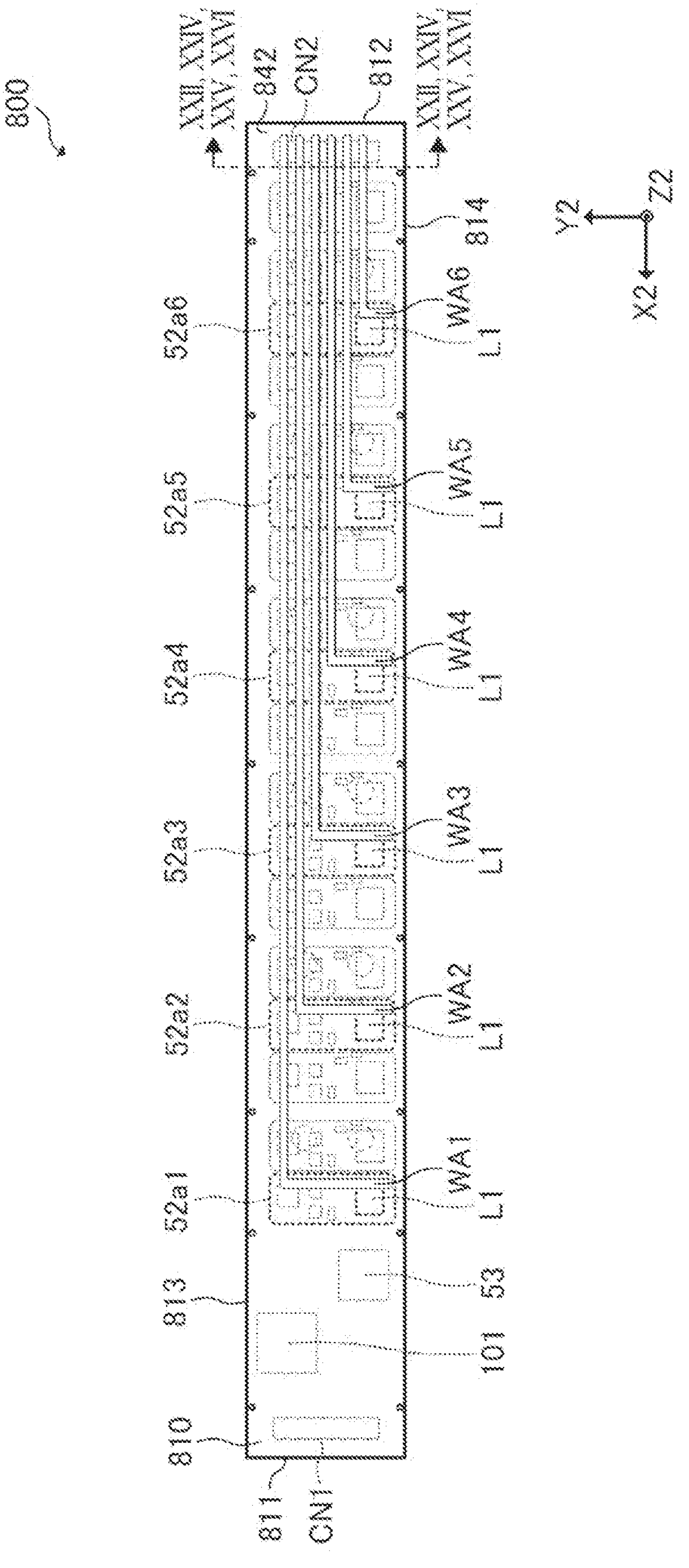
FIG. 18 is a diagram illustrating an example of a configuration of a layer of the wiring substrate.

Next, a specific example of the configuration of the layer 842 of the inner layers of the wiring substrate 810 will be described. FIG. 18 is a diagram illustrating an example of a configuration of the layer 842 of the wiring substrate 810. Here, FIG. 18 is a perspective view illustrating an example of the configuration of the layer 842 in a plan view of the wiring substrate 810. In FIG. 18, a part of the configuration provided other than the layer 842 of the wiring substrate 810 is illustrated by a broken line.

Wirings WA1 to WA6 are formed on the layer 842. One end of the wiring WA1 is electrically coupled to one end of the inductor L1 and one end of the capacitor C1 included in the drive circuit 52*a*1 through a via (not illustrated), and the other end is electrically coupled to the coupling portion CN2 through a via (not illustrated). As a result, the wiring WA1 propagates the drive signal COMA1 output by the drive circuit 52*a*1 and supplied to one end to the coupling portion CN2.

The wiring WA2 is located on the −X2 side of the wiring WA1 and on the −Y2 side of the wiring WA1. One end of the wiring WA2 is electrically coupled to one end of the inductor L1 and one end of the capacitor C1 included in the drive circuit 52*a*2 through a via (not illustrated), and the other end is electrically coupled to the coupling portion CN2 through a via (not illustrated). As a result, the wiring WA2 propagates the drive signal COMA2 output by the drive circuit 52*a*2 and supplied to one end to the coupling portion CN2.

The wiring WA3 is located on the −X2 side of the wiring WA2 and on the −Y2 side of the wiring WA2. One end of the wiring WA3 is electrically coupled to one end of the inductor L1 and one end of the capacitor C1 included in the drive circuit 52*a*3 through a via (not illustrated), and the other end is electrically coupled to the coupling portion CN2 through a via (not illustrated). As a result, the wiring WA3 propagates the drive signal COMA3 output by the drive circuit 52*a*3 and supplied to one end to the coupling portion CN2.

The wiring WA4 is located on the −X2 side of the wiring WA3 and on the −Y2 side of the wiring WA3. One end of the wiring WA4 is electrically coupled to one end of the inductor L1 and one end of the capacitor C1 included in the drive circuit 52*a*4 through a via (not illustrated), and the other end is electrically coupled to the coupling portion CN2 through a via (not illustrated). As a result, the wiring WA4 propagates the drive signal COMA4 output by the drive circuit 52*a*4 and supplied to one end to the coupling portion CN2.

The wiring WA5 is located on the −X2 side of the wiring WA4 and on the −Y2 side of the wiring WA4. One end of the wiring WA5 is electrically coupled to one end of the inductor L1 and one end of the capacitor C1 included in the drive circuit 52*a*5 through a via (not illustrated), and the other end is electrically coupled to the coupling portion CN2 through a via (not illustrated). As a result, the wiring WA5 propagates the drive signal COMA5 output by the drive circuit 52*a*5 and supplied to one end to the coupling portion CN2.

The wiring WA6 is located on the −X2 side of the wiring WA5 and on the −Y2 side of the wiring WA5. One end of the wiring WA6 is electrically coupled to one end of the inductor L1 and one end of the capacitor C1 included in the drive circuit 52*a*6 through a via (not illustrated), and the other end is electrically coupled to the coupling portion CN2 through a via (not illustrated). As a result, the wiring WA6 propagates the drive signal COMA6 output by the drive circuit 52*a*6 and supplied to one end to the coupling portion CN2.

That is, the layers 842 are formed with wirings WA1 to WA6 through which the drive signals COMA1 to COMA6 output by each of the drive circuits 52*a*1 to 52*a*6 propagate. Here, in addition to the wirings WA1 to WA6, the layer 842 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate, or via wiring for coupling the layers included in the wiring substrate 810 to each other may be provided.

As described above, the layer 842 is provided with the wirings WA1 to WA6 through which the drive signals COMA1 to COMA6 output by each of the drive circuits 52*a*1 to 52*a*6 propagate.

Figure 19:
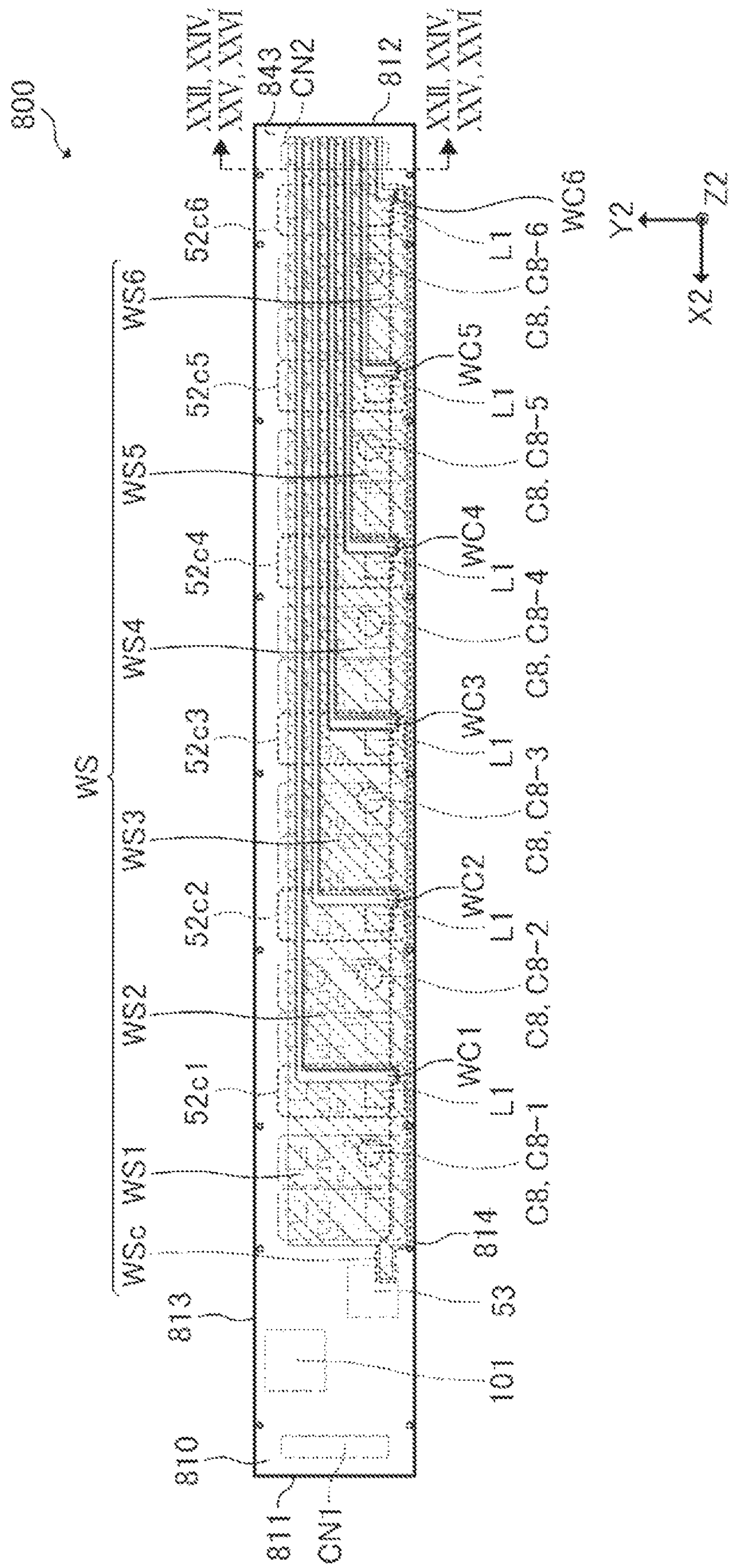
FIG. 19 is a diagram illustrating an example of a configuration of a layer of the wiring substrate.

Next, a specific example of the configuration of the layer 843 of the inner layers of the wiring substrate 810 will be described. FIG. 19 is a diagram illustrating an example of a configuration of the layer 843 of the wiring substrate 810. Here, FIG. 19 is a perspective view illustrating an example of the configuration of the layer 843 in a plan view of the wiring substrate 810. In FIG. 19, a part of the configuration provided other than the layer 843 of the wiring substrate 810 is illustrated by a broken line.

Wiring WC1 to WC6, and WS are formed on the layer 843. One end of the wiring WC1 is electrically coupled to one end of the inductor L1 and one end of the capacitor C1 included in the drive circuit 52*c*1 through a via (not illustrated), and the other end is electrically coupled to the coupling portion CN2 through a via (not illustrated). As a result, the wiring WC1 propagates the drive signal COMC1 output by the drive circuit 52*c*1 and supplied to one end to the coupling portion CN2.

The wiring WC2 is located on the −X2 side of the wiring WC1 and on the −Y2 side of the wiring WC1. One end of the wiring WC2 is electrically coupled to one end of the inductor L1 and one end of the capacitor C1 included in the drive circuit 52*c*2 through a via (not illustrated), and the other end is electrically coupled to the coupling portion CN2 through a via (not illustrated). As a result, the wiring WC2 propagates the drive signal COMC2 output by the drive circuit 52*c*2 and supplied to one end to the coupling portion CN2.

The wiring WC3 is located on the −X2 side of the wiring WC2 and on the −Y2 side of the wiring WC2. One end of the wiring WC3 is electrically coupled to one end of the inductor L1 and one end of the capacitor C1 included in the drive circuit 52*c*3 through a via (not illustrated), and the other end is electrically coupled to the coupling portion CN2 through a via (not illustrated). As a result, the wiring WC3 propagates the drive signal COMC3 output by the drive circuit 52*c*3 and supplied to one end to the coupling portion CN2.

The wiring WC4 is located on the −X2 side of the wiring WC3 and on the −Y2 side of the wiring WC3. One end of the wiring WC4 is electrically coupled to one end of the inductor L1 and one end of the capacitor C1 included in the drive circuit 52*c*4 through a via (not illustrated), and the other end is electrically coupled to the coupling portion CN2 through a via (not illustrated). As a result, the wiring WC4 propagates the drive signal COMC4 output by the drive circuit 52*c*4 and supplied to one end to the coupling portion CN2.

The wiring WC5 is located on the −X2 side of the wiring WC4 and on the −Y2 side of the wiring WC4. One end of the wiring WC5 is electrically coupled to one end of the inductor L1 and one end of the capacitor C1 included in the drive circuit 52*c*5 through a via (not illustrated), and the other end is electrically coupled to the coupling portion CN2 through a via (not illustrated). As a result, the wiring WC5 propagates the drive signal COMC5 output by the drive circuit 52*c*5 and supplied to one end to the coupling portion CN2.

The wiring WC6 is located on the −X2 side of the wiring WC5 and on the −Y2 side of the wiring WC5. One end of the wiring WC6 is electrically coupled to one end of the inductor L1 and one end of the capacitor C1 included in the drive circuit 52*c*6 through a via (not illustrated), and the other end is electrically coupled to the coupling portion CN2 through a via (not illustrated). As a result, the wiring WC6 propagates the drive signal COMC6 output by the drive circuit 52*c*6 and supplied to one end to the coupling portion CN2.

One end of the wiring WS is electrically coupled to the reference voltage output circuit 53 via a via (not illustrated) or the like. That is, the wiring WS propagates the reference voltage signal VBS. Such wiring WS includes the wirings WSc, and WS1 to WS6 as illustrated in FIG. 13.

One end of the wiring WSc is electrically coupled to the reference voltage output circuit 53 and extends along the side 814 of the wiring substrate 810. In other words, in the wiring WS, the region extending along the side 814 of the wiring substrate 810 corresponds to the wiring WSc.

The wiring WS1 is located in a region on the +X2 side and a region on the +Y2 side of the wiring WC1 on the wiring substrate 810, one end thereof is coupled to the wiring WSc, and the other end is electrically coupled to the coupling portion CN2. As a result, the wiring WS1 propagates the reference voltage signal VBS to the coupling portion CN2. Here, a coupling region where one end of the wiring WC1 and the wiring WSc are electrically coupled corresponds to the contact Csa1 illustrated in FIG. 13. In addition, in the present embodiment, in a plan view of the wiring substrate 810, at least a part of the wiring WS1 overlaps with at least a part of the drive circuits 52*a*1, 52*b*1, and 52*c*1, and the wiring WS1 is electrically coupled to one end of the capacitor C8 provided on the surface 832. A region provided in the wiring WS1 to which one end of the capacitor C8 is electrically coupled corresponds to the contact Csb1 illustrated in FIG. 13, and the capacitor C8 corresponds to the capacitor C8-1.

The wiring WS2 is located between the wiring WC1 and the wiring WC2 on the wiring substrate 810, and one end thereof is coupled to the wiring WSc and the other end is electrically coupled to the coupling portion CN2. As a result, the wiring WS2 propagates the reference voltage signal VBS to the coupling portion CN2. Here, the coupling region where one end of the wiring WC2 and the wiring WSc are electrically coupled corresponds to the contact Csa2 illustrated in FIG. 13. In addition, in the present embodiment, in a plan view of the wiring substrate 810, at least a part of the wiring WS2 overlaps with at least a part of the drive circuits 52*a*2, 52*b*2, and 52*c*2, and the wiring WS2 is electrically coupled to one end of the capacitor C8 provided on the surface 832. The region provided in the wiring WS2 to which one end of the capacitor C8 is electrically coupled corresponds to the contact Csb2 illustrated in FIG. 13, and the capacitor C8 corresponds to the capacitor C8-2.

The wiring WS3 is located between the wiring WC2 and the wiring WC3 on the wiring substrate 810, and one end thereof is coupled to the wiring WSc and the other end is electrically coupled to the coupling portion CN2. As a result, the wiring WS3 propagates the reference voltage signal VBS to the coupling portion CN2. Here, the coupling region where one end of the wiring WC3 and the wiring WSc are electrically coupled corresponds to the contact Csa3 illustrated in FIG. 13. In addition, in the present embodiment, in a plan view of the wiring substrate 810, at least a part of the wiring WS3 overlaps with at least a part of the drive circuits 52*a*3, 52*b*3, and 52*c*3, and the wiring WS3 is electrically coupled to one end of the capacitor C8 provided on the surface 832. The region provided in the wiring WS3 to which one end of the capacitor C8 is electrically coupled corresponds to the contact Csb3 illustrated in FIG. 13, and the capacitor C8 corresponds to the capacitor C8-3.

The wiring WS4 is located between the wiring WC3 and the wiring WC4 on the wiring substrate 810, and one end thereof is coupled to the wiring WSc and the other end is electrically coupled to the coupling portion CN2. As a result, the wiring WS4 propagates the reference voltage signal VBS to the coupling portion CN2. Here, the coupling region where one end of the wiring WC4 and the wiring WSc are electrically coupled corresponds to the contact Csa4 illustrated in FIG. 13. In addition, in the present embodiment, in a plan view of the wiring substrate 810, at least a part of the wiring WS4 overlaps with at least a part of the drive circuits 52*a*4, 52*b*4, and 52*c*4, and the wiring WS4 is electrically coupled to one end of the capacitor C8 provided on the surface 832. The region provided in the wiring WS4 to which one end of the capacitor C8 is electrically coupled corresponds to the contact Csb4 illustrated in FIG. 13, and the capacitor C8 corresponds to the capacitor C8-4.

The wiring WS5 is located between the wiring WC4 and the wiring WC5 on the wiring substrate 810, and one end thereof is coupled to the wiring WSc and the other end is electrically coupled to the coupling portion CN2. As a result, the wiring WS5 propagates the reference voltage signal VBS to the coupling portion CN2. Here, the coupling region where one end of the wiring WC5 and the wiring WSc are electrically coupled corresponds to the contact Csa5 illustrated in FIG. 13. In addition, in the present embodiment, in a plan view of the wiring substrate 810, at least a part of the wiring WS5 overlaps with at least a part of the drive circuits 52*a*5, 52*b*5, and 52*c*5, and the wiring WS5 is electrically coupled to one end of the capacitor C8 provided on the surface 832. The region provided in the wiring WS5 to which one end of the capacitor C8 is electrically coupled corresponds to the contact Csb5 illustrated in FIG. 13, and the capacitor C8 corresponds to the capacitor C8-5.

The wiring WS6 is located between the wiring WC5 and the wiring WC6 on the wiring substrate 810, and one end thereof is coupled to the wiring WSc and the other end is electrically coupled to the coupling portion CN2. As a result, the wiring WS6 propagates the reference voltage signal VBS to the coupling portion CN2. Here, the coupling region where one end of the wiring WC6 and the wiring WSc are electrically coupled corresponds to the contact Csa6 illustrated in FIG. 13. In addition, in the present embodiment, in a plan view of the wiring substrate 810, at least a part of the wiring WS6 overlaps with at least a part of the drive circuits 52*a*6, 52*b*6, and 52*c*6, and the wiring WS6 is electrically coupled to one end of the capacitor C8 provided on the surface 832. The region provided in the wiring WS6 to which one end of the capacitor C8 is electrically coupled corresponds to the contact Csb6 illustrated in FIG. 13, and the capacitor C8 corresponds to the capacitor C8-6.

That is, the layer 843 is formed with a wiring pattern through which the drive signals COMC1 to COMC6 output by each of the drive circuits 52*c*1 to 52*c*6 propagate and a wiring pattern through which the reference voltage signal VBS output by the reference voltage output circuit 53 propagates. In other words, the layer 843 is provided with a wiring WS located between the layer 842 and the layer 844 along the Z2 direction as one direction, and through which the reference voltage signal VBS propagates. In addition, the wirings WC1 to WC6 through which the drive signals COMC1 to COMC6 propagate are provided on the layer 843 in which the wiring WS through which the reference voltage signal VBS propagates is provided as illustrated in FIG. 19. That is, the wirings WC1 to WC6 through which the drive signals COMC1 to COMC6 propagate are provided on the layer 843 in which the wiring WS through which the reference voltage signal VBS propagates is provided.

Here, in addition to the wirings WA1 to WA6 and WS, the layer 843 may be provided with a part of a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate, or via wiring for coupling the layers included in the wiring substrate 810 to each other may be provided.

Figure 20:
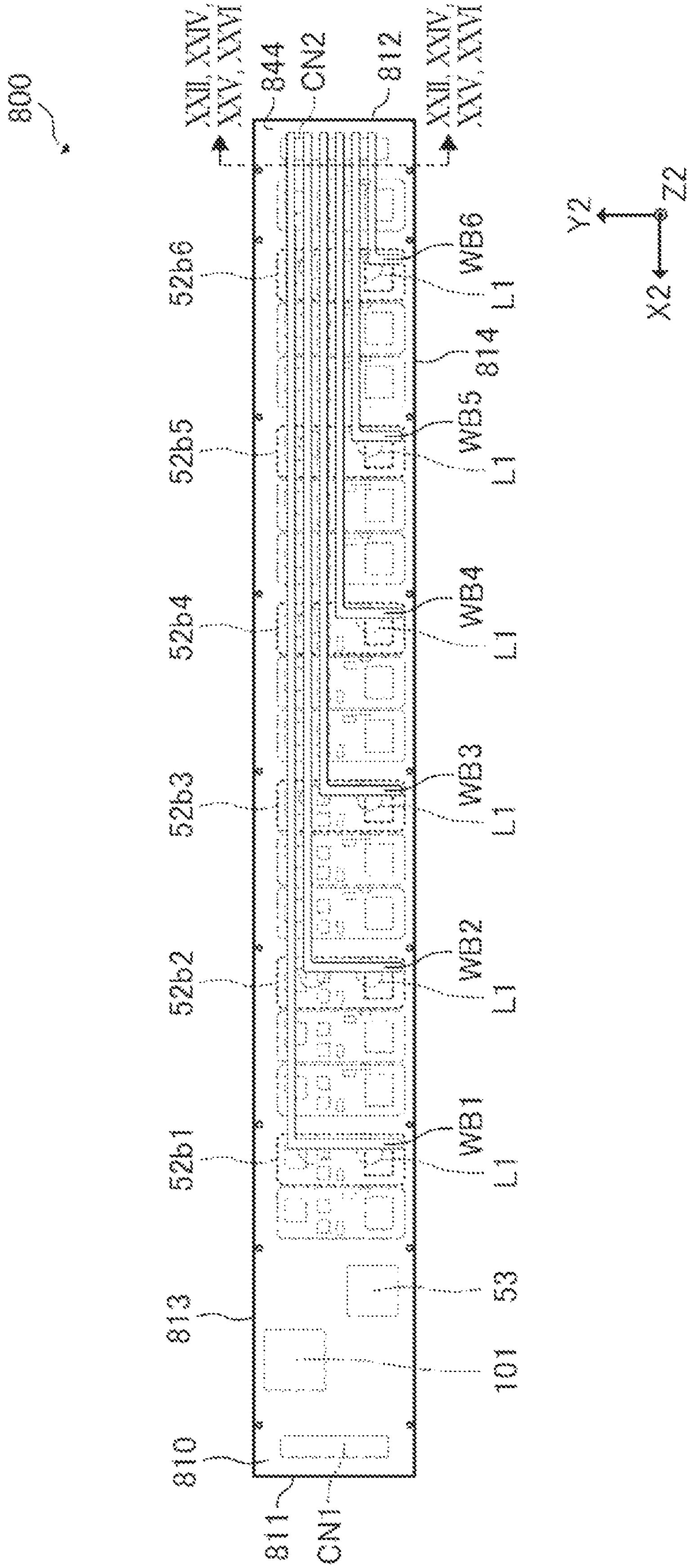
FIG. 20 is a diagram illustrating an example of a configuration of a layer of the wiring substrate.

Next, a specific example of the configuration of the layer 844 of the inner layers of the wiring substrate 810 will be described. FIG. 20 is a diagram illustrating an example of a configuration of the layer 844 of the wiring substrate 810. Here, FIG. 20 is a perspective view illustrating an example of the configuration of the layer 844 in a plan view of the wiring substrate 810. In FIG. 20, a part of the configuration provided other than the layer 844 of the wiring substrate 810 is illustrated by a broken line.

Wirings WB1 to WB6 are formed on the layer 844. One end of the wiring WB1 is electrically coupled to one end of the inductor L1 and one end of the capacitor C1 included in the drive circuit 52*b*1 through a via (not illustrated), and the other end is electrically coupled to the coupling portion CN2 through a via (not illustrated). As a result, the wiring WB1 propagates the drive signal COMB1 output by the drive circuit 52*b*1 and supplied to one end to the coupling portion CN2.

The wiring WB2 is located on the −X2 side of the wiring WB1 and on the −Y2 side of the wiring WB1. One end of the wiring WB2 is electrically coupled to one end of the inductor L1 and one end of the capacitor C1 included in the drive circuit 52*b*2 through a via (not illustrated), and the other end is electrically coupled to the coupling portion CN2 through a via (not illustrated). As a result, the wiring WB2 propagates the drive signal COMB2 output by the drive circuit 52*b*2 and supplied to one end to the coupling portion CN2.

The wiring WB3 is located on the −X2 side of the wiring WB2 and on the −Y2 side of the wiring WB2. One end of the wiring WB3 is electrically coupled to one end of the inductor L1 and one end of the capacitor C1 included in the drive circuit 52b3 through a via (not illustrated), and the other end is electrically coupled to the coupling portion CN2 through a via (not illustrated). As a result, the wiring WB3 propagates the drive signal COMB3 output by the drive circuit 52b3 and supplied to one end to the coupling portion CN2.

The wiring WB4 is located on the −X2 side of the wiring WB3 and on the −Y2 side of the wiring WB3. One end of the wiring WB4 is electrically coupled to one end of the inductor L1 and one end of the capacitor C1 included in the drive circuit 52b4 through a via (not illustrated), and the other end is electrically coupled to the coupling portion CN2 through a via (not illustrated). As a result, the wiring WB4 propagates the drive signal COMB4 output by the drive circuit 52b4 and supplied to one end to the coupling portion CN2.

The wiring WB5 is located on the −X2 side of the wiring WB4 and on the −Y2 side of the wiring WB4. One end of the wiring WB 5 is electrically coupled to one end of the inductor L1 and one end of the capacitor C1 included in the drive circuit 52b5 through a via (not illustrated), and the other end is electrically coupled to the coupling portion CN2 through a via (not illustrated). As a result, the wiring WB5 propagates the drive signal COMB5 output by the drive circuit 52b5 and supplied to one end to the coupling portion CN2.

The wiring WB6 is located on the −X2 side of the wiring WB5 and on the −Y2 side of the wiring WB5. One end of the wiring WB 6 is electrically coupled to one end of the inductor L1 and one end of the capacitor C1 included in the drive circuit 52b6 through a via (not illustrated), and the other end is electrically coupled to the coupling portion CN2 through a via (not illustrated). As a result, the wiring WB6 propagates the drive signal COMB6 output by the drive circuit 52b6 and supplied to one end to the coupling portion CN2.

That is, the layer 844 is formed with wirings WB1 to WB6 through which the drive signals COMB1 to COMB6 output by each of the drive circuits 52b1 to 52b6 propagate. Here, in addition to the wirings WB1 to WB6, the layer 844 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate, or via wiring for coupling the layers included in the wiring substrate 810 to each other may be provided.

As described above, the layer 844 is provided with the wirings WB1 to WB6 through which the drive signals COMB1 to COMB6 output by each of the drive circuits 52b1 to 52b6 propagate.

Figure 21:
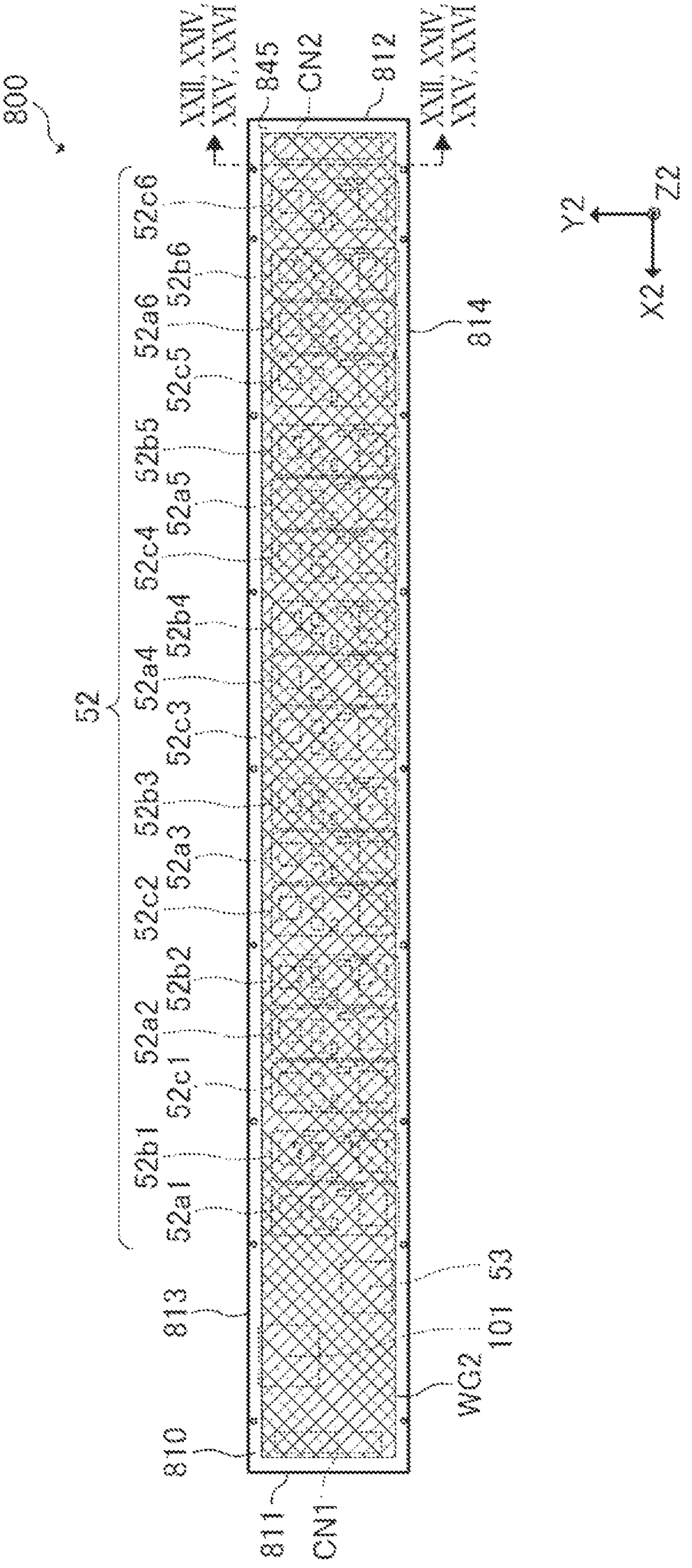
FIG. 21 is a diagram illustrating an example of a configuration of a layer of the wiring substrate.

Next, a specific example of the configuration of the layer 845 of the inner layers of the wiring substrate 810 will be described. FIG. 21 is a diagram illustrating an example of a configuration of the layer 845 of the wiring substrate 810. Here, FIG. 21 is a perspective view illustrating an example of the configuration of the layer 845 in a plan view of the wiring substrate 810. In FIG. 21, a part of the configuration provided other than the layer 845 of the wiring substrate 810 is illustrated by a broken line.

As illustrated in FIG. 21, the wiring WG2 is formed on substantially one surface of the layer 845 in the layer 845. Specifically, the layer 845 is formed with the wiring WG2 so that at least a part thereof overlaps with each of the drive circuits 52a1 to 52a6, 52b1 to 52b6, and 52c1 to 52c6 in a plan view of the wiring substrate 810. The ground potential GND2 is supplied to the wiring WG2 of the reference potentials of the drive circuit substrate 800. That is, the other ends of the capacitors C6-1 to C6-6 and C8-1 to C8-6 are electrically coupled to the wiring WG2 formed on the layer 845.

Therefore, the other ends of the capacitors C6-1 to C6-6 and C8-1 to C8-6 are electrically coupled to the wiring WG2 through which the ground potential GND2 propagates without using the wiring WG1 through which the ground potential GND1 propagates. In addition, as described above, the other end of the capacitor C1, the source of the transistor M2, and the other end of the capacitor C7 included in each of the drive circuits 52a1 to 52a6, 52b1 to 52b6, and 52c1 to 52c6, and the other end of each of the capacitors C9a1 to C9a6, C9b1 to C9b6, and C9c1 to C9c6 are electrically coupled to the wiring WG1 through which the ground potential GND1 propagates without using the wiring pattern through which the ground potential GND2 propagates. Therefore, the distance of the wiring pattern that electrically couples the other end of the capacitor C1, the source of the transistor M2, and the other end of the capacitor C7 included in each of the drive circuits 52a1 to 52a6, 52b1 to 52b6, and 52c1 to 52c6, and the capacitors C9a1 to C9a6, C9b1 to C9b6, C9c1 to C9c6 is shorter than the distance of the wiring pattern that electrically couples the other end of the capacitor C1, the source of the transistor M2, and the other end of the capacitor C7 included in each of the drive circuits 52a1 to 52a6, 52b1 to 52b6, and 52c1 to 52c6, and the other ends of the capacitors C6-1 to C6-6 and C8-1 to C8-6. In other words, the electrical distance between the other end of the capacitor C1, the source of the transistor M2, and the other end of the capacitor C7 included in each of the drive circuits 52a1 to 52a6, 52b1 to 52b6, and 52c1 to 52c6, and the capacitors C9a1 to C9a6, C9b1 to C9b6, C9c1 to C9c6 is shorter than the electrical distance between the other end of the capacitor C1, the source of the transistor M2, and the other end of the capacitor C7 included in each of the drive circuits 52a1 to 52a6, 52b1 to 52b6, and 52c1 to 52c6, and the capacitors C6-1 to C6-6 and C8-1 to C8-6.

Here, in FIG. 21, the case where only the wiring WG2 is formed on substantially one surface of the layer 845 is illustrated, but the present disclosure is not limited thereto. That is, in addition to the wiring WG2, the layer 845 may be provided with a wiring pattern through which various signals such as the data signals DATA, the clock signals SCK1 to SCK6 generated by restoring the data signal DATA, the print data signals SI1 to SI6, and the latch signals LAT1 to LAT6 and a power supply voltage propagate. Furthermore, the layer 845 may be provided with via wiring for electrically coupling the layers of the wiring substrate 810 to each other. Therefore, the fact that the wiring WG2 is formed on substantially one surface of the layer 845 is not limited to the fact that the wiring WG2 is formed in the entire region of the layer 845. Specifically, the wiring WG2 may occupy most of the region of the layer 845, and for example, the wiring WG2 may occupy 50% or more of the entire region of the layer 845.

In the drive circuit substrate 800 configured as described above, in the wiring substrate 810, at least a part of the wiring pattern through which the drive signal COMA propagates, at least a part of the wiring pattern through which the drive signal COMB propagates, and at least a part of the wiring pattern through which the reference voltage signal VBS propagates are located so as to overlap with each other in a plan view of the wiring substrate 810. The wiring pattern through which the drive signal COMC with a small amount of current generated when propagating than that of the drive signals COMA and COMB propagates is provided on the same wiring layer as at least one of the wiring layer provided with the wiring pattern through which the drive signal COMA propagates, the wiring layer provided with the wiring pattern through which the drive signal COMB propagates, and the wiring layer provided with the wiring pattern through which the reference voltage signal VBS propagates. As a result, the possibility that the signal waveforms of the drive signals COMA, COMB, and COMC are distorted because of the inductance component of the wiring pattern included in the wiring substrate 810 is reduced.

Figure 22:
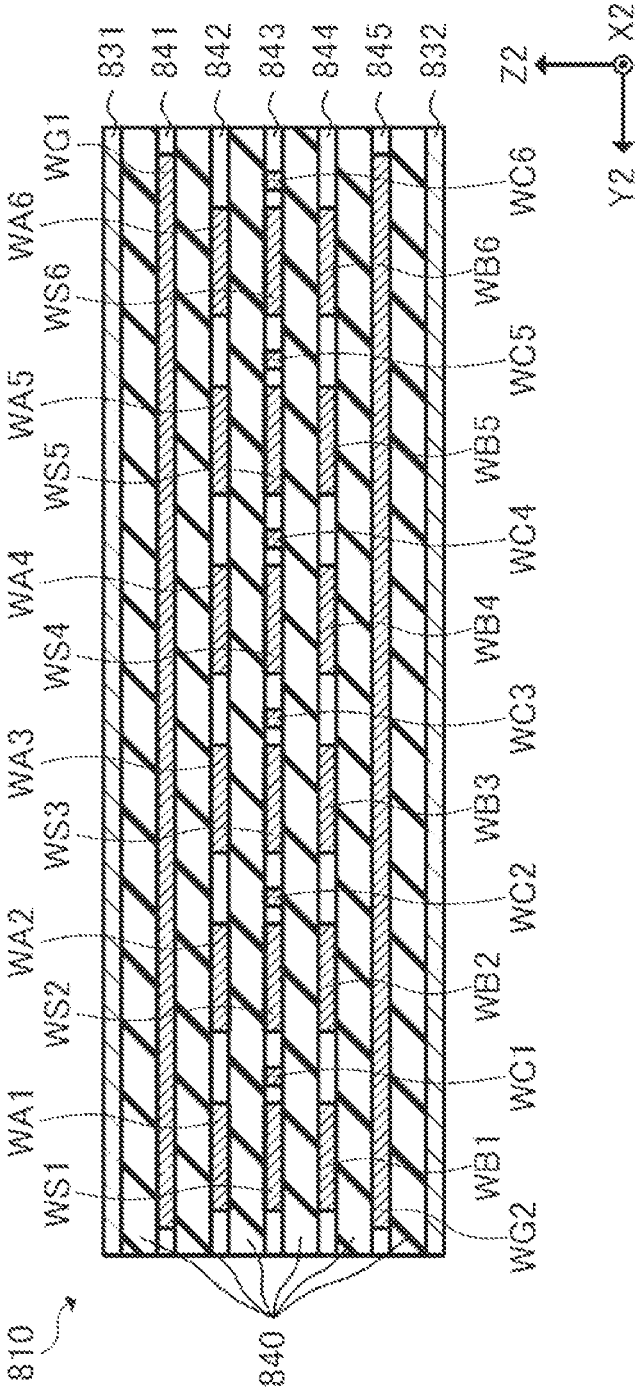
FIG. 22 is a cross-sectional view of the wiring substrate when the wiring substrate is cut along the line XXII-XXII illustrated in FIGS. 15 to 21.

A specific example of such a configuration will be described with reference to FIG. 22. FIG. 22 is a cross-sectional view of the wiring substrate 810 when the wiring substrate 810 is cut along the line XXII-XXII illustrated in FIGS. 15 to 21.

As illustrated in FIG. 22, the wiring WS1 through which the reference voltage signal VBS supplied to the discharge module 23-1 propagates is provided on the layer 843, the wiring WA1 through which the drive signal COMA1 propagates is provided on the layer 842, and the wiring WB1 through which the drive signal COMB1 propagates is provided on the layer 844. That is, the wiring WA1 and the wiring WS1 are provided on the wiring layers adjacent to each other, and the wiring WB1 and the wiring WS1 are provided on the wiring layers adjacent to each other. In other words, the layer 842 provided with the wiring WA1 and the layer 843 provided with the wiring WS1 are located adjacent to each other in the direction along the Z2 direction as one direction, and the layer 844 provided with the wiring WB1 and the layer 843 provided with the wiring WS1 are located adjacent to each other in the direction along the Z2 direction as one direction.

In this case, the wiring WS1 is located between the wiring WA1 and the wiring WB1, and at least a part of the wiring WA1 and at least a part of the wiring WB1 are provided so as to overlap with at least a part of the wiring WS1 in the direction along the Z2 direction as one direction. The wiring WC1 through which the drive signal COMC1 supplied to the discharge module 23-1 propagates is provided on the same layer 843 as the wiring WS1 so as to be adjacent to the wiring WS1 on the −Y2 side of the wiring WS1.

The current generated when the drive signals COMA1, COMB1, and COMC1 are input to the discharge module 23-1 propagates through each of the wirings WA1, WB1, WC1 and is input to the discharge module 23-1, and then propagates through the wiring WS1 through which the reference voltage signal VBS propagates and returns to the drive circuits 52*a*1, 52*b*1, and 52*c*1 that output the drive signals COMA1, COMB1, and COMC1. That is, a current flows in the reverse direction to each of the wirings WA1, WB1, WC1 and the wiring WS1. As a result, the inductance component generated by the current flowing through each of the wirings WA1, WB1, and WC1 and the inductance component generated by the current flowing through the wiring WS1 are mutually canceled. As a result, the possibility that waveform distortion due to the inductance component occurs in the signal waveforms of the drive signals COMA1, COMB1, and COMC1 is reduced.

Similarly, each of the wirings WS2 to WS6 through which the reference voltage signals VBS supplied to each of the discharge modules 23-2 to 23-6 propagates is provided on the layer 843, each of the wirings WA2 to WA6 through which each of the drive signals COMA2 to COMA6 propagates is provided on the layer 842, and each of the wirings WB2 to WB6 through which each of the drive signals COMB2 to COMB6 propagates is provided on the layer 844. That is, the wirings WA2 to WA6 and the wirings WS2 to WS6 are provided on the wiring layers adjacent to each other, and the wirings WB2 to WB6 and the wirings WS2 to WS6 are provided on the wiring layers adjacent to each other. In other words, the layer 842 provided with the wirings WA2 to WA6 and the layer 843 provided with the wirings WS2 to WS6 are located adjacent to each other in the direction along the Z2 direction, and the layer 844 provided with the wirings WB2 to WB6 and the layer 843 provided with the wirings WS2 to WS6 are located adjacent to each other in the direction along the Z2 direction.

In this case, the wiring WS2 is located between the wiring WA2 and the wiring WB2, and at least a part of the wiring WA2 and at least a part of the wiring WB2 are provided so as to overlap with at least a part of the wiring WS2 in the direction along the Z2 direction. The wiring WS3 is located between the wiring WA3 and the wiring WB3, and at least a part of the wiring WA3 and at least a part of the wiring WB3 are provided so as to overlap with at least a part of the wiring WS3 in the direction along the Z2 direction. The wiring WS4 is located between the wiring WA4 and the wiring WB4, and at least a part of the wiring WA4 and at least a part of the wiring WB4 are provided so as to overlap with at least a part of the wiring WS4 in the direction along the Z2 direction. The wiring WS5 is located between the wiring WA5 and the wiring WB5, and at least a part of the wiring WA5 and at least a part of the wiring WB5 are provided so as to overlap with at least a part of the wiring WS5 in the direction along the Z2 direction. The wiring WS6 is located between the wiring WA6 and the wiring WB6, and at least a part of the wiring WA6 and at least a part of the wiring WB6 are provided so as to overlap with at least a part of the wiring WS6 in the direction along the Z2 direction.

The wiring WC2 through which the drive signal COMC2 supplied to the discharge module 23-2 propagates is provided on the same layer 843 as the wiring WS2 so as to be adjacent to the wiring WS2 on the −Y2 side of the wiring WS2. The wiring WC3 through which the drive signal COMC3 supplied to the discharge module 23-3 propagates is provided on the same layer 843 as the wiring WS3 so as to be adjacent to the wiring WS3 on the −Y2 side of the wiring WS3. The wiring WC4 through which the drive signal COMC4 supplied to the discharge module 23-4 propagates is provided on the same layer 843 as the wiring WS4 so as to be adjacent to the wiring WS4 on the −Y2 side of the wiring WS4. The wiring WC5 through which the drive signal COMC5 supplied to the discharge module 23-5 propagates is provided on the same layer 843 as the wiring WS5 so as to be adjacent to the wiring WS5 on the −Y2 side of the wiring WS5. The wiring WC6 through which the drive signal COMC6 supplied to the discharge module 23-6 propagates is provided on the same layer 843 as the wiring WS6 so as to be adjacent to the wiring WS6 on the −Y2 side of the wiring WS6.

As a result, the inductance component generated by the current flowing through the wiring WA2 to WA6, WB2 to WB6, WC2 to WC6 and the inductance component generated by the current flowing through the wiring WS2 to WS6 are mutually canceled. As a result, the possibility that waveform distortion due to the inductance component occurs in the signal waveforms of the drive signals COMA2 to SOMA6, COMB2 to COMB6, and COMC2 to COMC6 is reduced.

Furthermore, as described above, the wiring substrate 810 includes the layer 841 provided with the wiring WG1 through which the ground potential GND1 having a constant potential propagates and the layer 845 provided with the wiring WG2 through which the ground potential GND2 having a constant potential propagates. The layer 841 provided with the wiring WG1 is located on the +Z2 side of the layer 842 provided with the wirings WA1 to WA6, and the layer 845 provided with the wiring WG2 is located on the −Z2 side of the layer 844 provided with the wirings WB1 to WB6. In other words, the layer 842 is located between the layer 843 and the layer 841, and the layer 844 is located between the layer 843 and the layer 845. In this case, at least a part of the wiring WG1 is provided so as to overlap with at least a part of each of the wirings WA1 to WA6 in the direction along the Z2 direction, and at least a part of the wiring WG2 is provided so as to overlap with at least a part of each of the wirings WB1 to WB6 in the direction along the Z2 direction.

As a result, the wiring WG1 functions as a shield member for reducing the possibility that disturbance noise or the like is superimposed on each of the wirings WA1 to WA6, and the wiring WG2 functions as a shield member for reducing the possibility that disturbance noise or the like is superimposed on each of the wirings WB1 to WB6. As a result, the accuracy of the signal waveforms of the drive signals COMA1 to COMA6 propagating through the wirings WA1 to WA6 and the drive signals COMB1 to COMB6 propagating through the wirings WB1 to WB6 is further improved.

In the liquid discharge device 1 configured as described above, the liquid discharge module 20 is an example of the liquid discharge head, the electrode 602 of the piezoelectric element 60 included in the liquid discharge module 20 is an example of the first electrode, and the electrode 603 is an example of the second electrode. In addition, any of the drive circuits **52*a*1 to 52*a*6 is an example of the first drive circuit, any one of the drive circuits 52*b*1 to 52*b*6 is an example of the second drive circuit, and any one of the drive circuits 52*c*1 to 52*c*6 is an example of the third drive circuit. The drive signals COMA1 to COMA6 output by the drive circuits 52*a*1 to 52*a*6 corresponding to the first drive circuit are examples of the first drive signal, the drive signals COMB1 to COMB6 output by the drive circuits 52*b*1 to 52*b*6 corresponding to the second drive circuit are examples of the second drive signal, and the drive signals COMC1 to COMC6 output by the drive circuits 52*c*1 to 52*c*6 corresponding to the third drive circuit are examples of the third drive signal. The ground potential GND1 having a constant potential is an example of the first constant voltage signal, and the ground potential GND2 having a constant potential is an example of the second constant voltage signal. In addition, the wiring substrate 810 is an example of the substrate, the layer 842 is an example of the first wiring layer, the layer 844 is an example of the second wiring layer, the layer 843 is an example of the third wiring layer, the layer 841 is an example of the seventh wiring layer, and the layer 845 is an example of the eighth wiring layer. The wirings WA1 to WA6 through which the drive signals COMA1 to COMA6 output by the drive circuits 52*a*1 to 52*a*6 provided on the layer 842 and corresponding to the first drive circuit propagate are examples of the first wiring, the wirings WB1 to WB6 through which the drive signals COMB1 to COMB6 output by the drive circuits 52*b*1 to 52*b*6 provided on the layer 844 and corresponding to the second drive circuit propagate are examples of the second wiring, the wirings WC1 to WC6 through which the drive signals COMC1 to COMC6 output by the drive circuits 52*c*1 to 52*c*6 corresponding to the third drive circuit propagate are examples of the third wiring, the wiring WS provided on the layer 843 and through which the reference voltage signal VBS propagates is an example of the fourth wiring, the wiring WG1 provided on the layer 841 and through which the ground potential GND1 propagates is an example of the eighth wiring, and the wiring WG2 provided on the layer 845 and through which the ground potential GND2** propagates is an example of the ninth wiring.

1.7 Action and Effect

In the liquid discharge device 1 configured as described above, in the drive circuit substrate 800 that drives the liquid discharge module 20 that discharges ink by driving the piezoelectric element by the drive signal COMA1 supplied to the electrode 602 and the reference voltage signal VBS supplied to the electrode 603, the transistors M1 and the capacitors C1 and C7 to which the ground potential GND1 included in the drive circuit **52*a*1 outputting the drive signal COMA1 to the electrode 602 of the piezoelectric element 60 is supplied, and the capacitor C9*a*1 which is a chip capacitor in which one end is electrically coupled to the electrode 603 of the piezoelectric element and the ground potential GND1 is supplied to the other end are provided on the surface 831 of the wiring substrate 810. The capacitor C8-1 which is an electrolytic capacitor in which one end is electrically coupled to the electrode 603 of the piezoelectric element and the ground potential GND2 is supplied to the other end is provided on the surface 832 different from the surface 831 of the wiring substrate 810**.

The current generated by the propagation of the drive signal COMA1 returns to the drive circuit **52*a*1 via each of the capacitors C9*a*1 and the ground potential GND1. In the drive circuit substrate 800 included in the liquid discharge device 1 of the first embodiment, the transistors M1 and the capacitors C1 and C7 included in the drive circuit 52*a*1, and the capacitors C9*a*1 which are chip capacitors are provided on the surface 831 of the wiring substrate 810 together. Therefore, the electrical distance between the transistors M1 and the capacitors C1 and C7 included in the drive circuit 52*a*1 in the wiring pattern through which the ground potential GND1 propagates and the capacitor C9*a*1 which is a chip capacitor can be shortened. That is, the wiring length of the feedback path in which the current generated by the propagation of the drive signal COMA1 returns to the drive circuit 52*a*1 can be shortened. As a result, the waveform accuracy of the drive signals COMA1 to COMA6, COMB1 to COMB6, and COMC1 to COMC6, and the stability of the voltage value of the reference voltage signal VBS are improved. As a result, the discharge accuracy of the ink discharged from each of the discharge modules 23-1 to 23-6** is improved.

In this case, the wiring substrate 810 includes the layer 841 including a wiring WG1 provided with the ground potential GND1 to which the transistor M1 and the capacitors C1 and C7 included in the drive circuit **52*a*1 and the capacitor C9*a*1 as a chip capacitor are electrically coupled, and the layer 845 including the wiring WG2 provided with the ground potential GND2 to which the capacitor C8-1 is electrically coupled, and on the wiring substrate 810, the surfaces 831, 832, and the layers 841, 845 are located so that the shortest distance between the surface 831 and the layer 841 is shorter than the shortest distance between the surface 831 and the layer 845, and the shortest distance between the surface 832 and the layer 845 is shorter than the shortest distance between the surface 832 and the layer 841. Therefore, the wiring length of the feedback path in which the current generated by the propagation of the drive signal COMA1 returns to the drive circuit 52*a*1** can be further shortened.

In addition, in the liquid discharge device 1 of the first embodiment, the drive circuit substrate 800 supplies the reference voltage signal VBS to the electrodes 603 of the piezoelectric elements 60 included in each of the discharge modules 23-1 to 23-6 via the wiring WS. Specifically, in the discharge module 23-1, the reference voltage signal VBS supplied to the wiring WSc in the wiring WS branches at the contact Csa1 and then propagates through the wiring WS1 to be supplied to the electrode 603 of the piezoelectric element 60 included in the discharge module 23-1. In each of the discharge modules 23-2 to 23-6, the reference voltage signal VBS supplied to the wiring WSc in the wiring WS branches at each of the contacts Csa2 to Csa6 and then propagates through each of the wirings WS2 to WS6 to be supplied to the electrode 603 of the piezoelectric element 60 included in the discharge modules 23-2 to 23-6.

In this case, the contact Csb1 to which the capacitor C8-1 is electrically coupled is located in the wiring WS1 that electrically couples the contact Csa1 and the electrode 603 of the piezoelectric element 60 included in the discharge module 23-1. As a result, even when the voltage value of the reference voltage signal VBS fluctuates because of the operation of any of the discharge modules 23-2 to 23-6, the fluctuation of the voltage value is absorbed by the capacitor C8-1. As a result, the possibility that the voltage value of the reference voltage signal VBS supplied to the discharge module 23-1 fluctuates is reduced.

Furthermore, in the liquid discharge device 1 of the first embodiment, the contact Csb2 to which the capacitor C8-2 is electrically coupled is located in the wiring WS2 that electrically couples the contact Csa2 and the electrode 603 of the piezoelectric element 60 included in the discharge module 23-2, the contact Csb3 to which the capacitor C8-3 is electrically coupled is located in the wiring WS3 that electrically couples the contact Csa3 and the electrode 603 of the piezoelectric element 60 included in the discharge module 23-3, the contact Csb4 to which the capacitor C8-4 is electrically coupled is located in the wiring WS4 that electrically couples the contact Csa4 and the electrode 603 of the piezoelectric element 60 included in the discharge module 23-4, and the contact Csb5 to which the capacitor C8-5 is electrically coupled is located in the wiring WS5 that electrically couples the contact Csa5 and the electrode 603 of the piezoelectric element 60 included in the discharge module 23-5, and the contact Csb6 to which the capacitor C8-6 is electrically coupled is located in the wiring WS6 that electrically couples the contact Csa6 and the electrode 603 of the piezoelectric element 60 included in the discharge module 23-6.

As a result, even when the voltage value of the reference voltage signal VBS fluctuates because of the operation of any of the discharge modules 23-1 to 23-6, the fluctuation of the voltage value is absorbed by the capacitor C8-1 to the capacitor C6. As a result, the possibility that the voltage value of the reference voltage signal VBS supplied to each of the discharge modules 23-1 to 23-6 fluctuates is reduced.

In addition, in the liquid discharge device 1 configured as described above, the wiring WS1 through which the reference voltage signal VBS propagates is located between the wiring WA1 through which the drive signal COMA1 for driving the piezoelectric element 60 included in the discharge module 23-1 propagates so that the ink is discharged from the discharge module 23-1, and the wiring WB1 through which the drive signal COMB1 for driving the piezoelectric element 60 included in the discharge module 23-1 propagates so that the ink is discharged from the discharge module 23-1. The wiring WC1 through which the drive signal COMC1 for driving the piezoelectric element 60 included in the discharge module 23-1 propagates is provided on the same layer 843 as the wiring WS1 so that the ink is not discharged from the discharge module 23-1. As a result, the current generated when the drive signals COMA1, COMB1, and COMC1 propagate propagates through the wirings WA1, WB1, and WC1, flows into the discharge module 23-1, and then propagates through the wiring WS1 to return to the drive circuits 52*a*1, 52*b*1, and 52*c*1. That is, in the wiring substrate 810, a current flows in the reverse direction to the wiring WA1, WB1, WC1 and the wiring WS1. As a result, the inductance component generated by the current generated when the drive signals COMA1, COMB1, and COMC1 propagate is canceled out, and the possibility that the signal waveform of the drive signals COMA1, COMB1, and COMC1 is distorted because of the inductance component is reduced.

In addition, in the liquid discharge device 1 according to the present embodiment, the wiring WS1 is located between the wiring WA1 and the wiring WB1 along the Z2 direction, and the wiring WC1 through which the drive signal COMC1 for driving the piezoelectric element 60 included in the discharge module 23-1 propagates is located in the same wiring layer as the wiring WS1 so that the ink is not discharged from the discharge module 23-1. The amount of current generated when the drive signal COMC1 propagates is smaller than the amount of current generated when the drive signals COMA1 and COMB1 propagate, and thus a pattern width of the wiring WC1 is smaller than a pattern width of the wirings WA1 and WB1. Furthermore, the inductance component generated by the current generated when the drive signal COMC1 having a small current amount propagates is smaller than the inductance component generated by the current generated when the drive signals COMA1 and COMB1 propagate. Therefore, there is little possibility that the signal waveforms of the drive signals COMA1, COMB1, and COMC1 are distorted because of the inductance component generated by the current generated when the drive signal COMC1 propagates. The wiring WC1 through which such a drive signal COMC1 propagates is provided in the same wiring layer as at least one of the wirings WA1, WB1, and WS1, and preferably in the same wiring layer as the wiring WS1. Therefore, even when the drive circuit substrate 800 outputs the drive signals COMA1, COMB1, and COMC1, and the reference voltage signal VBS, the possibility that the signal waveforms of the drive signals COMA1, COMB1, and COMC1 supplied to the discharge module 23-1 are distorted is reduced without increasing the number of wiring layers included in the wiring substrate 810.

2. Second Embodiment

Next, a liquid discharge device 1 according to a second embodiment will be described. In describing the liquid discharge device 1 according to the second embodiment, the same reference numerals are given to the same configurations as those of the liquid discharge device 1 according to the first embodiment, and the description thereof will be simplified or omitted.

Figure 23:
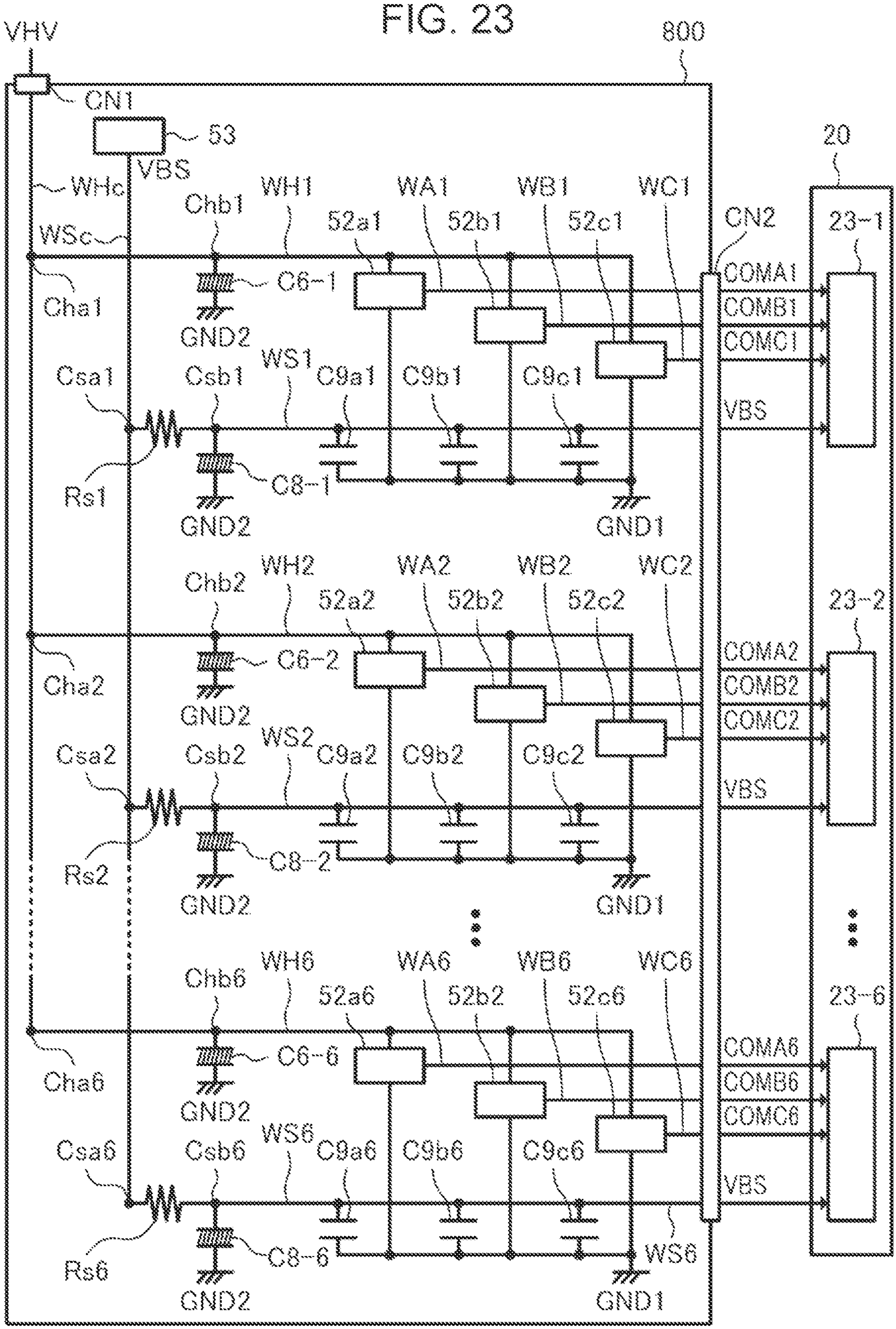
FIG. 23 is a diagram illustrating an example of an electrical coupling relationship of a drive circuit substrate according to a second embodiment.

FIG. 23 is a diagram illustrating an example of the electrical coupling relationship of the drive circuit substrate 800 according to the second embodiment. As illustrated in FIG. 23, the drive circuit substrate 800 according to the second embodiment includes resistors Rs1 to Rs6. One end of the resistor Rs1 is electrically coupled to the contact Csa1 and the other end is electrically coupled to the contact Csb1. In other words, the resistor Rs1 electrically couples the contact Csa1 and the contact Csb1. Similarly, one end of the resistor Rs2 is electrically coupled to the contact Csa2 and the other end is electrically coupled to the contact Csb2, one end of the resistor Rs3 is electrically coupled to the contact Csa3 and the other end is electrically coupled to the contact Csb3, one end of the resistor Rs4 is electrically coupled to the contact Csa4 and the other end is electrically coupled to the contact Csb4, one end of the resistor Rs5 is electrically coupled to the contact Csa5 and the other end is electrically coupled to the contact Csb5, and one end of the resistor Rs6 is electrically coupled to the contact Csa6 and the other end is electrically coupled to the contact Csb6. That is, the resistor Rs2 electrically couples the contact Csa2 and the contact Csb2, the resistor Rs3 electrically couples the contact Csa3 and the contact Csb3, the resistor Rs4 electrically couples the contact Csa4 and the contact Csb4, the resistor Rs5 electrically couples the contact Csa5 and the contact Csb5, and the resistor Rs6 electrically couples the contact Csa6 and the contact Csb6.

As a result, even when the voltage value of the reference voltage signal VBS fluctuates because of the operation of any of the discharge modules 23-1 to 23-6, the fluctuation of the voltage value is absorbed by the capacitor C8-1 to the capacitor C6 and the resistors Rs1 to Rs6. As a result, the possibility that the voltage value of the reference voltage signal VBS supplied to each of the discharge modules 23-1 to 23-6 fluctuates is further reduced.

3. Third Embodiment

Next, a liquid discharge device 1 according to a third embodiment will be described. In describing the liquid discharge device 1 according to the third embodiment, the same reference numerals are given to the same configurations as the liquid discharge devices 1 according to the first embodiment and the second embodiment, and the description thereof will be simplified or omitted.

Figure 24:
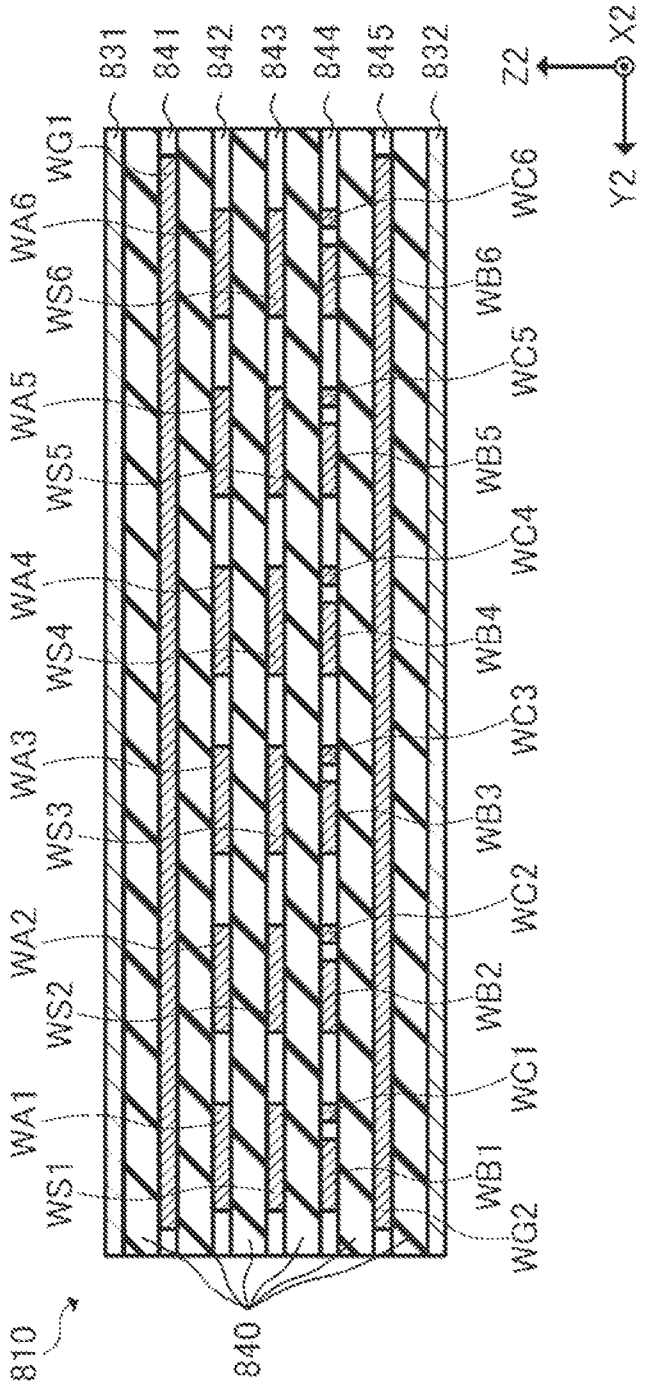
FIG. 24 is a cross-sectional view of a wiring substrate when the wiring substrate of a third embodiment is cut along a line segment corresponding to the line XXIV-XXIV illustrated in FIGS. 15 to 21.

FIG. 24 is a cross-sectional view of a wiring substrate 810 when the wiring substrate 810 of the third embodiment is cut along a line segment corresponding to the line XXIV-XXIV illustrated in FIGS. 15 to 21.

As illustrated in FIG. 24, in the liquid discharge device 1 according to the third embodiment, the wiring WC1 through which the drive signal COMC1 propagates is provided on the same layer 844 as the wiring WB1 through which the drive signal COMB1 propagates. Similarly, each of the wirings WC2 to WC6 through which each of the drive signals COMC2 to COMC6 propagates is provided on the same layer 844 as the wirings WB2 to WB6 through which each of the drive signals COMB2 to COMB6 propagates.

In this case, as illustrated in FIG. 24, it is preferable that the wiring WC1 is provided on the same layer 844 as the wiring WB1 in which the amount of flowing current is smaller than that of the wiring WA1. Since the wiring WB1 in which the amount of flowing current is smaller than that of the wiring WA1, a pattern width of the wiring WB1 can be smaller than a pattern width of the wiring WA1. As a result, the wiring WC1 can be disposed along the Z2 direction so as to face the wiring WA1 and the wiring WS1. As a result, in the wiring substrate 810, the region occupied by the wiring pattern through which the drive signals COMA1, COMB1, and COM1, and the reference voltage signal VBS propagate to the discharge module 23-1 can be reduced, and the size of the wiring substrate 810 can be reduced. That is, in the liquid discharge device 1 of the second embodiment, in addition to the same action and effect as those of the liquid discharge device 1 of the first embodiment, the size of the wiring substrate 810 can be reduced.

Here, as illustrated in the liquid discharge devices 1 of the first embodiment and the second embodiment, the wiring WC1 through which the drive signal COMC1 propagates may be provided on at least one of the layer 842 provided with the wiring WA1 through which the drive signal COMA1 propagates, the layer 844 provided with wiring WB1 through which the drive signal COMB1 propagates, and the layer 843 provided with the wiring WS1 through which the reference voltage signal VBS propagate. Therefore, the possibility that the signal waveforms of the drive signals COMA1, COMB1, and COMC1 supplied to the discharge module 23-1 are distorted is reduced without increasing the number of wiring layers included in the wiring substrate 810.

4. Fourth Embodiment

Next, a liquid discharge device 1 according to a fourth embodiment will be described. In describing the liquid discharge device 1 according to the fourth embodiment, the same reference numerals are given to the same configurations as the liquid discharge devices 1 according to the first embodiment to the third embodiment, and the description thereof will be simplified or omitted.

Figure 25:
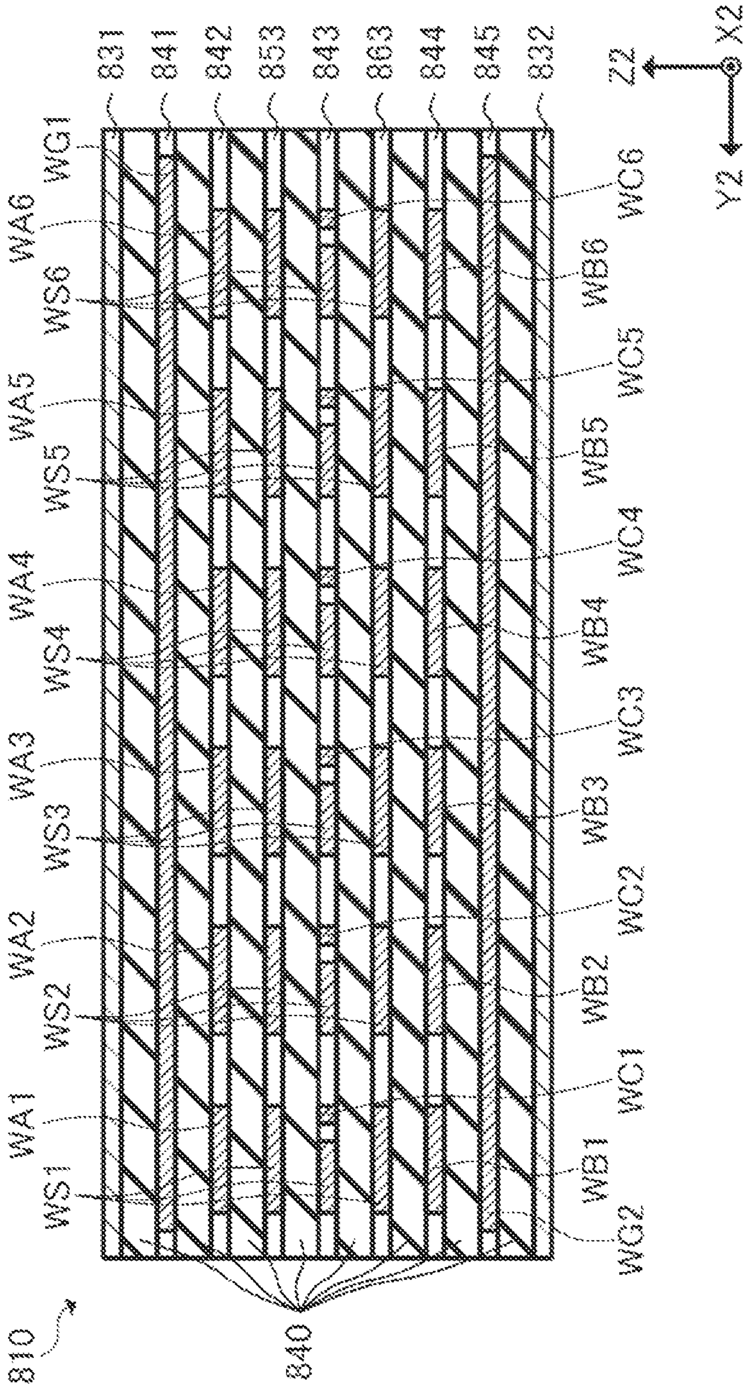
FIG. 25 is a cross-sectional view of the wiring substrate when the wiring substrate of a fourth embodiment is cut along a line segment corresponding to the line XXV-XXV illustrated in FIGS. 15 to 21.

FIG. 25 is a cross-sectional view of the wiring substrate 810 when the wiring substrate 810 of the fourth embodiment is cut along a line segment corresponding to the line XXV-XXV illustrated in FIGS. 15 to 21.

As illustrated in FIG. 25, in the liquid discharge device 1 according to the fourth embodiment, the wiring substrate 810 includes a layer 853 and a layer 863. The layer 853 is located between the layer 842 and the layer 843 in the direction along the Z2 direction. In addition, the layer 863 is located between the layer 843 and the layer 844 in the direction along the Z2 direction. The layers 853 and 863 are provided with wirings WS1 to WS6 that propagate the reference voltage signal VBS. That is, the reference voltage signal VBS propagates through the wirings WS1 to WS6 formed on the layers 843, 853, and 863.

Each of the wirings WC1 to WC6 through which the drive signals COMC1 to COMC6 provided on the layer 843 propagate is located between the wirings WS1 to WS6 provided at least partially on the layer 853 and the wirings WS1 to WS6 provided on the layer 863, and is located so as to overlap a part of each of the wirings WA1 to WA6, each of the wiring WB1 to WB6, and each of the wirings WS1 to WS6 in the direction along the Z2 direction as one direction.

In the liquid discharge device 1 of the fourth embodiment configured as described above, the effective cross-sectional area of the wirings WS1 to WS6 through which the reference voltage signal VBS propagates can be increased. As a result, in addition to the same action and effect as those of the liquid discharge device 1 of the first to third embodiments, the possibility that the voltage value of the reference voltage signal VBS fluctuates because of the impedance components of the wirings WS1 to WS6 can be further reduced.

5. Fifth Embodiment

Next, a liquid discharge device 1 according to a fifth embodiment will be described. In describing the liquid discharge device 1 according to the fifth embodiment, the same reference numerals are given to the same configurations as the liquid discharge devices 1 according to the first embodiment to the fourth embodiment, and the description thereof will be simplified or omitted.

Figure 26:
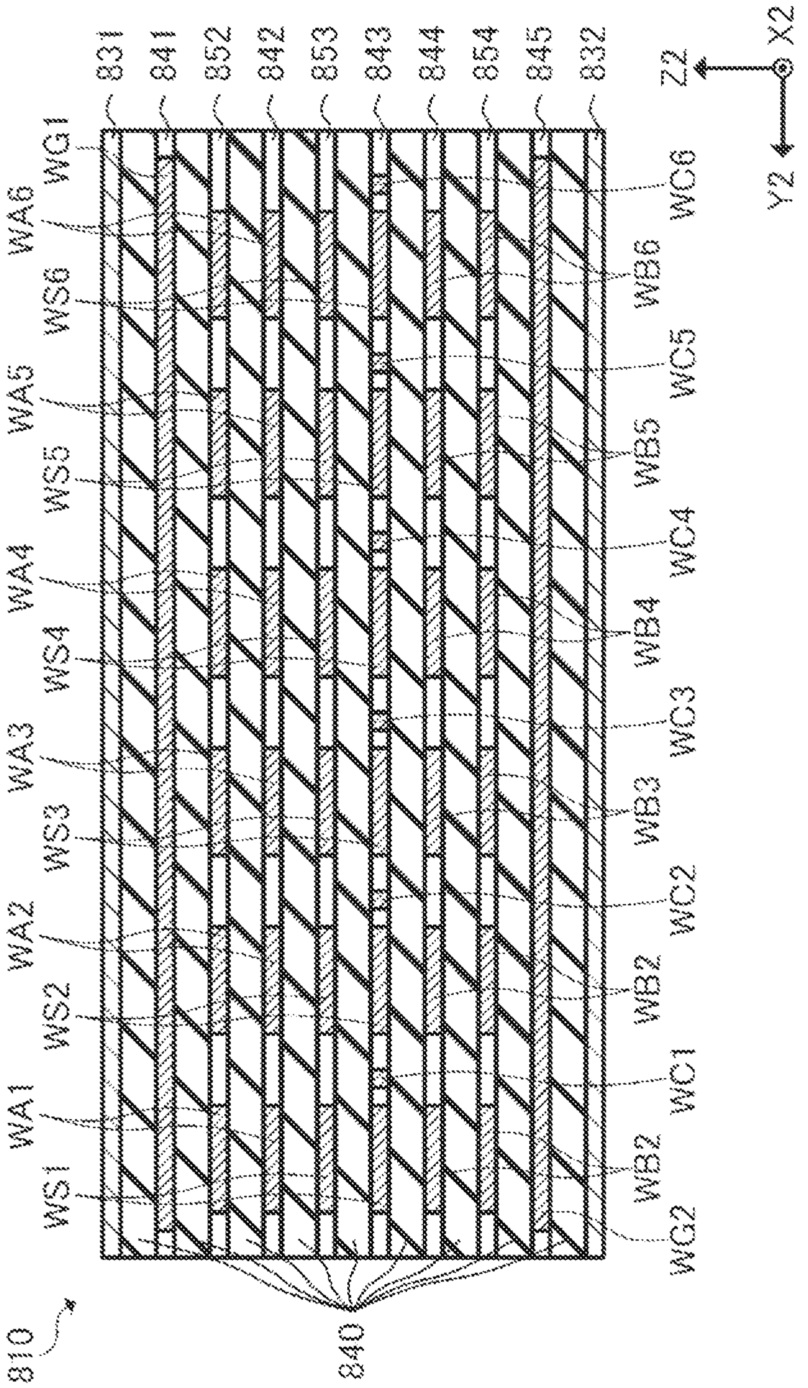
FIG. 26 is a cross-sectional view of a wiring substrate when the wiring substrate of a fifth embodiment is cut along a line segment corresponding to the line XXVI-XXVI illustrated in FIGS. 15 to 21.

FIG. 26 is a cross-sectional view of a wiring substrate 810 when the wiring substrate 810 of the fifth embodiment is cut along a line segment corresponding to the line XXVI-XXVI illustrated in FIGS. 15 to 21. As illustrated in FIG. 26, in the liquid discharge device 1 according to the fifth embodiment, the wiring substrate 810 includes layers 852, 853, and 854.

The layer 852 is provided with the wirings WA1 to WA6 through which the drive signals COMA1 to COMA6 propagate. The layer 852 is located adjacent to the layer 842 provided with the wirings WA1 to WA6 through which the drive signals COMA1 to COMA6 propagate in the direction along the Z2 direction as one direction, and the layer 842 is located between the layer 843 and the layer 852. In this case, at least a part of each of the wirings WA1 to WA6 provided on the layer 852 is provided so as to overlap with at least a part of each of the wirings WA1 to WA6 provided on the layer 842 in the direction along the Z2 direction as one direction.

The layer 854 is provided with the wirings WB1 to WB6 through which the drive signals COMB1 to COMB6 propagate. The layer 854 is located adjacent to the layer 844 provided with the wirings WB1 to WB6 through which the drive signals COMB1 to COMB6 propagate in the direction along the Z2 direction as one direction, and the layer 844 is located between the layer 843 and the layer 854. In this case, at least a part of each of the wirings WB1 to WB6 provided on the layer 854 is provided so as to overlap with at least a part of each of the wirings WB1 to WB6 provided on the layer 844 in the direction along the Z2 direction as one direction.

The layer 853 is provided with the wirings WS1 to WS6 through which the reference voltage signal VBS propagates. The layer 853 is located adjacent to the layer 843 provided with the wirings WS1 to WS6 through which the reference voltage signal VBS propagates in the direction along the Z2 direction as one direction. In this case, at least a part of each of the wirings WS1 to WS6 provided on the layer 853 is provided so as to overlap with at least a part of each of the wirings WS1 to WS6 provided on the layer 843 in the direction along the Z2 direction as one direction.

In the liquid discharge device 1 of the fifth embodiment configured as described above, the effective cross-sectional area of the wirings WS1 to WS6 through which the reference voltage signal VBS propagates can be increased, and the effective cross-sectional area of the wirings WA1 to WA6 through which the drive signals COMA1 to COMA6 propagate, and the effective cross-sectional area of the wirings WB1 to WB6 through which the drive signals COMB1 to COMB6 propagate can be increased. As a result, in addition to the same action and effect as those of the liquid discharge devices 1 of the first to fourth embodiments, the possibility that the signal waveforms of the drive signals COMA1 to COMA6 are distorted because of the impedance components of the wirings WA1 to WA6 can be reduced, and the possibility that the signal waveforms of the drive signals COMB1 to COMB6 are distorted because of the impedance components of the wirings WB1 to WB6 can be reduced. Furthermore, the possibility that the voltage value of the reference voltage signal VBS fluctuates because of the impedance components of the wirings WS1 to WS6 can be further reduced.

Here, the layer 852 is an example of the fourth wiring layer, and the wirings WA1 to WA6 provided on the layer 852 are examples of the fifth wiring. In addition, the layer 854 is an example of the fifth wiring layer, and the wirings WB1 to WB6 provided on the layer 854 are examples of the sixth wiring. In addition, the layer 853 is an example of the sixth wiring layer, and the wirings WS1 to WS6 provided on the layer 853 are examples of the seventh wiring.

Although the embodiments and the modification example have been described above, the present disclosure is not limited to these embodiments, and can be implemented in various aspects without departing from the gist thereof. For example, the above embodiments can be combined as appropriate.

The present disclosure includes a configuration substantially the same as the configuration described in the embodiments (for example, a configuration having the same function, method, and result, or a configuration having the same object and effect). In addition, the present disclosure also includes a configuration in which a non-essential part of the configuration described in the embodiments is replaced. In addition, the present disclosure also includes a configuration that exhibits the same action and effect as those of the configuration described in the embodiments or a configuration that can achieve the same object. In addition, the present disclosure also includes a configuration in which a known technique is added to the configuration described in the embodiments.

The following contents are derived from the above-described embodiments.

According to an aspect of the present disclosure, there is provided a liquid discharge device including a liquid discharge head that has a piezoelectric element having a first electrode and a second electrode and discharges a liquid by driving the piezoelectric element, and a drive circuit substrate that drives the piezoelectric element, in which the drive circuit substrate includes a first drive circuit that outputs a first drive signal for driving the piezoelectric element to the first electrode such that the liquid discharge head discharges a liquid, a second drive circuit that outputs a second drive signal for driving the piezoelectric element to the first electrode such that the liquid discharge head discharges a liquid, a third drive circuit that outputs a third drive signal for driving the piezoelectric element to the first electrode such that the liquid discharge head does not discharge a liquid, a reference voltage output circuit that supplies a reference voltage signal to the second electrode, and a substrate provided with the first drive circuit, the second drive circuit, the third drive circuit, and the reference voltage output circuit, the substrate includes a first wiring through which the first drive signal propagates, a second wiring through which the second drive signal propagates, a third wiring through which the third drive signal propagates, a fourth wiring through which the reference voltage signal propagates, a first wiring layer provided with the first wiring, a second wiring layer provided with the second wiring, and a third wiring layer located between the first wiring layer and the second wiring layer along one direction and provided with the fourth wiring, and the third wiring is provided on any one of the first wiring layer, the second wiring layer, and the third wiring layer.

According to the liquid discharge device, the third wiring layer provided with the fourth wiring through which the reference voltage signal propagates is located between the first wiring layer provided with the first wiring through which a first drive signal propagates and the second wiring layer provided with the second wiring through which the second drive signal propagates. The inductance component caused by the current generated when the first drive signal propagates and the inductance component caused by the current generated when the second drive signal propagates are canceled by the inductance component generated by the current propagating through the fourth wiring. As a result, the possibility that waveform distortion occurs in the first drive signal and the second drive signal due to the inductance component is reduced.

Furthermore, since the current generated when the third drive signal propagates drives the piezoelectric element to the extent that ink is not discharged, the current is smaller than the current generated when the first drive signal propagates and the current generated when the second drive signal propagates. The third wiring through which the third drive signal with such a small amount of current propagates is provided in the same wiring layer as at least one of the first wiring layer provided with the first wiring through which the first drive signal propagates, the second wiring layer provided with the second wiring through which the second drive signal propagates, and the third wiring layer provided with the fourth wiring through which the reference voltage signal propagates. Therefore, it is possible to reduce the possibility that the number of layers of the substrate is unintentionally increased.

In an aspect of the liquid discharge device, at least a part of the first wiring and at least a part of the second wiring may be provided so as to overlap with at least a part of the fourth wiring in a direction along the one direction.

According to the liquid discharge device, the inductance component caused by the current generated when the first drive signal propagates and the inductance component caused by the current generated when the second drive signal propagates are canceled by the inductance component generated by the current propagating through the fourth wiring more efficiently. As a result, the possibility that waveform distortion occurs in the first drive signal and the second drive signal due to the inductance component is further reduced.

In an aspect of the liquid discharge device, the third wiring may be provided on the third wiring layer.

In an aspect of the liquid discharge device, the substrate may include a fifth wiring through which the first drive signal propagates and a fourth wiring layer provided with the fifth wiring, the fourth wiring layer may be located adjacent to the first wiring layer in a direction along the one direction, the first wiring layer may be located between the third wiring layer and the fourth wiring layer, and at least a part of the fifth wiring may be provided so as to overlap with at least a part of the first wiring in the direction along the one direction.

In an aspect of the liquid discharge device, the substrate may include a sixth wiring through which the second drive signal propagates and a fifth wiring layer provided with the sixth wiring, the fifth wiring layer may be located adjacent to the second wiring layer in a direction along the one direction, the second wiring layer may be located between the third wiring layer and the fifth wiring layer, and at least a part of the sixth wiring may be provided so as to overlap with at least a part of the second wiring in the direction along the one direction.

In an aspect of the liquid discharge device, the substrate may include a seventh wiring through which the reference voltage signal propagates and a sixth wiring layer provided with the seventh wiring, the sixth wiring layer may be located adjacent to the third wiring layer in a direction along the one direction, and at least a part of the seventh wiring may be provided so as to overlap with at least a part of the fourth wiring in the direction along the one direction.

In an aspect of the liquid discharge device, the first wiring layer and the third wiring layer may be located adjacent to each other in a direction along the one direction, and the second wiring layer and the third wiring layer may be located adjacent to each other in a direction along the one direction.

In an aspect of the liquid discharge device, the substrate may include an eighth wiring through which a first constant voltage signal having a constant potential propagates and a seventh wiring layer provided with the eighth wiring, the first wiring layer may be located between the third wiring layer and the seventh wiring layer, and at least a part of the eighth wiring may be provided so as to overlap with at least a part of the first wiring in the direction along the one direction.

In an aspect of the liquid discharge device, the substrate may include a ninth wiring through which a second constant voltage signal having a constant potential propagates and an eighth wiring layer provided with the ninth wiring, the second wiring layer may be located between the third wiring layer and the eighth wiring layer, and at least a part of the ninth wiring may be provided so as to overlap with at least a part of the second wiring in a direction along the one direction.

According to another aspect of the present disclosure, there is provided a drive circuit substrate that drives a liquid discharge head which has a piezoelectric element having a first electrode and a second electrode and which discharges a liquid by driving the piezoelectric element, the substrate including a first drive circuit that outputs a first drive signal for driving the piezoelectric element to the first electrode such that the liquid discharge head discharges a liquid, a second drive circuit that outputs a second drive signal for driving the piezoelectric element to the first electrode such that the liquid discharge head discharges a liquid, a third drive circuit that outputs a third drive signal for driving the piezoelectric element to the first electrode such that the liquid discharge head does not discharge a liquid, a reference voltage output circuit that supplies a reference voltage signal to the second electrode, and a substrate provided with the first drive circuit, the second drive circuit, the third drive circuit, and the reference voltage output circuit, in which the substrate includes a first wiring through which the first drive signal propagates, a second wiring through which the second drive signal propagates, a third wiring through which the third drive signal propagates, a fourth wiring through which the reference voltage signal propagates, a first wiring layer provided with the first wiring, a second wiring layer provided with the second wiring, and a third wiring layer located between the first wiring layer and the second wiring layer along one direction and provided with the fourth wiring, and the third wiring is provided on any one of the first wiring layer, the second wiring layer, and the third wiring layer.

According to the drive circuit substrate, the third wiring layer provided with the fourth wiring through which the reference voltage signal propagates is located between the first wiring layer provided with the first wiring through which a first drive signal propagates and the second wiring layer provided with the second wiring through which the second drive signal propagates. The inductance component caused by the current generated when the first drive signal propagates and the inductance component caused by the current generated when the second drive signal propagates are canceled by the inductance component generated by the current propagating through the fourth wiring. As a result, the possibility that waveform distortion occurs in the first drive signal and the second drive signal due to the inductance component is reduced.

Furthermore, since the current generated when the third drive signal propagates drives the piezoelectric element to the extent that ink is not discharged, the current is smaller than the current generated when the first drive signal propagates and the current generated when the second drive signal propagates. The third wiring through which the third drive signal with such a small amount of current propagates is provided in the same wiring layer as at least one of the first wiring layer provided with the first wiring through which the first drive signal propagates, the second wiring layer provided with the second wiring through which the second drive signal propagates, and the third wiring layer provided with the fourth wiring through which the reference voltage signal propagates. Therefore, it is possible to reduce the possibility that the number of layers of the substrate is unintentionally increased.

What is claimed is:

1. A liquid discharge device comprising:
- a liquid discharge head that includes a piezoelectric element having a first electrode and a second electrode and discharges a liquid by driving the piezoelectric element; and
- a drive circuit substrate that drives the piezoelectric element, wherein the drive circuit substrate includes
- a first drive circuit that outputs a first drive signal for driving the piezoelectric element to the first electrode such that the liquid discharge head discharges a liquid,
- a second drive circuit that outputs a second drive signal for driving the piezoelectric element to the first electrode such that the liquid discharge head discharges a liquid,
- a third drive circuit that outputs a third drive signal for driving the piezoelectric element to the first electrode such that the liquid discharge head does not discharge a liquid,
- a reference voltage output circuit that supplies a reference voltage signal to the second electrode, and
- a substrate provided with the first drive circuit, the second drive circuit, the third drive circuit, and the reference voltage output circuit, the substrate includes
- a first wiring through which the first drive signal propagates,
- a second wiring through which the second drive signal propagates,
- a third wiring through which the third drive signal propagates,
- a fourth wiring through which the reference voltage signal propagates,
- a first wiring layer provided with the first wiring,
- a second wiring layer provided with the second wiring, and
- a third wiring layer located between the first wiring layer and the second wiring layer along one direction and provided with the fourth wiring, and the third wiring is provided on any one of the first wiring layer, the second wiring layer, and the third wiring layer.

2. The liquid discharge device according to claim 1, wherein at least a part of the first wiring and at least a part of the second wiring are provided so as to overlap with at least a part of the fourth wiring in a direction along the one direction.

3. The liquid discharge device according to claim 1, wherein the third wiring is provided on the third wiring layer.

4. The liquid discharge device according to claim 1, wherein the substrate includes a fifth wiring through which the first drive signal propagates and a fourth wiring layer provided with the fifth wiring, the fourth wiring layer is located adjacent to the first wiring layer in a direction along the one direction, the first wiring layer is located between the third wiring layer and the fourth wiring layer, and at least a part of the fifth wiring is provided so as to overlap with at least a part of the first wiring in the direction along the one direction.

5. The liquid discharge device according to claim 1, wherein the substrate includes a sixth wiring through which the second drive signal propagates and a fifth wiring layer provided with the sixth wiring, the fifth wiring layer is located adjacent to the second wiring layer in a direction along the one direction, the second wiring layer is located between the third wiring layer and the fifth wiring layer, and at least a part of the sixth wiring is provided so as to overlap with at least a part of the second wiring in the direction along the one direction.

6. The liquid discharge device according to claim 1, wherein the substrate includes a seventh wiring through which the reference voltage signal propagates and a sixth wiring layer provided with the seventh wiring, the sixth wiring layer is located adjacent to the third wiring layer in a direction along the one direction, and at least a part of the seventh wiring is provided so as to overlap with at least a part of the fourth wiring in the direction along the one direction.

7. The liquid discharge device according to claim 1, wherein the first wiring layer and the third wiring layer are located adjacent to each other in a direction along the one direction, and the second wiring layer and the third wiring layer are located adjacent to each other in the direction along the one direction.

8. The liquid discharge device according to claim 1, wherein the substrate includes an eighth wiring through which a first constant voltage signal having a constant potential propagates and a seventh wiring layer provided with the eighth wiring, the first wiring layer is located between the third wiring layer and the seventh wiring layer, and at least a part of the eighth wiring is provided so as to overlap with at least a part of the first wiring in a direction along the one direction.

9. The liquid discharge device according to claim 1, wherein the substrate includes a ninth wiring through which a second constant voltage signal having a constant potential propagates and an eighth wiring layer provided with the ninth wiring, the second wiring layer is located between the third wiring layer and the eighth wiring layer, and at least a part of the ninth wiring is provided so as to overlap with at least a part of the second wiring in a direction along the one direction.

10. A drive circuit substrate that drives a liquid discharge head which includes a piezoelectric element having a first electrode and a second electrode and which discharges a liquid by driving the piezoelectric element, the substrate comprising:

a first drive circuit that outputs a first drive signal for driving the piezoelectric element to the first electrode such that the liquid discharge head discharges a liquid;

a second drive circuit that outputs a second drive signal for driving the piezoelectric element to the first electrode such that the liquid discharge head discharges a liquid;

a third drive circuit that outputs a third drive signal for driving the piezoelectric element to the first electrode such that the liquid discharge head does not discharge a liquid;

a reference voltage output circuit that supplies a reference voltage signal to the second electrode; and a substrate provided with the first drive circuit, the second drive circuit, the third drive circuit, and the reference voltage output circuit, wherein the substrate includes a first wiring through which the first drive signal propagates, a second wiring through which the second drive signal propagates, a third wiring through which the third drive signal propagates, a fourth wiring through which the reference voltage signal propagates, a first wiring layer provided with the first wiring, a second wiring layer provided with the second wiring, and a third wiring layer located between the first wiring layer and the second wiring layer along one direction and provided with the fourth wiring, and the third wiring is provided on any one of the first wiring layer, the second wiring layer, and the third wiring layer.

* * * * *